(12) United States Patent
Catalano

(10) Patent No.: US 10,445,843 B1
(45) Date of Patent: *Oct. 15, 2019

(54) SYSTEM AND METHOD OF MANAGING AND GEOGRAPHICALLY OPTIMIZING PROPERTY LEASING AND PURCHASING

(71) Applicant: Donald Charles Catalano, Smithtown, NY (US)

(72) Inventor: Donald Charles Catalano, Smithtown, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 13/844,238

(22) Filed: Mar. 15, 2013

Related U.S. Application Data

(63) Continuation-in-part of application No. 13/103,485, filed on May 9, 2011, now Pat. No. 10,062,127.

(60) Provisional application No. 61/473,139, filed on Apr. 7, 2011, provisional application No. 61/621,077, filed on Apr. 6, 2012, provisional application No. 61/794,372, filed on Mar. 15, 2013.

(51) Int. Cl.
*G06Q 50/16* (2012.01)
*G06Q 30/06* (2012.01)

(52) U.S. Cl.
CPC ......... *G06Q 50/16* (2013.01); *G06Q 30/0625* (2013.01)

(58) Field of Classification Search
CPC .................................................... G06Q 50/16
USPC .......................................................... 705/13
See application file for complete search history.

(56) References Cited

U.S. PATENT DOCUMENTS

| 7,076,452 | B2 * | 7/2006 | Florance | G06Q 30/06 340/988 |
| 7,249,146 | B2 * | 7/2007 | Brecher | G06Q 30/06 |
| 7,376,619 | B1 * | 5/2008 | Jones | G06Q 40/00 705/35 |
| 8,442,908 | B2 * | 5/2013 | Niccolini | G06Q 30/0278 705/35 |
| 8,799,004 | B2 * | 8/2014 | Bishop | G06Q 50/16 705/1.1 |
| 9,141,640 | B2 * | 9/2015 | Tadman | G01C 21/36 |

(Continued)

OTHER PUBLICATIONS

Rinner, Claus et al., "Web-enabled spatial decision analysis using Ordered Weighted Averaging (OWA)", Journal of Geographical Systems, Springer-Verlag, 2002. (Year: 2002).*

*Primary Examiner* — Eric T Wong
(74) *Attorney, Agent, or Firm* — Stephen E. Zweig

(57) ABSTRACT

A computerized method for optimizing a real estate management or selection process. This system scores various potential new real estate Comps in accordance with customer selected and weighted factors, including a novel set of Key Selected Driver (KSD) factors that rate a building's suitability to the customer's needs, according to an algorithmic scoring system. The system can use KSD factors to take into account the demographics of various cities or geographic regions, as well as take into account the distribution of employee homes, local traffic patterns, and the like. The system may also comprise a financial modeling section as well that makes alternative future cost projections based various financial parameters. The method can graphically show multiple potential sites, financial data, KSD factors, demographic factors, and mapping data simultaneously, thus allowing for rapid and intuitive optimization.

28 Claims, 46 Drawing Sheets

(56) References Cited

U.S. PATENT DOCUMENTS

| | | | |
|---|---|---|---|
| 2002/0035535 A1* | 3/2002 | Brock, Sr. | G06Q 30/0278 705/37 |
| 2003/0046211 A1* | 3/2003 | Brecher | G06Q 30/06 705/36 R |
| 2007/0067180 A1* | 3/2007 | James | G06Q 30/02 705/306 |
| 2008/0312988 A1* | 12/2008 | Trapp | G06Q 10/06 705/7.29 |
| 2009/0012803 A1* | 1/2009 | Bishop | G06Q 50/16 705/323 |
| 2009/0248587 A1* | 10/2009 | Van Buskirk | G06Q 50/188 705/80 |
| 2009/0327163 A1* | 12/2009 | Swan | G06Q 30/06 705/400 |
| 2010/0094548 A1* | 4/2010 | Tadman | G01C 21/36 701/533 |
| 2010/0318451 A1* | 12/2010 | Niccolini | G06Q 30/0278 705/35 |
| 2011/0295640 A1* | 12/2011 | Valentini | G06Q 10/06 705/7.19 |
| 2012/0158459 A1* | 6/2012 | Villena | G06F 17/30241 705/7.34 |
| 2012/0254156 A1* | 10/2012 | Rao | G06Q 10/10 707/722 |
| 2012/0290391 A1* | 11/2012 | Rao | G06Q 30/02 705/14.53 |

\* cited by examiner

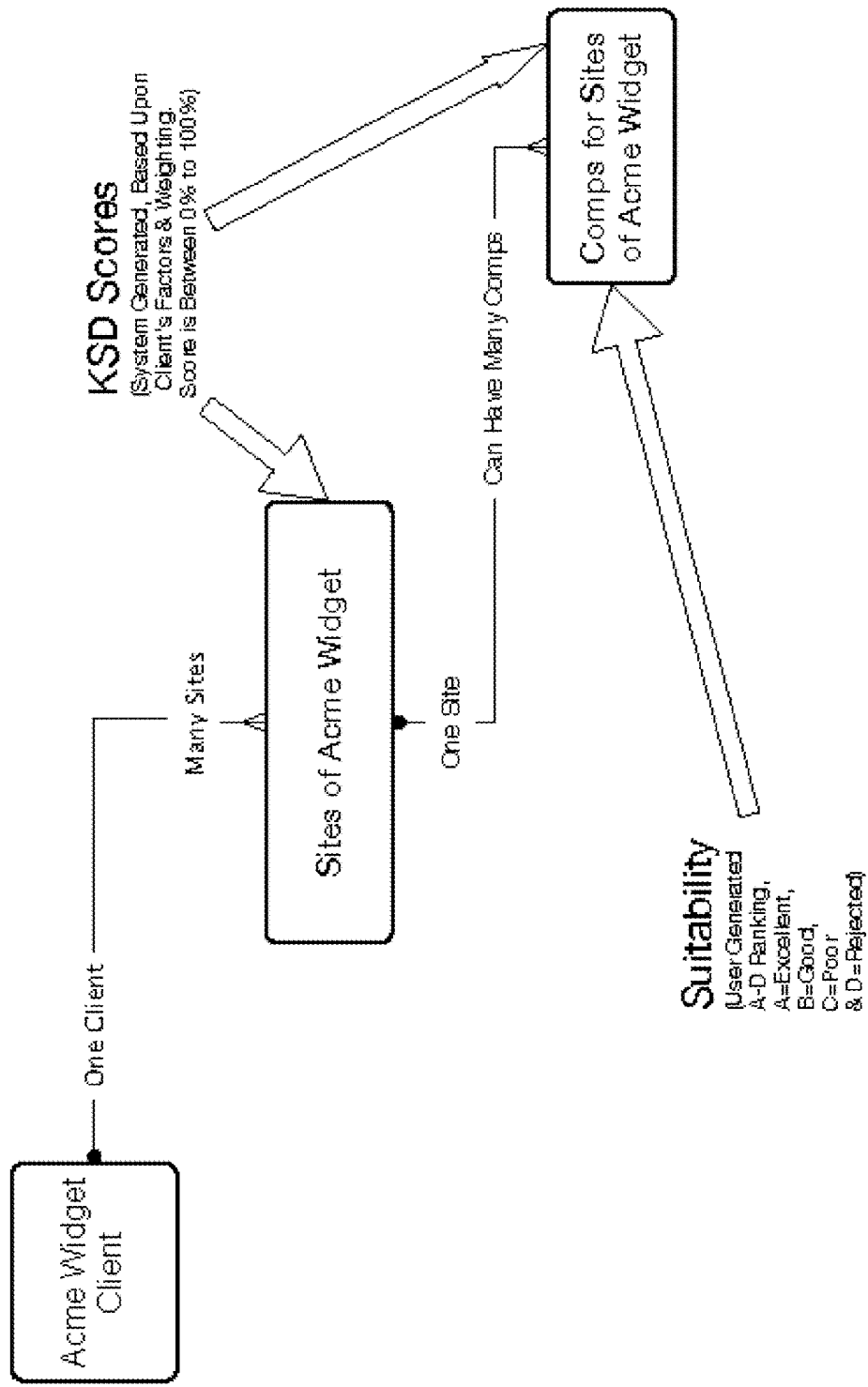

Figure 23
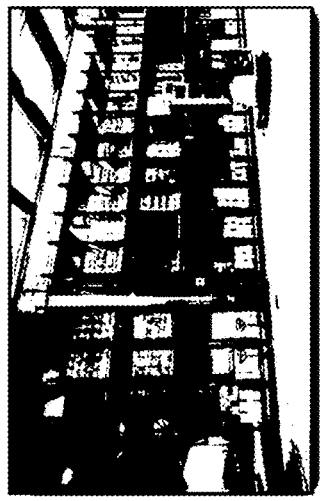
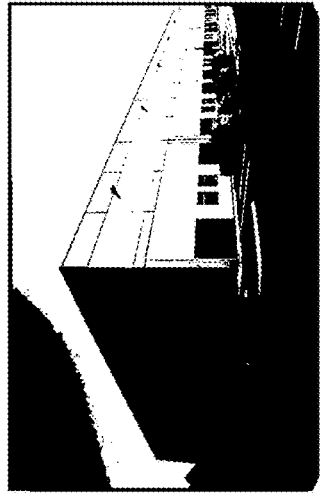
Segment the warehouse by possible racking levels
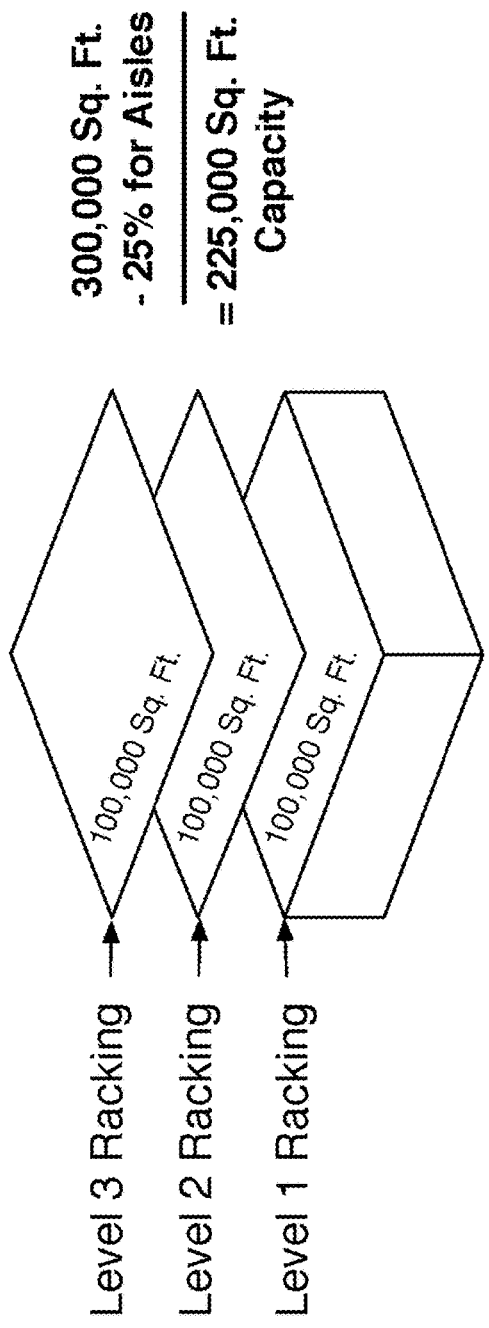
300,000 Sq. Ft.
−25% for Aisles
= 225,000 Sq. Ft. Capacity
Level 3 Racking — 100,000 Sq. Ft.
Level 2 Racking — 100,000 Sq. Ft.
Level 1 Racking — 100,000 Sq. Ft.

Sale Info

Info

| | Totals | PSF |
|---|---|---|
| Total Sq. Ft. | 78,800 | |
| Sale Price | $ 10,750,000 | $ 136.42 |
| Sale Discount | 18 % $1,935,000 | $24.56 |
| Eco Dev Discount | 10 % $1,075,000 | $13.64 |
| Adjusted Sale Price | $7,740,000 | $98.22 |
| Closing Cost | 5 % $537,500 | $ 6.82 |
| Subtotal | $8,277,500 | $105.04 |
| Renovation: | $3,152,000 | $40.00 |
| Other: | $6,000,000 | $76.14 |
| Grand Total | $17,429,500 | $221.19 |

Debt Service

| Interest: | 4.50 | % |
|---|---|---|
| Term: | 25 | yrs |

Amount of Equity Required

| | % | Total | PSF |
|---|---|---|---|
| Equity: | 20.00 | $3,485,900 | $ 44.24 |
| Debt: | | $13,943,600 | $176.95 |

Purchase vs. Lease Calculator

| | Annual | PSF |
|---|---|---|
| Debt Cost: | $930,037 | $11.80 |
| Operating Expenses: | $ 472,800 | $ 6.00 |
| Taxes: | $ 571,300 | $ 7.25 |
| Subtotal: | $1,974,137 | $25.05 |
| ROI on LL Equity: | 7.00 % $244,013 | $ 3.10 |
| Equivalent Lease $: | $2,218,150 | $28.15 |

SYSTEM AND METHOD OF MANAGING AND GEOGRAPHICALLY OPTIMIZING PROPERTY LEASING AND PURCHASING

CROSS REFERENCE TO RELATED APPLICATIONS

This application is a continuation in part of application Ser. No. 13/103,485, "SYSTEM AND METHOD OF MANAGING AND OPTIMIZING COMMERCIAL REAL ESTATE LEASES", inventor Donald Charles Catalano, filed May 9, 2011, Ser. No. 13/103,485 in turn claimed the priority benefit of U.S. provisional application 61/473,139, "SYSTEM AND METHOD OF MANAGING COMMERCIAL REAL ESTATE LEASES", filed Apr. 7, 2011, inventor Donald Charles Catalano; this application also claims the priority benefit of provisional application 61/621,077 entitled "METHOD AND SYSTEM FOR A MOBILE COMPUTERIZED MULTIPLE FUNCTION REAL ESTATE BROKER'S ASSISTANT", inventor Donald Charles Catalano, filed Apr. 6, 2012; this invention also claims the priority benefit of provisional application 61/794,372, "Reoptimizer Walkthrough", filed Mar. 15, 2013, inventor Donald Charles Catalano; the contents of these applications are incorporated herein by reference.

BACKGROUND OF THE INVENTION

Field of the Invention

This invention is in the field of software and systems for managing real estate transactions, in particular geographically optimizing these real estate transactions.

Description of the Related Art

Corporations typically have large portfolios of real estate assets to manage. These real estate portfolios typically are among a company's top expenses, and thus these portfolios need to be carefully managed and cost optimized. Such portfolios are often managed using various computer database and financial tracking systems. These usually include general-purpose database and financial tracking systems, such as systems put out by SAP, Oracle, and other database companies.

Dedicated, real estate oriented, database and financial tracking systems are also known in the art. Examples of such real estate oriented database and financial tracking systems include Florance et. al. U.S. Pat. No. 7,076,452, which teaches a system and method for collection, distribution, and use of information in conjunction with commercial real estate, and other patents.

Corporations often elect to lease their various real estate assets, rather than to purchase the assets, because leasing both allows a company to put its scarce capital to most productive use, and also allows a company greater flexibility in finding optimal real estate locations. Here use of long-term leases, such as five and even ten or more year leases is common. Usually with such leases, the company will first work with real estate brokers to locate various suitable potential locations of interest. Unlike residential homes, which are generally purchased or leased as is, commercial real estate locations often require extensive modification—e.g. floor plan changes, installation of custom fixtures, and manufacturing facilities, and the like before a company can utilize the location. In order to entice prospective tenants to commit to long-term leases, often the landlord will commit a certain amount of money to make these modifications.

Business enterprises are constantly in a state of change. They grow and shrink depending on the general economy, the fortunes of their particular business sector, the skill of company management, and many other factors as well. When various businesses and various business activities change, their respective employee counts, manufacturing space, and other space needs also change.

The real estate market is constantly in a state of change as well. Although banks and other financial institutions have considered real estate to be a reliable asset class that can be depended upon to hold value, this isn't always the case. Rather, real estate can go through multi-year long boom and bust cycles. There are long periods when commercial real estate rents continually increase in value, and there are periods when commercial real estate rents decrease and sometimes, like in the deep recession of 2008 to 2011, they can drop precipitously.

As a result, long-term leasing is very much an exercise in guesswork. The company does the best job it can at trying to project its needs years into the future, and the landlords do the best job they can to maximize profits from the present and into the future. As might be expected, given the uncertainties and cycles of the economy, these guesses are often wrong over a lease term of 5, 10 or even more years. This, more often than not, results in commercial real estate leases that are out of sync with current market realities; furthermore, they are typically over-market by the end of the lease term.

Another problem, which is common for any type of real estate transaction, is the question of best optimizing the city, state, or other geographical region where the real estate transaction will take place. Here again, prior art methods are not particularly adequate.

BRIEF SUMMARY OF THE INVENTION

The present invention is based, in part, upon the insight that one common weakness of prior art computerized real estate portfolio management systems, particularly for the commercial leasing market, is that such prior art systems tended to assume that real estate valuations, and the underlying leasing costs, would generally be static or only slowly change with time.

The invention is also based, in part, upon the insight that real estate leases, although legally binding contracts, may be modified by the mutual consent of the landlord and the tenant. Although in the first few years of a long-term lease, neither the landlord nor the tenant will usually come to a mutually agreeable lease modification agreement, as the lease progresses to the last few years, grounds for mutually agreeable modifications increase.

The invention is also based, in part, upon the insight that to properly evaluate commercial real estate lease portfolios, it is important to first clearly determine the current state of a company's portfolio in terms of lease commitments, clearly determine what the current real estate market is offering in terms of comparable lease locations, and then finally to benchmark the differences between present portfolio and a potentially market optimized portfolio. These benchmarks can then be used to help guide subsequent action in this regard.

The invention is also based, in part, upon the insight that in addition to the problem of determining which building or home most optimally fits the client's needs within a given city or geographic area, often the basic choice of city or geographic area is extremely important. Here, for example, some cities may have high rental rates, and some may have low rental rates. Some cities may have high real estate taxes, and some may have low real estate taxes. Some will have high home values, and some may have low home values, and so on. From an employer's standpoint, the impact of the city or geographic area on the company's local employee base is also very important. Some cities will have larger numbers of younger workers (e.g. 20-44), while other cities will have larger numbers of older workers (e.g. 45-64). Some cities will have populations with a high expertise in cutting edge computer science and math skills. Other cities may have populations with a high expertise in mechanical skills, while still other cities (or regions) will have populations with a high expertise in agricultural skills, and so on. The average amount of education of the population (e.g. the percentage of the population with a college degree or advanced degree) will also vary.

Further, at least for employers who may already have a population base of employees in a given geographic area, a decision to move a key building from one city to an alternative city may or may not have a big impact on that company's employees. For example, if the bulk of the company's employees are located to the north of an existing building, then relocating to a building slightly further north would not inconvenience the existing employees overly much, while relocating to another building further south might have an unexpectedly large impact on that company's existing employees.

The invention is thus also based, in part, on the insight that to more intelligently find new real estate, methods to better take into account the demographics of various target cities or regions, and methods to better take into account the residences of current employees or projected employees, in addition to the building selection criteria, would also be highly useful.

Because these methods are highly useful for commercial real estate leasing transactions, most of the specific examples and discussion in this disclosure will focus on such transactions. However it should be understood that these commercial real estate leasing transactions discussion and examples are not intended to be limiting. In most cases, and particularly for the geographic methods discussed herein, these methods may be applied to any type of real estate transaction.

The present invention can be thus subdivided into several key components. One component comprises a novel computerized real estate benchmarking method; a second component comprises a unique method of ranking real estate buildings that, not unlike financial FICO score ranking methods in a different area, utilizes a computerized algorithm based on real estate Key Site Drivers (known as "KSD's" within the invention). As will be discussed, these Key Site Drivers (KSD's), which are based upon individual client needs, help ensure that appropriate alternative locations (or comparables as a term of art, and known as "Comps" within the invention) are used for the benchmarking methods. A third key component of the invention is a novel existing site Utilization scoring method that can allow clients to see, at a glance, if a particular portfolio location (existing sites for a client are called "Site" or "Sites" within the system and hereafter referred to as such) is properly utilized or not.

Other key components include components to help the client determine which city or geographic region is best suited to meet the client's overall objectives. Here, the KSD concept may be extended to further include various demographic criteria that vary between cities and regions. Here, for example, often even before the building specific KSD are used to help find buildings in a given region that best meet the client's interest, demographic type KSD may be used to first locate the optimum city or geographic region upon which to begin the building specific search. These demographic type KSD may include information pertaining to the average costs and average potential employee demographics of a given city or area (e.g. average employee age, education, percentage in the area with certain types of skills, and the like. Additionally, at least for commercial real estate for employers considering short distance relocation (e.g. distances less than around 50 miles), still other key components can accept as input, the geographic distribution of the company's current employees, and attempt to visualize or otherwise show the impact of a move on the these current employees (e.g. differences in commuting times, and the like). These methods may also be used in graphical format to allow clients to see, at a glance which cities or regions are better or worse, and also do company site relocation in a manner that takes present employee home addresses into account.

Thus in one aspect of the invention, the invention is a method and system for a computerized commercial real estate management system that employs realistic models and projections of the dynamic real estate market and dynamic business location needs. The system further allows a business owner to understand when negotiations for lease modifications should begin. The system presents the owner with up-to-date relevant leasing market conditions, as well as a method to measure how well alternative and comparable locations (Comps) match the end user's project specific requirements (KSD's). Furthermore, the system can estimate the price savings that could be achieved if these alternative Comps were leased. Yet, another aspect of the invention is to compare alternatives (Comps) for purchase; for this, the system takes into consideration the financial factors unique to a purchase.

In one embodiment, the present disclosure relates to a computerized system and method for optimizing a corporation's real estate lease portfolio in such a way to help that corporation reduce or eliminate costly over-market leases (i.e. the lease price is above current market conditions), while at the same time help corporations efficiently pick the Comps that best meet their corporate objectives. This system is based upon input from the customer, and utilizes an original method to score the Sites in accordance with the various customer weighted factors (KSD's). Furthermore, the system determines the percentage of Utilization that the corporation is achieving, compared against the maximum Capacity of the corporation's existing Site(s), and helps guide sound financial decision-making.

Considering the real estate is often the $2^{nd}$ or $3^{rd}$ biggest expense for a corporation the potential for savings for even a small-cap corporation will be in the millions of dollars. A mid-cap or large-cap company may measure the elimination of wasted dollars by the optimization of their real estate portfolios in the many millions of dollars.

Note that, as previously discussed, although the term "lease" is used throughout this disclosure, many or all of the embodiments of the invention may also be useful for other forms of real estate property transactions, such as purchase, sublease, rental, and thus alternative embodiments of the invention may be used for these other purposes (e.g. purchase, sublease, and rental) as well.

In another embodiment, the invention may be a computerized method for optimizing a real estate management or selection process. This system scores various potential new real estate Comps in accordance with customer selected and weighted factors, including a novel set of Key Selected Driver (KSD) factors that rate a building's suitability to the customer's needs, according to an algorithmic scoring system. The system can use KSD factors to take into account the demographics of various cities or geographic regions, as well as take into account the distribution of employee homes, local traffic patterns, and the like. The system may also comprise a financial modeling section as well that makes alternative future cost projections based various financial parameters. The method can graphically show multiple potential sites, financial data, KSD factors, demographic factors, and mapping data simultaneously, thus allowing for rapid and intuitive optimization

BRIEF DESCRIPTION OF THE DRAWINGS

FIG. 7B provides an overview flowchart of how the Key Site Drivers and Suitability Ranking can be applied to Sites and Comps (defined later).

FIG. 14A shows a user interface showing a Site Dashboard. Here a customer can examine the particular expenses that are specific to a particular Site, within the client's portfolio of Sites, and evaluate these expenses in the context of current market Comps, the suitability ranking (known in the invention as Suitability Ranking) of the alternative Comps, and the projected cost savings of the alternative Comps. Here the summary tab is being viewed.

FIG. 14B shows how a user can drill down further into a particular Site by clicking on an alternate tab (in this case a building specifications tab) and find out more information about the specifications of this particular building.

FIG. 16 shows an example of the same potential lease Comp, along with the relative KSD score when the properties price is not included in the overall score rating. Absent price, the property is indeed perfect.

FIG. 23 shows a diagram showing how the system can further consider additional details, such as warehouse racking segmentation.

FIG. 24 shows how the system can also manage different proposals from the owners of different Comps.

FIG. 35 shows a detail from one of the invention's financial input user input forms, here showing how a user interested in considering either purchase or lease costs type KSD can make conversions between purchase costs and lease costs. This, for example, enables a corporate client to use the same cost KSD parameters or weights to apply to both purchased and leased property.

DETAILED DESCRIPTION OF THE INVENTION

Nomenclature or Lexicon

Figure 1:
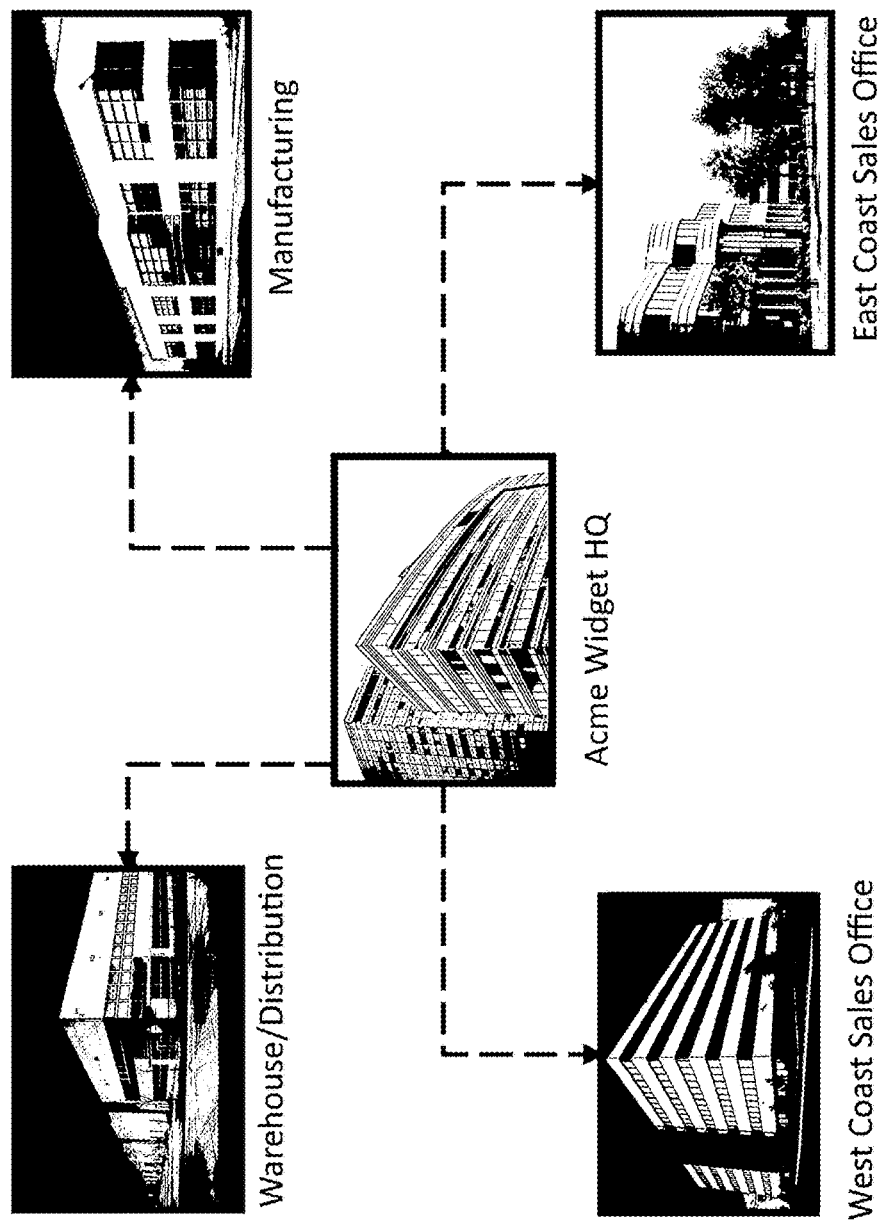
FIG. 1 shows an example of various types of commercial real estate, showing how a typical large company leases many Sites and often of multiple types of real estate.

Owner (a/k/a Landlord)—a fee-simple or other type owner of real estate for lease or sale. They are the lessors in a lease.

Landlord's Agent—broker working on behest of the landlord. Their fiduciary is to the landlord and they are tasked and expected to seek the highest price for the property they represent.

Tenant—they are the lessees in a lease and hold a leasehold estate in the property. They may also be or become buyers if the property is for sale.

Tenant Representative (a/k/a Tenant Rep)—a licensed real estate broker who is focused on providing expertise for the tenant/buyer's benefit.

Site—within REoptimizer (e.g. the invention), it is the Tenant's existing real estate asset, whether it is owned or leased by them.

Comp—within REoptimizer, it is an alternative building to the client's current Site.

Capacity & Utilization—within REoptimizer, Capacity is a concept and measurement of the potential Capacity a Site or Comp offers for the Tenant in either square feet or cubic feet. The Utilization is the measurement of how much that customer is utilizing their available Capacity, in accordance with the customer's standards for Utilization and/or how much they could potentially use in a Comp.

As previously discussed, prior art computerized real estate listing systems do exist. These systems include several commercial computerized real estate listing services such as CoStar, LoopNet and Property Shark. However these prior art systems are generally oriented to the needs of commercial brokers and landlords, rather than being oriented towards the needs of the tenant businesses that lease commercial real estate. As a result, their reporting capability are focused on reporting merely what is available in the market based upon a very limited set of criteria such as square footage and geography. None of those systems contain the functionality discussed herein, most specifically the ability to measure alternative locations based upon the client's unique set of needs. These needs go way beyond the rudimentary square footage available and are what typically drives the decision on which location to occupy.

There is prior art for managing lease portfolios. At best, these systems tell a corporation what they owe, but none of them tell a corporation what they should be paying. None of them benchmark a client's existing Sites to the market Comps. Considering the magnitude of the real estate expense for a corporation (often it's $2^{nd}$ or $3^{rd}$ biggest expense), it is ironic that there has been no system for benchmarking that would provide a corporate client the prudent due-diligence to monitor their real estate costs with market realities. Consider this in light of the fact the US commercial real estate market has recently been evaluated at 11 trillion dollars and most of that is leased by one company or another.

Corporations, who often have many real estate Sites in these smaller markets for warehouse/distribution, back-office operations, manufacturing or just because they do not wish to be located in a major city, are less well covered by this service. Some examples of potential clients that have major operations in markets not served by CoStar are companies like Walmart (Bentonville, Ak. is not on the CoStar map), Dow Chemical and Coca-Cola, just to name a few.

Another problem with prior art computerized databases such as CoStar is their lack of focus on the ultimate customer, the corporation. Every Site within a corporation's portfolio is unique and distinct. As a result, to get an accurate perspective on leasing alternatives, the alternative real estate location (often called "Comps" or "comparables") have to match the unique needs of a corporation's usage for that Site. At present, however, these matching methods are nonexistent. For example, there is no standard way to define a company's needs much beyond type of real estate (i.e.: office, warehouse, retail), square footage needed and approximate location.

In general, the sensitivity and granularity of prior art automated real estate site selection methods is just too crude. Thus to some extent, the present invention brings a scientific process and uniform approach that achieves both automation and precision. It contrasts to the otherwise mostly manual, subjective and imprecise process, as science does to art.

FIG. 1 shows an example of various types of commercial real estate, showing how one company may be leasing multiple types of real estate at different locations.

Another problem is that within a company's real estate portfolio, each Site has a dynamic number of expenses associated with it. Although it is standard to track basic expenses such as rent or debt service, in addition to these basic expenses, there can be more than a dozen other different types of expenses. Each different expense can have its own starting and ending dates, and each different expense may or may not escalate in cost over the course of a long-term lease. Those expenses that do escalate over the course of a long-term lease often do so at different rates.

There are other lease expenses as well. The expenses associated within a lease may be a one-time expense such as re-carpeting the office, or they can be repeating expenses such as monthly rent. Even repeating expenses may have many different possible frequencies such as monthly (rent and electric), quarterly (association dues for office condos), semiannually (taxes if paying directly) or annually (landlords typically pass along increases in their operating expenses over the prior year on an annual basis).

Figure 2:
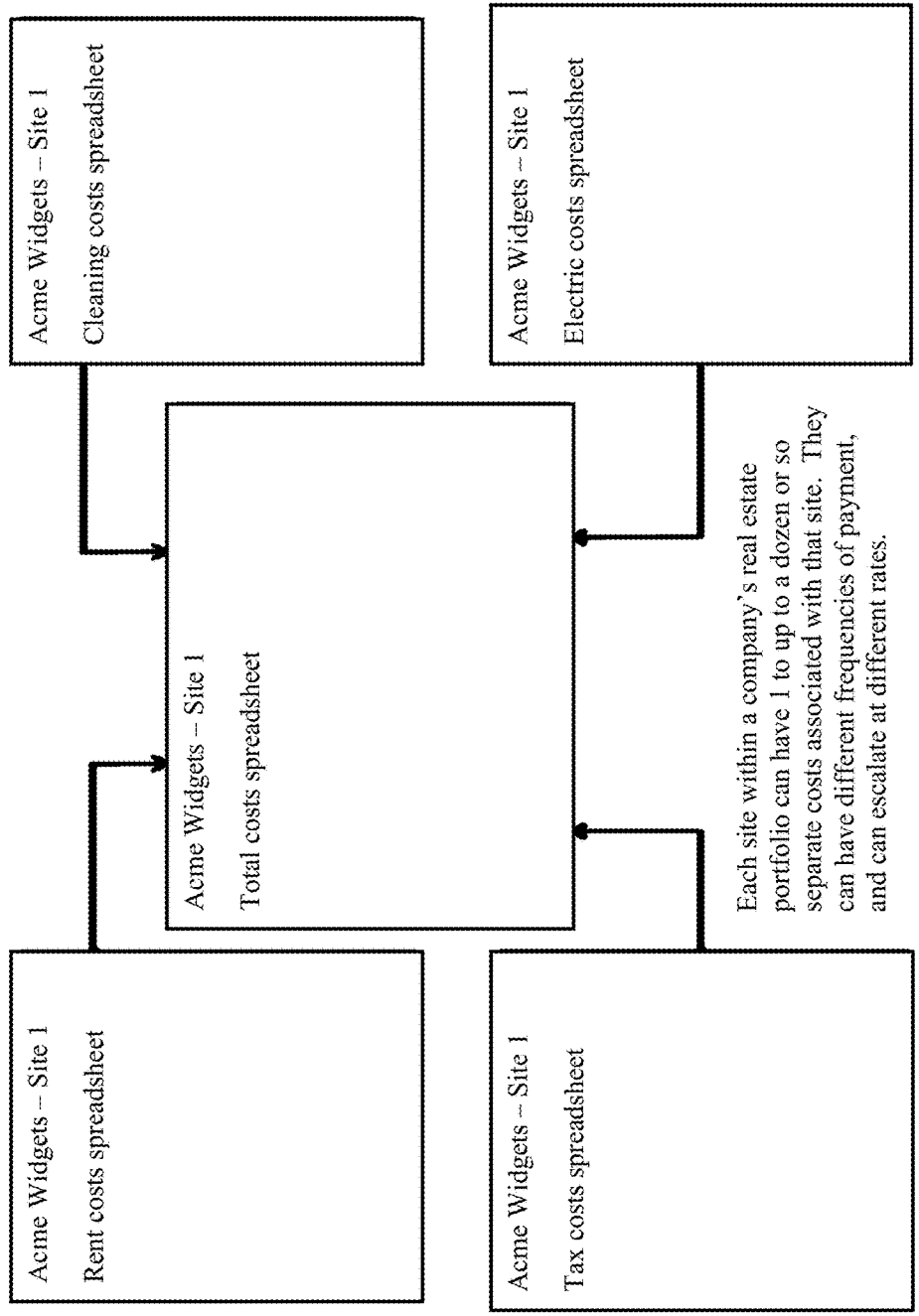
FIG. 2 shows an example of some of the various commercial real estate cost factors, showing that there are many different costs per Site.

FIG. 2 is a diagram that exemplifies the complex nature of commercial lease expenses.

Because of the non-homogeneous nature of real estate (no one office building is exactly alike any other office building, and no one warehouse is exactly alike any other warehouse) it has been difficult, if not impossible for corporations to accurately know whether they are paying below market, at market or over market rent and operating expenses. At present, there is no systematic or mathematical approach by which a company may consistently comparing their existing leases to what alternative locations may offer in both lower rent and lower operating expenses.

When you consider that a large corporation may have 50, 100 or even a few hundred locations, and further consider that real estate is often the second or third largest expense for a corporation you can begin to extrapolate the financial significance of a corporation being over market by just 10%. In a large corporation, paying too much for long term leases can significantly decrease overall corporate profitability, and this in turn, given that the stock market often values large companies at a 15-50× multiple of their profits, can have a huge impact on their stock market valuation.

Figure 3:
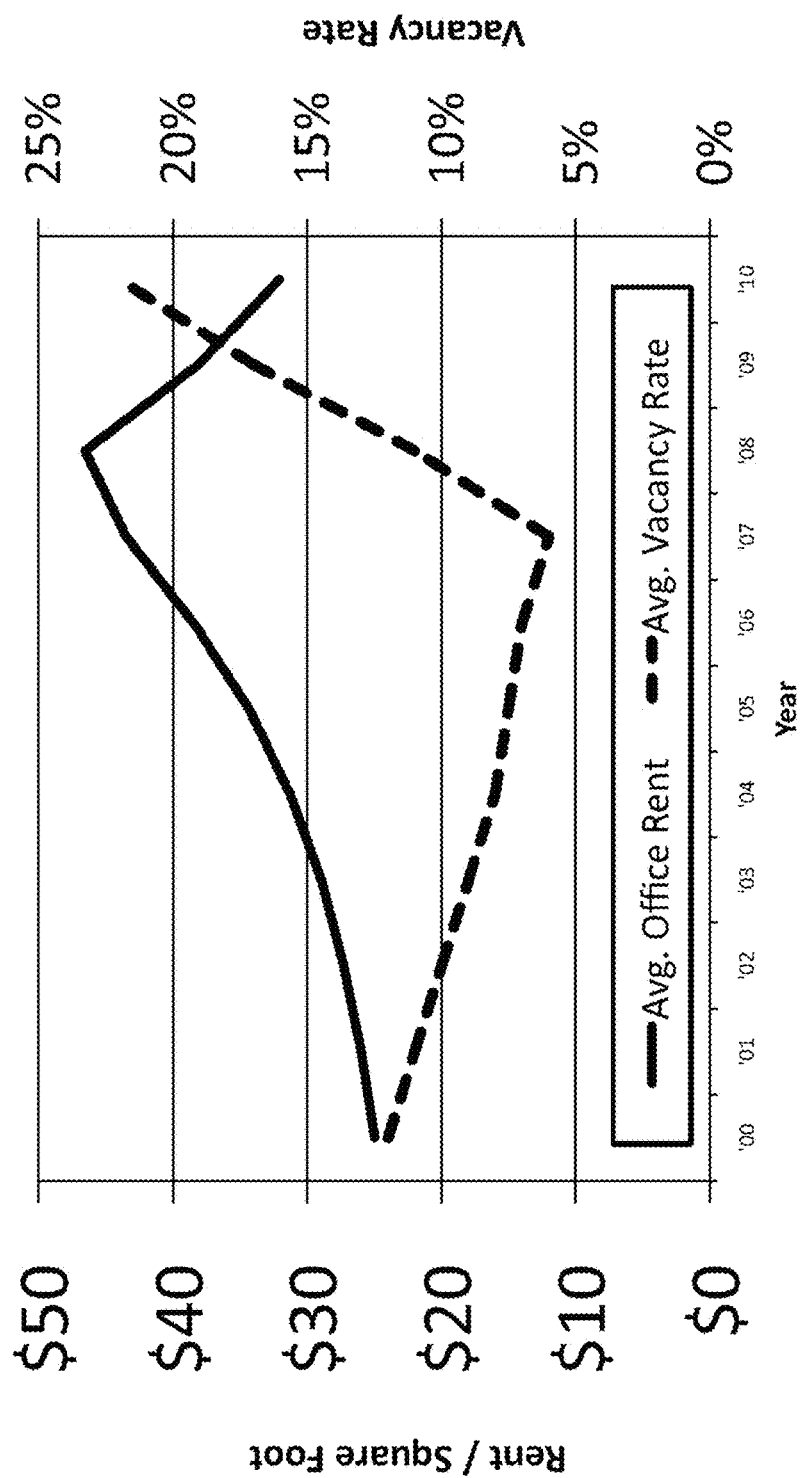
FIG. 3 shows how rent prices are elastic, and track economic supply vs. demand considerations very closely.

Since real estate prices are elastic they follow the cycles of supply and demand. A diagram showing the elastic nature of real estate prices is shown in FIG. 3. In general, in times of prosperity and expansion, there is less supply for the corporate tenants, and prices are naturally driven up. In times of recession and contraction, there is typically more real estate supply than demand and rents fall.

Figure 4:
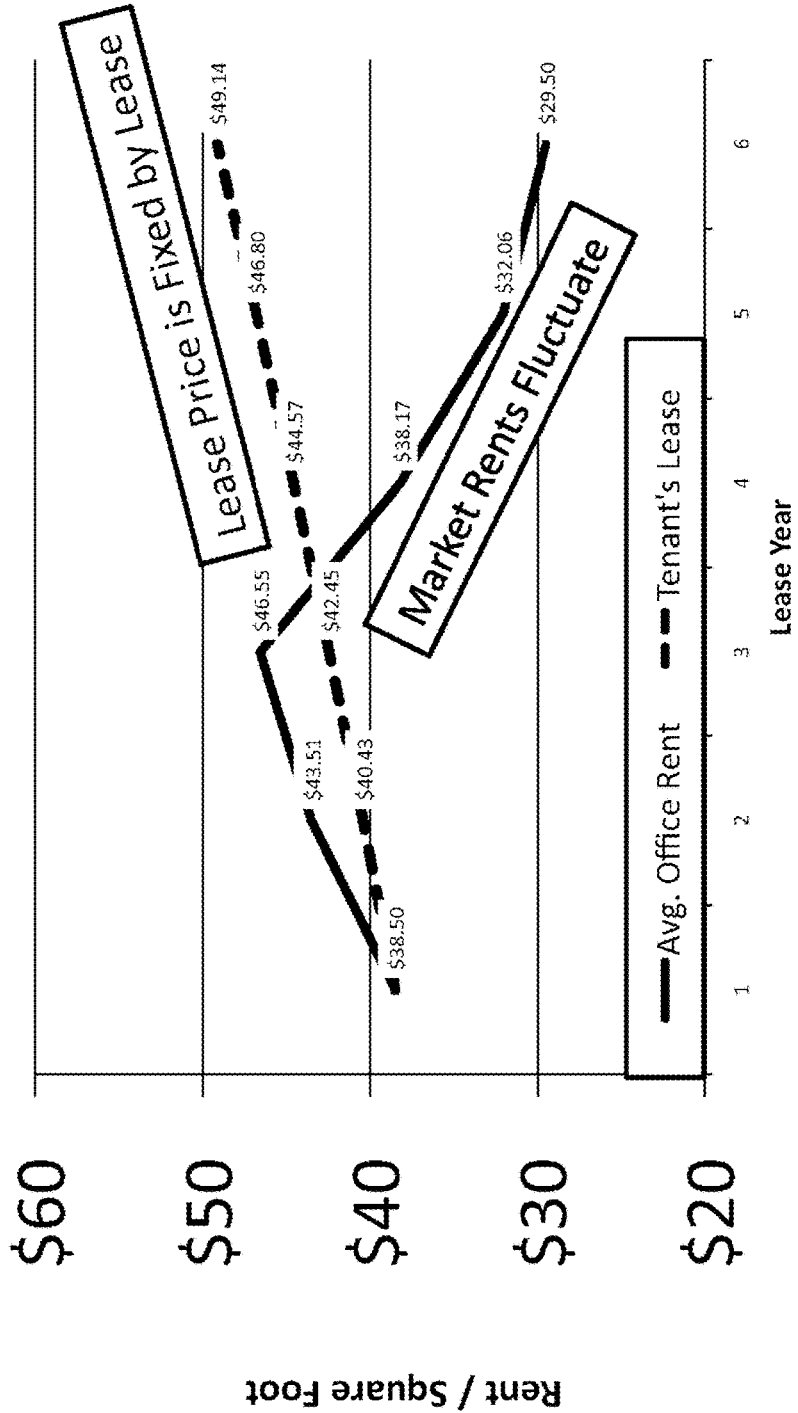
FIG. 4 shows that by contrast, lease prices, being negotiated years in advance, tend to be inelastic and are not very sensitive to current economic supply vs. demand considerations.

Unfortunately however, corporate leases are nonelastic in that they are typically for lease terms of five years or more. Therefore, a corporation that signs a lease for five years as the economy peaks before a recession may very well find that that lease is 30% to 50% over market during a recession. A perfect example of such a time period is the run up in rents from 2000 through 2008, followed by a sharp downturn in the economy and substantial rent reductions from 2009 to 2011. Corporations who signed leases during the acme of the market from 2006 and 2008 ended up entering into leases that, by 2011, were as much as 30% to 50% over 2011 market conditions. This effect is shown in FIG. 4.

Under these circumstances, as leases approach their maturity, corporations are naturally desirous of either renegotiating their over-market leases, or availing themselves of less expensive alternative location.

The timeframe for renegotiation between corporations and landlords tends to be elastic as well. In recessionary times, corporations, because they are in over-market leases, typically seek to start the process well in advance (perhaps 2 to 3 years in advance) of their lease expiration. If they are a credit tenant holding a large block of space then landlords are often very willing to enter into these early negotiations in order to secure the large, credit tenant within the landlord's portfolio.

There are significant advantages for the landlord to consent to an early renegotiation of the lease. First is the landlord's desire to keep the building fully occupied, because downtime can be very expensive for a landlord. Second, and perhaps even more importantly, is that landlords often wish to reduce their mortgage costs by refinancing, and doing so requires that the landlord secure favorable long-term mortgage rates and terms from the debt market, and these will be jeopardized if the property is vacant or likely to become vacant. Further, when the landlord is a publically traded company such as a real estate investment trust (REIT), then maintaining a low vacancy rate can be critical to maintaining a high stock price.

Thus, there are often substantial advantages for both the tenant and the landlord to renegotiate a lease well in advance of the actual lease expiration date.

Assuming the average lease term is approximately 5 years in length, and further assuming that statistically a corporation signs about the same number of leases per year, then on the average, approximately 20% of a large corporation's leasehold assets will be expiring in any one year. However, if the economy is in a period of contraction/recession, then corporations may become motivated to start the lease renegotiation process two or even three years in advance. Thus, during an acute economic recession, conceivably 40% to 60% of the leases within a large companies real estate portfolio may be in a state of flux.

Even when the economy is in an expansion mode, corporations will seek to renegotiate their lease at least a year in advance for any space of significant size and importance, otherwise, the corporation knows that it may not find the space to meet the corporation's needs at prices it would find reasonable. Thus, when the general economy is prosperous and companies are expanding, prudent corporations will be in the process of renegotiating approximately 20% of their leases at any given time.

It can be fairly assumed that at any given period of time, a large corporation may target between 20% to 60% of their leasehold estates for renegotiation. Thus if, for example, a corporation has 100 leases within their real estate portfolio, then 20 to 60 of these significant assets should ideally be renegotiated during any given period of time.

Unfortunately, at present, corporations frequently fail to realize that they are in fact paying over-market rates for many of their leases. As a result, absent clear understanding of the magnitude of the savings that could potentially be realized, corporations are generally not motivated to devote the time and resources required to renegotiate their leases. Here, the lack of a computerized system to bring this realization home to upper management, in an easy to grasp manner, can cause a corporation to operate at a suboptimal level of financial efficiency.

Figure 5:
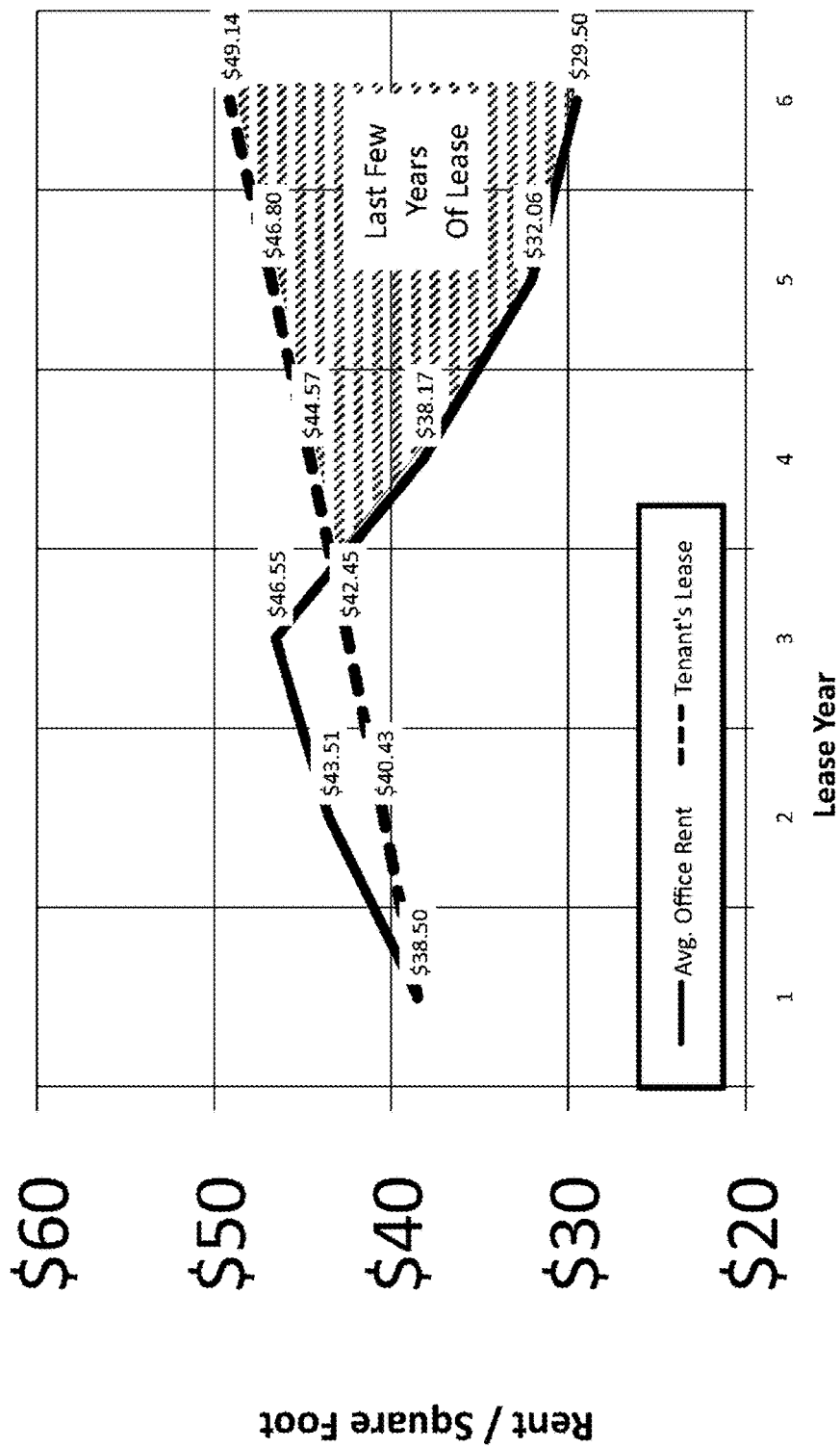
FIG. 5 shows the resulting cost differentials between fixed lease costs and variable market conditions. In an economic down market, often about 3 years before a long-term lease expires, a window of opportunity can open up in which a tenant, although stuck in a costly long-term lease above market value, can use the upcoming expiration of the lease, and calculations such as this, to attempt to renegotiate for more favorable terms.

The invention thus fills a long unmet need for a computerized real estate lease management system and method that can compute the difference between a company's current relatively inelastic lease costs for a particular Site or even for that company's whole portfolio of Sites (remember, as defined here and in the system, a Site is something they already lease), and what the company's lease costs for a Comp, based on current market conditions might be, and extrapolate this difference several years into the future. A graphic showing this type of calculation is shown in FIG. 5. The invention performs this type of calculation, both on a per-Site basis versus an assortment of market Comps, and also on a real estate lease portfolio basis, and then presents the results to management in an easy to understand benchmark and graphical readout form.

In order to be realistic, the calculation shown in FIG. 5 should incorporate a number of factors, including present contractual lease costs, cost escalations, and also other expenses associated with the lease, such as taxes, rent, electricity, dining facilities, repairs, insurance water supplies and so on, as well as their anticipated price increases or escalations for the next few years as well.

In order to be even more realistic, the calculation shown in FIG. 5 should make a true "apples" to "apples" comparison. In other words, it is not very useful from a negotiating or decision making standpoint to run a comparison between a company's present lease, which may be for a very desirable building, and an alternative rundown facility located in an undesirable location. Rather, particularly for decision-making and negotiating purposes, it is most useful to run the comparison shown in FIG. 5 versus a truly and objectively comparable building.

Unfortunately, prior art methods of rating buildings, which emphasized only factors such as square footage and price, are too simplistic to be optimal for these purposes. As a result, the invention utilizes dynamic building rating system; this is based upon factors that the client deems are the key factors or Key Site Drivers (KSD's). A good analogy for how these KSD's help evaluate a location would be the FICO scoring system for consumer credit. That system incorporates a dynamic number of factors and mathematically transforms those factors into uniform score that creditors quickly can then evaluate a consumer's credit with. Without this, the creditor would be forced to make less than scientific and certainly time consuming decisions. Similarly, the invention's use of KSD's provides a scientific platform for the corporate client to make informed decisions about their current locations and potential alternatives.

The KSD calculations shown in FIG. 5 can, in principle, be run against any type of building (i.e. comparable or non-comparable), by adding a uniform building rating to the process, and performing genuine like with like calculations, the invention greatly improves the commercial value of the rating process.

Furthermore, the present invention's computerized system and method of managing and evaluating leases allows corporate upper management to easily benchmark the differences between their current leasehold estates and current market conditions.

Prototypes of the invention have been implemented on computerized database systems such as the Filemaker pro database system, produced by Filemaker Inc., owned by Apple Computer, Santa Clara, Calif. However these methods can be implemented on a wide variety of other computerized systems, either stand alone, or Internet server—web client systems. The invention will often generally consist of software stored in computer memory, generally running under a standard or custom operating system such as iOS, Windows, Linux, Unix, and the like. The invention's software will run on one or more computer processors, often processors in the popular x86, ARM family, MIPS family and the like. The invention's software will typically consist of multiple modules, including database management software modules to control the real estate database, benchmarking and other analytical software modules, graphical user interface modules, communications (network) modules, and the like. The software will also consist of various reporting software modules, which will often interact with a graphical user interface intended to be used by one or more users.

In some embodiments, the software and database may reside on a server, such as an internet web server. Users may interact with this software by, for example, use of standard graphical user interfaces such as web browsers, often running on various computerized devices such as desktop computers, laptop computers, smart phones, and tablet devices. Often these devices will be connected to a standard network, such as the Internet, by various wired (e.g. cable, DSL, phone line connections, optical fiber connections, or wireless connections such as cellular phone connections and/or Wi-Fi connections).

The current operating version of the invention, which incorporates a number of the specific embodiments discussed here, is called the "REoptimizer™" system. As a result, occasionally certain embodiments of the invention will be referred to in the alternative as the REoptimizer or the REoptimizer system.

As previously discussed, one of the reasons why calculations such as FIG. 5 are hard to implement using prior art methods is that the real estate industry is, as a whole, very far from being a perfect, transparent market. Rather, corporations are often at the mercy of biased research from conflicted sources, e.g. a Landlord Agent that represents the landlord in one or more locations and also represents the tenant in one or more lease negotiations. Unfortunately, this is fairly common industry practice, especially amongst the larger commercial real estate brokerage firms. In general, when one firm tries to represent both sides of a transaction, then a conflict of interest exists. As a result, due to this lack of transparency, corporations are frequently not aware of all the alternatives they have.

Figure 6:
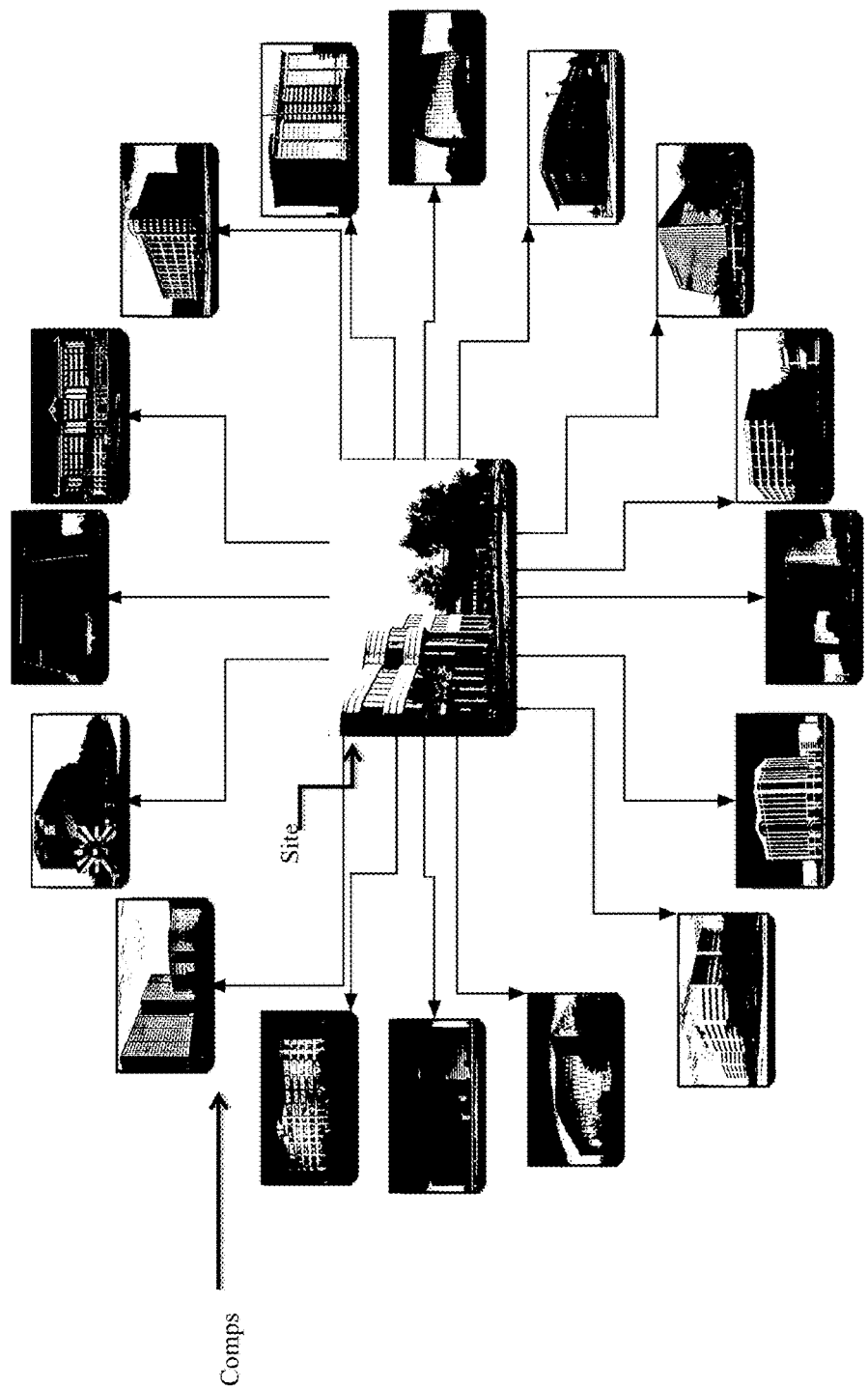
FIG. 6 gives a pictorial example of the many different alternative commercial buildings (Comps) that a commercial tenant may choose between when considering a new lease or renegotiating an old lease.

Thus although at present, a company contemplating lease alternatives may know that in principle, there are many potentially available alternatives, shown in FIG. 6, this lack of transparency hinders optimization efforts.

For example, by using prior art methods, a corporation may purchase commercially available listing information from vendors such as CoStar, Loopnet, or perhaps even an MLS system, but because of the nonhomogeneous nature of real estate, it is very difficult to accurately compare the true cost of alternative locations. In particular corporate CFOs, who are more accustomed to electronic stock markets and other financial markets which create a near "perfect market" for that same company's stock and financial interests, are generally ill equipped to deal with the very "imperfect market" that exists for typical real estate market comparison. This is further compounded by the individuality of each corporation's real estate needs, and further compounded by the differing needs of different corporate business units.

For example, a beverage company will have different needs for their offices for its sales teams, as opposed to its manufacturing plant, as opposed to its warehouse/distribution facility. Even two corporate uses of the same type, e.g. offices for a law firm, will invariably have differences, large and small, between, for example, a New York office and a Chicago office or a Memphis office. Further, the vagaries of each individual marketplace and each individual landlord and the permutation of possible suitable locations further compound the problem.

Because the real estate leasing market is an imperfect market, where every building is different (that is the buildings are non-homogeneous), at present, there is no standard defined way to match customer needs to properties. One important invention function is to replace this present opaque, unsatisfactory and non-standardized state of affairs with a system that is both more transparent and more standardized.

According to the invention, the commercial real estate leasing market can be further optimized or perfected by seeking client input using Key Site Drivers (KSD). Key Site Drivers include characteristics such as aesthetics, signage, floor layout, amenities such as gyms and auditoriums, proximity to daycare, restaurants, airports, rail depots, or interstate highways, commuting distance to major cities, as well as ease of expansion, price, and the like. The basic approach is to have each client both choose their KSD, and also weigh their KSD so that all factors, including price, together achieve a collective weight of 100% of the decision. Once this is done, typically all Comps that meet the client's needs are then found and pre-scored by the broker or brokers according to the client's particular KSD. After this data is entered into the system, the system presents the scored Comps back to the client. On could think of this KSD Score as something similar to a FICO score. It serves as a very strong foundation for making a decision, but may not be the only factor considered.

Put alternatively, the Invention's KSD method can be viewed as being a computerized method of comparing the suitability of a real estate first property to an ideal real estate property and to at least one other property, by using Key Site Drivers (KSD). These Key Site Drivers describe the characteristics of the first property and at least one other property. The method will usually involve defining a plurality of KSD variables for an ideal version of the property, and also defining the relative importance coefficients for each individual KSD variable in this plurality of KSD variables. The net result is to create a KSD function that produces a KSD number. Here, to enforce some discipline (i.e. prevent everyone giving a very high rating to every variable), the sum of all of the relative importance coefficients of this plurality of KSD variables is set to be equal to 100% or 1. The method then generally has the users assign values to each of the KSD variables that describe the first property and the at least one other property. The method further involves using this KSD function to compute the KSD numbers that describe the first property and the at least one other property. The system will then compare the KSD numbers from the first property or ideal property with the at least one other property, thus producing at least one suitability rating. The system will then display data pertaining to the at least one suitability rating on a display screen of a computerized device (e.g. computer, smart phone iPad, etc.). Note that although this disclosure generally uses the KSD ratings for lease management, in fact the invention's KSD ratings are generally applicable to other real estate transactions, such as standard buying-selling situations as well.

A flow chart showing the basic principles behind the KSD rating system is shown in FIG. 7.

Figure 7A:
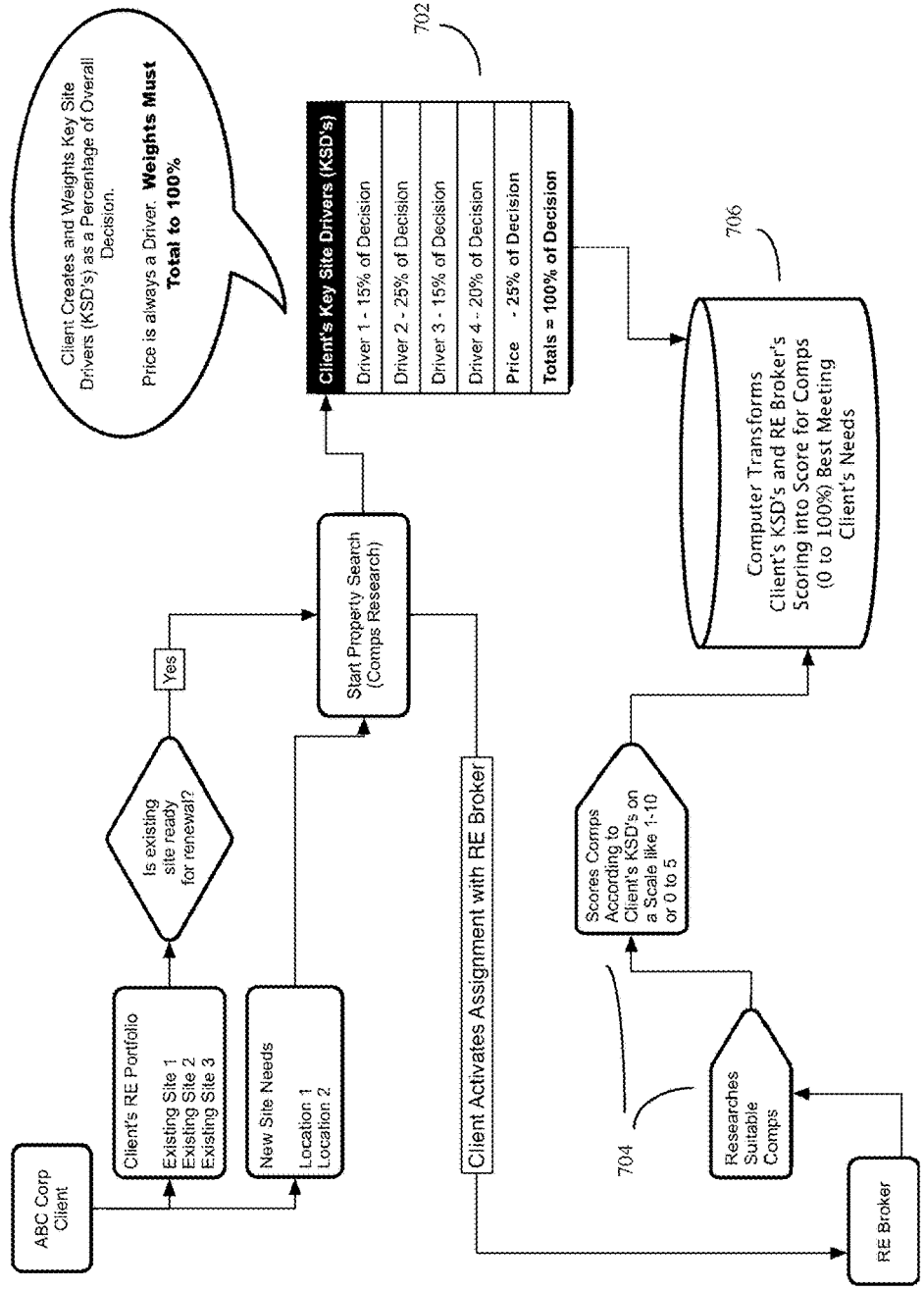
FIG. 7A gives an example of some of the various Key Site Drivers (e.g. building location and various building properties) and a computerized algorithm by which a commercial tenant and a broker can use to comparatively evaluate different alternative commercial buildings.

Note that although the KSD rating system makes the various criteria for making Site decisions more transparent, the system does have to not totally replace human judgment. Therefore, the system may allow the human client, to take the KSD score into consideration, but to optionally then rank or segment the choices according to a "Suitability Ranking" with a scale (e.g. A, B, C, & D) or other type scale. This option is shown in FIG. 7B.

The system may optionally auto-generate the Suitability Ranking (A, B, C & D) by allowing the user to assign a certain level of KSD score to automatically have a certain Suitability Rank, for example, a KSD score of 90 or more could equal a Suitability Rank of "A", while 80 to 89 would equal a "B", and so on.

The client may use either the KSD's and/or the Suitability Ranking to quickly filter their list of choices from many to the best few. Thus, the system will allow the client to utilize the Perato Principle (a/k/a 80-20 Rule) to focus 80% of their energy on the top 20% of the alternative Comps.

Client input as to what specific KSD drivers are most important, and the relative weighting to each driver, is required (702). Note that although price is certainly a very important KSD driver, it is not all-important. If it were, all corporations would be located in run-down warehouses in the bad part of town—instead other factors, including corporate image (reflected in perhaps a KSD of aesthetics), proximity to key cities, customers, or suppliers (location KSD drivers), building features (e.g. ability to have a gym, restaurant, manufacturing floor, clean room, or whatever), and many other variables all pour into the KSD rating. The system then utilizes this client driven input and transforms that into a score that readily shows the client which Comps best fit their needs.

In order to facilitate the process, a broker contemplating making use of the invention may often create a list of most frequently requested customer KSD, and pre-rate various Comps in a location so as to have this KSD information available to the corporate client when needed. Alternatively or additionally, when a corporate client, possibly using the system, determines that it wants to actively start optimizing a particular lease or leases, brokers using the invention can go out and rate various potentially suitable Comps according to client selected KSD, and enter these results into the system (704). These can then be entered into the system database (706) and further transformed or scored according to the client selected KSD, and the broker's initial KSD score rating. Note that because the process is transparent, a broker tempted to give inaccurate KSD ratings to please a particular landlord will often soon be detected because, in context, the aberrant Comp's KSD rating can be detected by the corporate client and adjusted as appropriate.

At the same time, again due to the inventions more transparent rating process, corporate committee decision making can also be expedited.

Figure 7C:
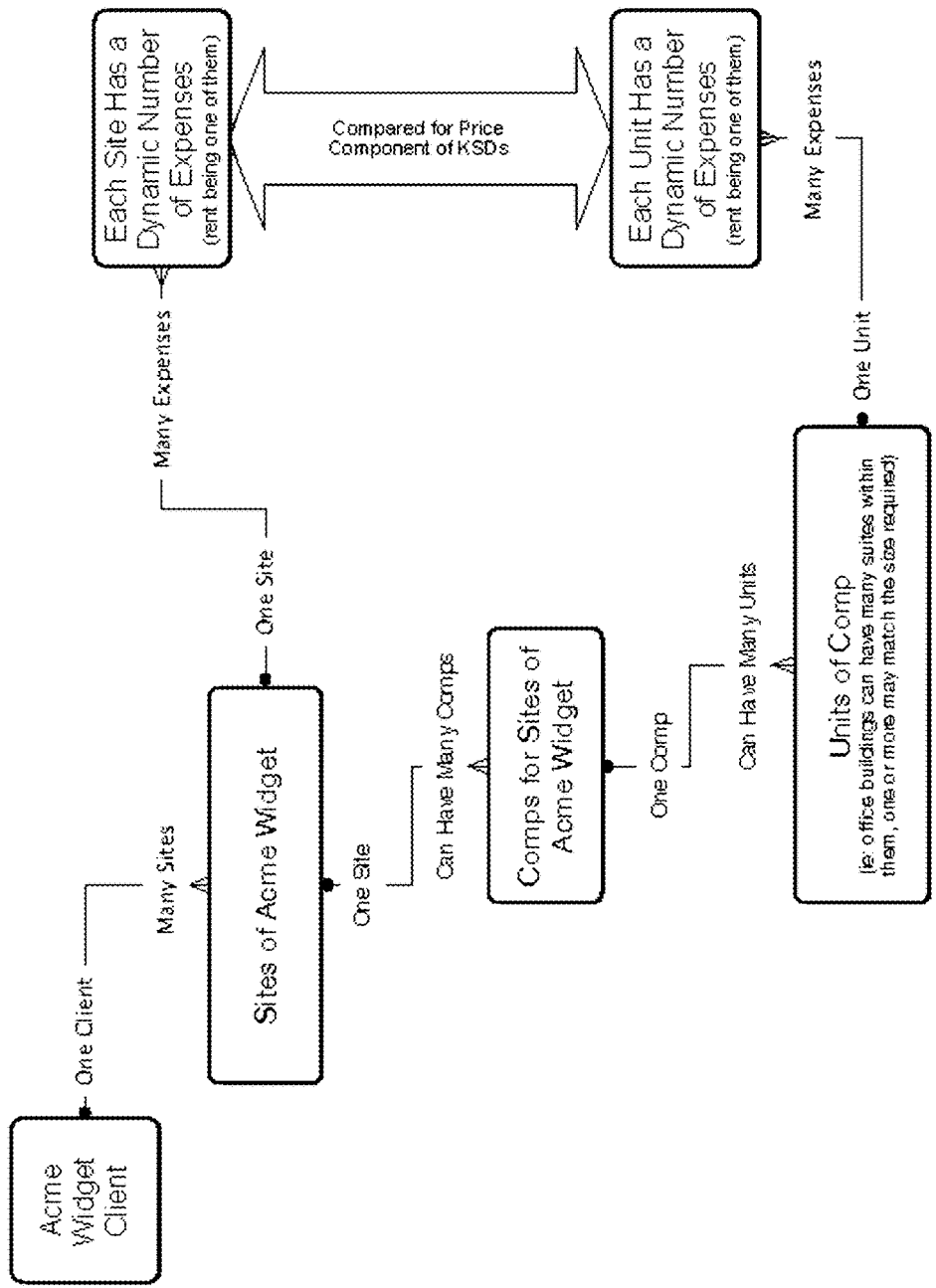
FIG. 7C shows how Price, as one factor that is part of the Key Site Drivers, is compared on a very granular level. This price comparison becomes part of the Key Site Drivers.

One special KSD variable is price. Price is special because often clients will like to evaluate properties both with, and without price comparisons, thus often producing two different KSD numbers for a given Site. FIG. 7C shows how Price, as one factor that is a part of the Key Site Drivers, can computed on a very detailed (e.g. granular) level, and thus become part of the KSD for a given Site as well.

Figure 7D:
FIG. 7D shows an example of radio-button based computer graphics interface by which a commercial client or a broker may use to enter their assessment of various Key Site Drivers, as well as the relative weight to be associated with the various Key Site Drivers.
Figure 7E:
FIG. 7E shows an example of a slider based computer graphics interface by which a commercial client or a broker may use to enter their assessment of various Key Site Drivers, as well as the relative weight to be associated with the various Key Site Drivers.

This KSD data can be entered into the system in various ways. For example, one way is by using mouse or touch-screen entered radio buttons on a graphical user interface, as shown in FIG. 7D. An alternative method is to utilize alternative graphical schemes, such as mouse or touch-screen controlled sliders, as shown in FIG. 7E. Still other methods, including direct keypad text or numeric input of the KSD values, are also quite feasible.

Thus, rather than have the various criteria for making Site decisions being locked up in the broker's mind, non-transparent, and not clearly open to challenge or revision by the client, the invention makes these criteria explicit. The system in effect first invites the broker to make as an objective a ranking of multiple potential alternative lease or sale locations ("Comps" within the system) according to the client KSD, and enter this data into the system. The client decision making process is also made more transparent as well, which is important in a corporate setting, where often a committee will be involved in the ultimate decision making process.

Figure 24:
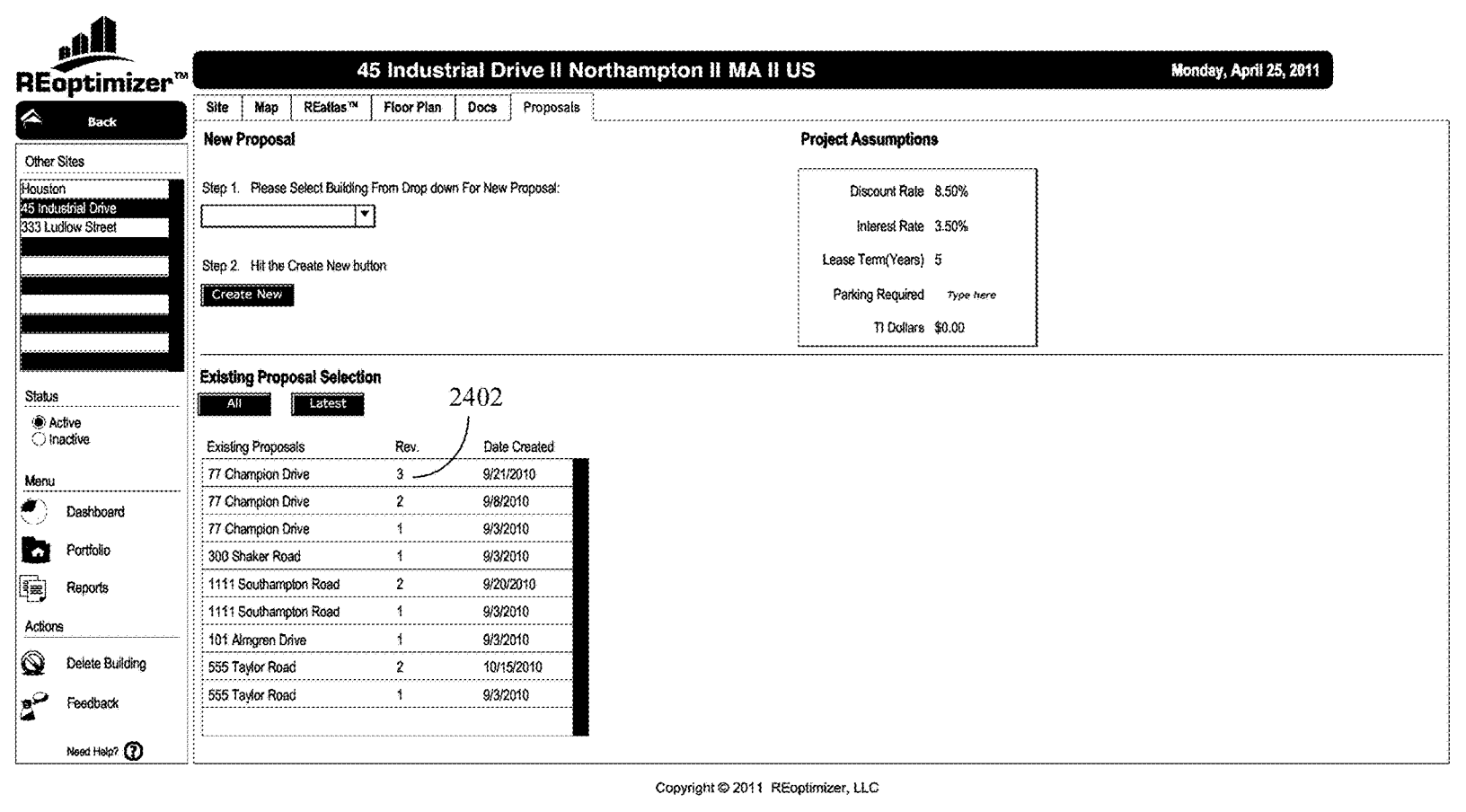
Figure 25:
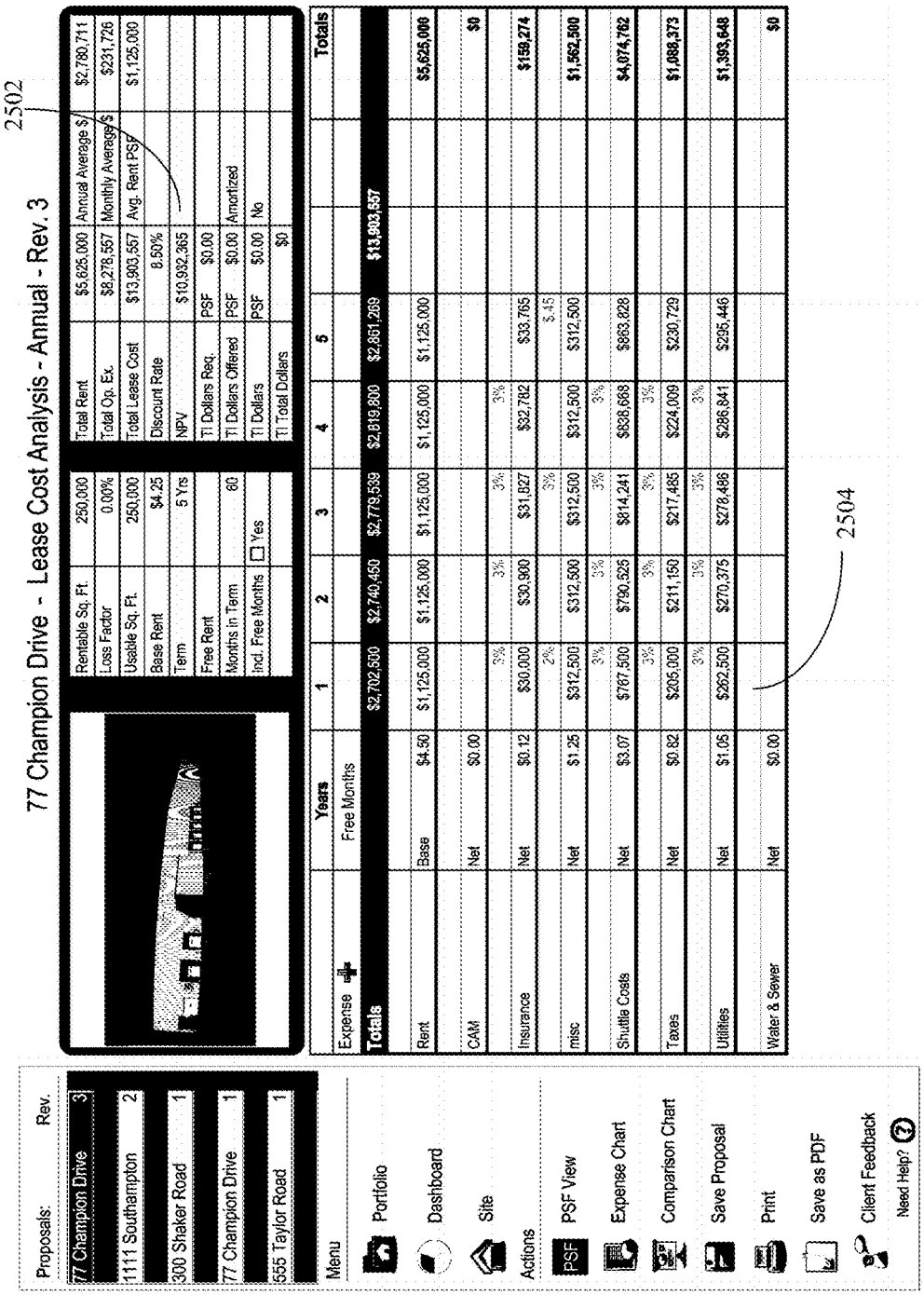
FIG. 25 shows how the system can handle a dynamic number of different lease costs per proposal.
Figure 26:
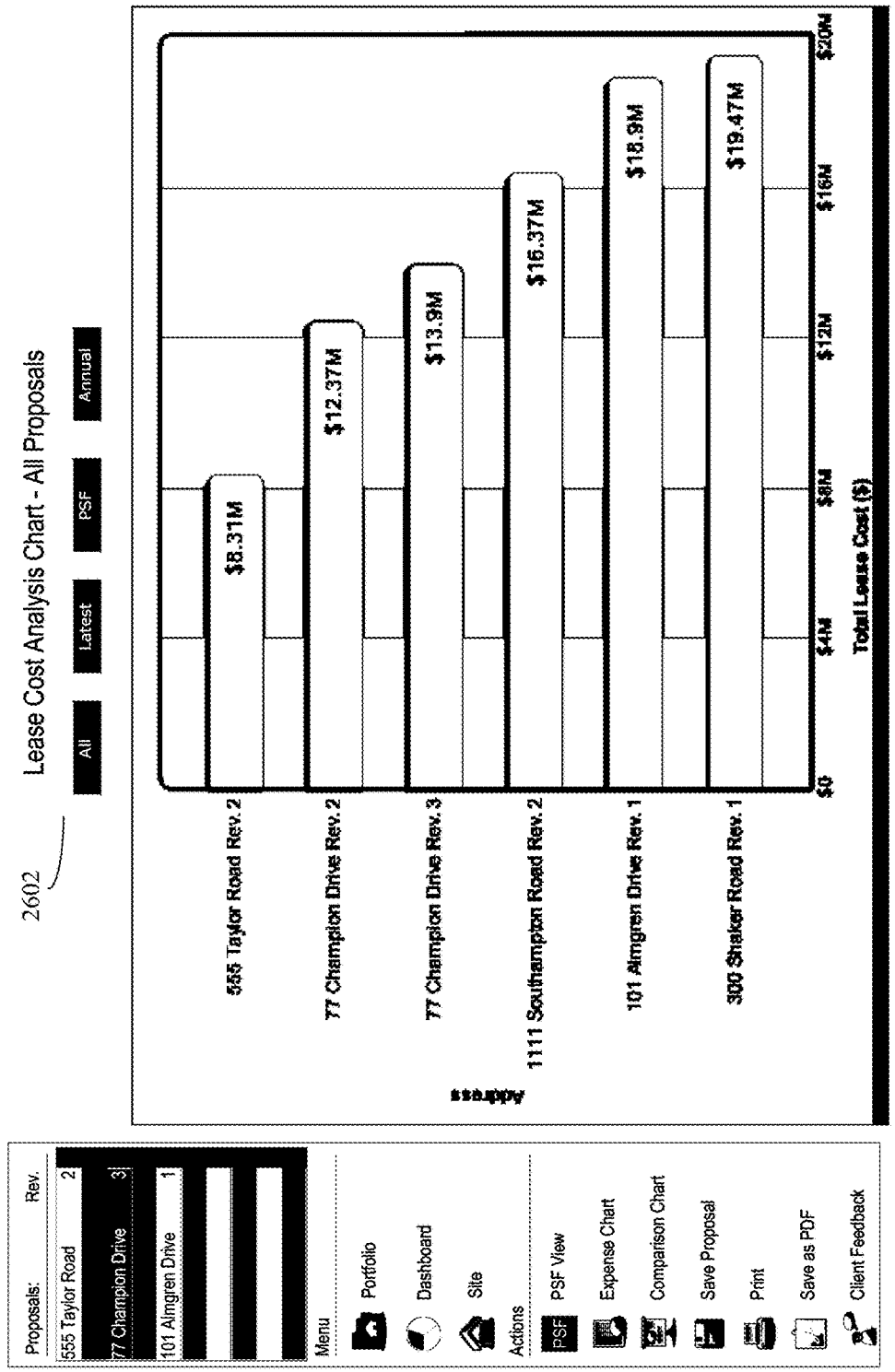
FIG. 26 shows how the system can be set to either compare all the proposals obtained from the owners of the different Comps (e.g. proposals submitted by bidders for the client's tenancy), or alternatively will compare just the latest (highest revision number) proposal from the managers or owners of the different Comps.

Typically the user's real estate broker will then seek proposals from the client's top choices, such as the "A" choices, and this proposal data will then be entered into the system by the user, the broker, or even by the Comp owners/managers/brokers making the proposals. This process of entering in proposals is shown in FIGS. 24, 25 and 26, and this proposal entry process will be discussed in more detail later.

The client can then use the system to compare financial projections on the choices that most meet the client's needs, as expressed by the KSD system. The process of entering in the detailed financial data will also be discussed in more detail shortly.

Although in some embodiments, the system may be a single user system, often in other embodiments, the system may have multi-user ability, and may be deployed over multiple computerized devices by various types of networks. This network embodiment is particularly important when handling a complex, multi-million dollar lease (as most corporate leases are). This is because large, sophisticated and perhaps global clients typically make these large decisions by committee. The system will allow multiple users to access the same Site and Comp information, simultaneously. The data may be stored by various means, including remote Internet server "Cloud Based Computing". This gives each user the same "seat" at the information table, e.g. same access to data. Thus users using portable devices such as tablet computers and PDA devices may also access the system from remote locations. Often in this embodiment, the system may be accessed via direct Internet connection, WiFi or 3G and 4G wireless, and any and all technologies now and in the future that will allow a user to access Internet based information.

This system may include detailed information on each Site or Comp, plus photos, video, linked photos and videos to such sources as YouTube, Vimeo, Facebook, and any other Internet based photo or video storage, proprietary mapping technology called REAtlas™, and any other Internet based mapping technology such as Google Maps, Google Earth, Bing Maps and Yahoo Maps. Even Site plans, floor plans, documents, proposals and furthermore, financial analysis of those proposals, may optionally be stored in this Cloud Based Computing system as well. The net effect is to free users from having to store data locally and allowing for secure, multi-user access to the information.

Figure 8:
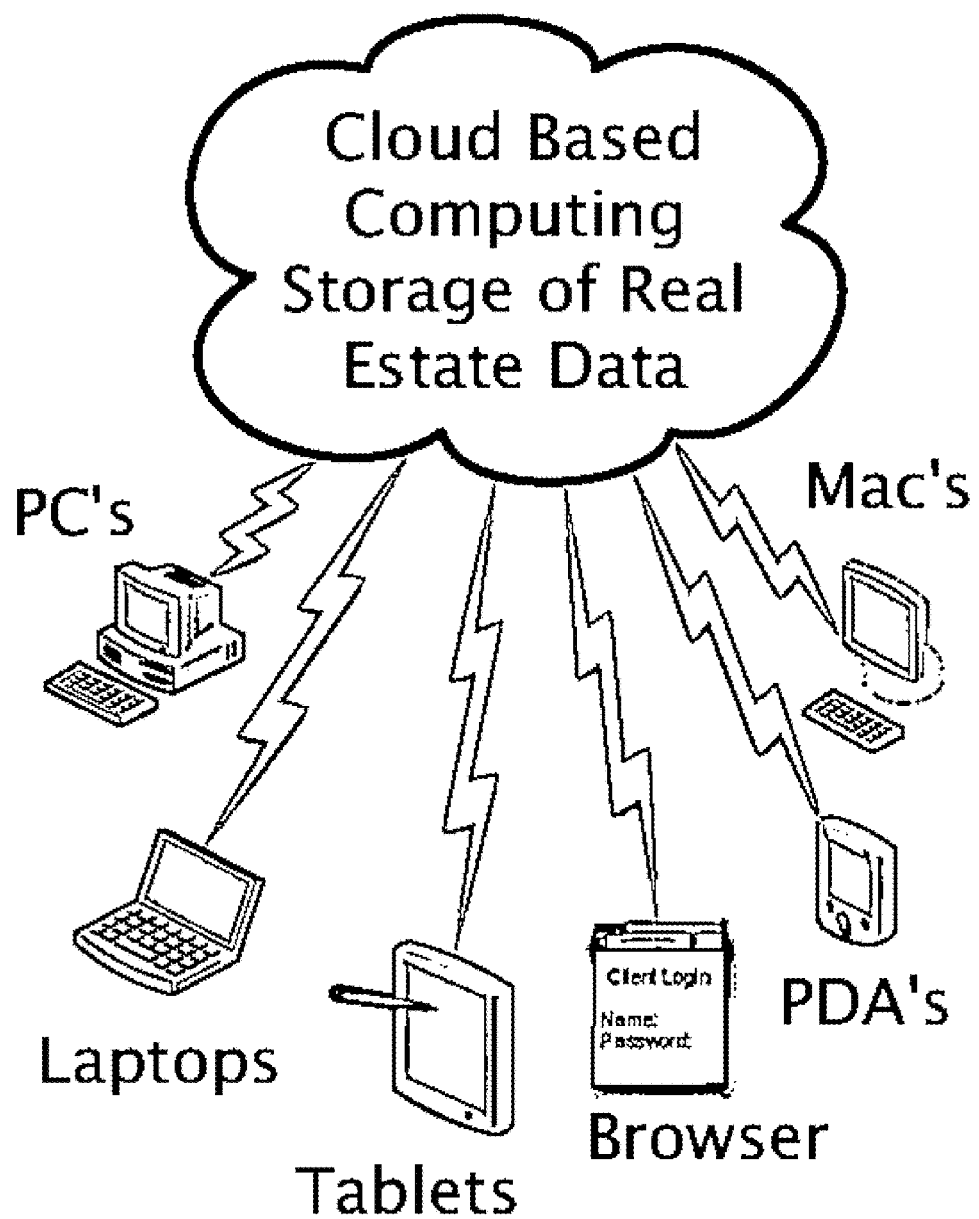
FIG. 8 shows how the system may employ "Cloud Based Computing" for the warehousing of key real estate data on both Sites and Comps to allow the end-user to access the data from many different computerized devices, and using many different access methods.

FIG. 8 shows a diagram of this cloud based computing approach.

The sources of market intelligence (intel) that can be used to provide data for the system include web based sources such as LoopNet, CoStar, and Property Shark, data from various landlords such as landlord websites or direct calls to landlords, or information from the landlord's brokers (either broker websites that may list exclusive properties, or direct calls to brokers).

As previously discussed, although the invention is useful in all types of markets, it is particularly useful in declining markets. Again, as previously discussed, for a long-term lease, there are advantages to both tenant and landlord to consider early renewal (e.g. renegotiating the final years of a lease, and/or renegotiating the final years of a lease in conjunction with a lease extension for additional years). From the tenant perspective, doing an early renewal can save a significant amount of money. It can also lock in a lower lease rate for a period of time. The net result is improved tenant profits, and additionally such arrangements are favored under the proposed new FASB rules for lease accounting.

As previously discussed, from the landlord side, there are some advantages as well. Early renewal can avoid costly vacancies that can otherwise occur when a tenant moves out at the end of a lease term. Early renewal can also reduce or eliminate the costly rebuilding of space for a new tenant that might otherwise occur. As a result, there will be no lost revenue during the re-leasing period, lower renewal commissions to brokers, and also lower refinance rates.

Figure 9:
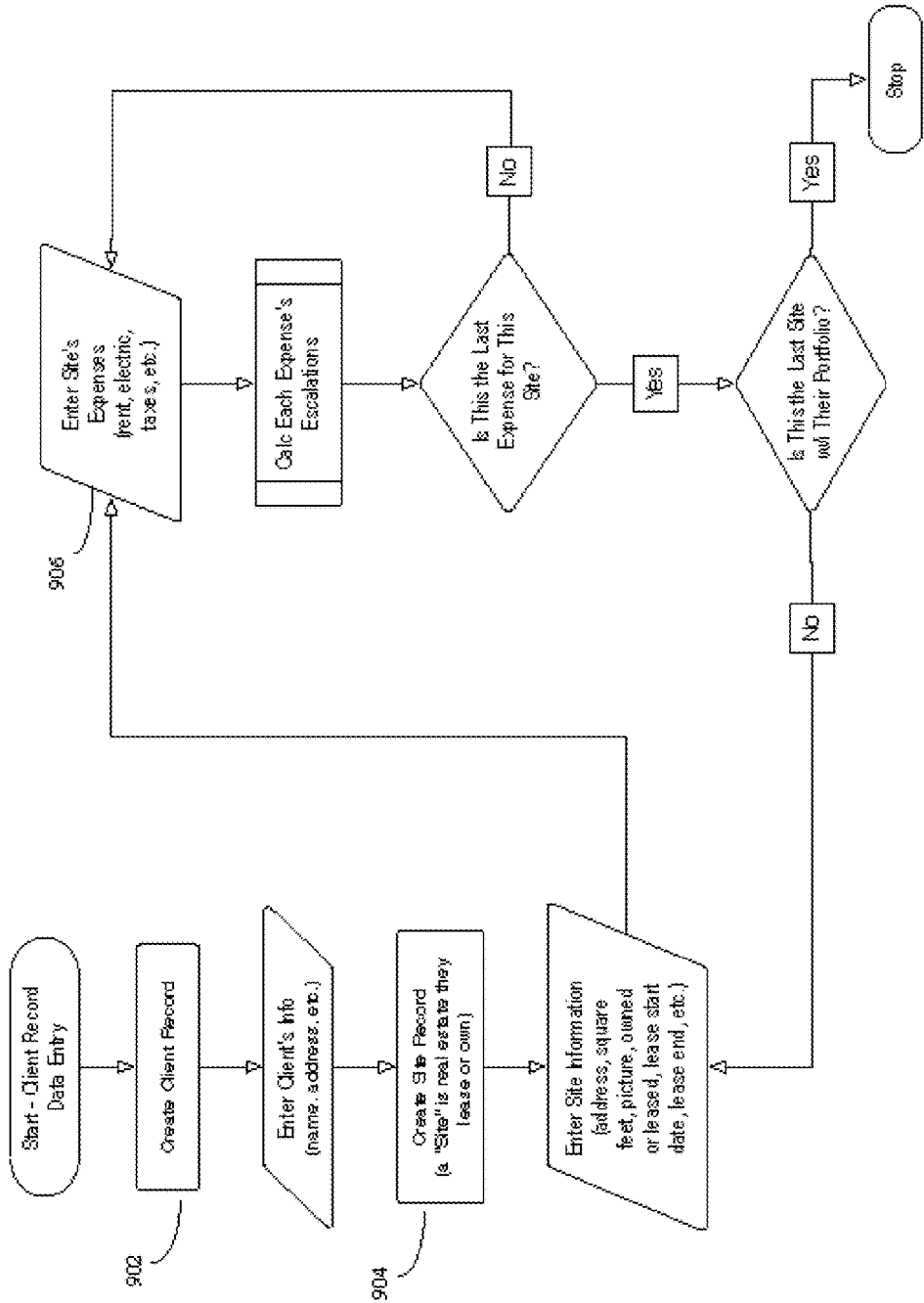
FIG. 9 shows a high-level flowchart for the initial setup for a client. Here the client's company record is established and then their Sites are entered. Of course, once the client's record is within the system, the system user may come back at any time and add more Sites to the client's record, delete them or modify them. The expenses associated with each Site are entered here also.

In use, users will generally first create a client record, then create a Site record for each Site within that client's portfolio, and input each Site's financial data such as the Site's expenses (further explained below), as shown in FIG. 9.

The system will then calculate costs, over the lease term, for each lease expense. The user will then input project preferences for potential new leases, information on Comps will be entered into the system from brokers or other sources. The system will then match suitable Comps to the Sites, and benchmark these matches.

The company record (902) will often include details such as the company name, headquarters address, client team members, as well as the team member contact information and potentially access level if various levels of security are involved. The Site record (904) will typically contain data such as the Site address, square footage, number of floors, year built, loss factor, parking ratio, number of reserved/unreserved parking spots, square foot per employee, ideal square foot per employee, NPV discount rate, building type, number of employees (contract and full time), and lease information such as the lease start date, lease term, and the number of months of free rent, if any.

In order to provide for accurate financial calculations, needed for calculations such as those in FIG. 5, the system will also request input on Site expenses such as the number of free months, type of expense, notes, start date, start amount, expense payment frequency, if the expense is a pass-through expense or not, and any contractual price increases (escalations) built into the lease. Per standard real estate methods, the various expenses are often entered on the bases of one-time expenses, annual expenses, per square foot expenses (often expressed in annual terms), quarterly expenses, and monthly expenses and so on, and the system will perform the appropriate financial calculations.

The basic approach behind the invention's method of optimizing a real estate lease portfolio relative to at least one set of comparable potential leases (Comp[s]). The real estate lease portfolio here will generally contain at least one existing leased property (though a typical real estate portfolio for a large corporation will contain anywhere from a dozen properties to hundreds of properties—even thousands of properties). Each leased property in the portfolio will generally have a location, lease start date, lease expiration date, rent (that may vary as function of time), and projected other property expenses (which may also vary as a function of time). Generally, even if they are not being actively studied at any given time, each individual leased property in the portfolio will have its own associated set of Comps. That is, if the leased property is a warehouse, then it's associated Comps will generally be similar type warehouses in that location, or other location of interest. If the lease property is an office building, then it's associated Comps will generally be similar type office buildings in that location, or other location of interest. Usually, of course, the system will often keep track of the suitable associated Comps for each lease in a way that does not, for example, generate a lot of useless comparisons, such as showing warehouse Comps for a leased office building, and so on.

Figure 10:
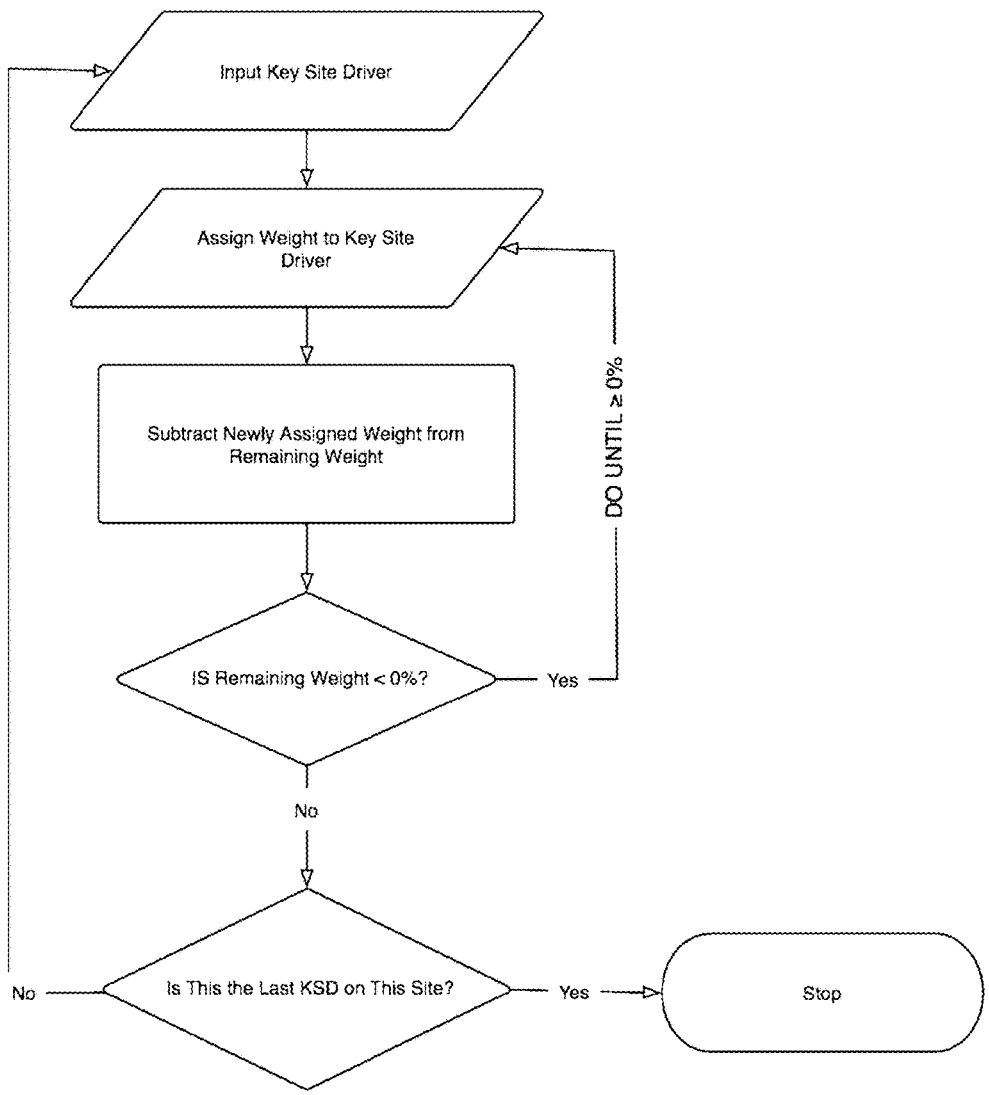
FIG. 10 shows a high-level flowchart of data input needed for the KSD calculation and the subsequent KSD calculation. Note that the KSD's can be applied to Sites, Comps, or preferably both.

As previously discussed, to further ensure that the system does not waste its time or the user's time on unsuitable Comp analysis, in some embodiments the system will also rank the leased property and the Comp property by various Key Site Drivers, and use numeric data from a Key Site Driver function to further restrict which Comps are being analyzed. As a reminder of this Key Site Driver method of filtering the range of Comps under consideration, an outline of the Key Site Driver approach is shown in FIG. 10.

For the financial analysis, the method will generally comprise projecting future expenses, on an individual property basis, for at least one leased property in the portfolio. It will do this by performing a numeric integration over time, usually from the present time, and often extend to the expiration of the leased property lease of interest. The system will sum up over time (often by summing monthly expenses) the sum of both the leased property rent as a function of time, and projected other leased property expenses as a function of time, and produce at least one individual leased property projected total cost. So this would represent how much the user would pay if he or she does nothing.

To show the advantages of taking action, perhaps to begin doing early lease negotiations, the system will show how much could potentially be saved (or alternatively compute excess expenses) for the various Comps under consideration. To do this, at least for the Comps under consideration, then for each individual Comp in that leased' properties associated set of Comps, similar type data describing the Comp location, lease start date, lease expiration date, rent as a function of time, and projected other expenses as a function of time will be entered into the system.

The system will then project future expenses for each individual Comp (under consideration) in the associated set of Comps by performing similar type numeric integration over time, starting from the present time (i.e. the time the comparison is run) to the leased property lease expiration date. However in some situations, of course the system may be set to continue these calculations out to the termination of the Comp lease as well. As before, the Comp expenses that are numerically integrated will be the sum of the Comp rent as a function of time, and the projected other Comp expenses as a function of time. This allows the system to produce an individual Comp's projected total cost over the period of time from the present to the Sites' lease expiration date. This cost often will represent the potential savings if the leaseholder could instantly terminate his or her lease and instantly start leasing in the Comp instead. This information is empowering when negotiating with the current landlord.

The system will then make this comparison easy for the user to understand by generally displaying, at the same time and on the same computerized device display screen, this data pertaining to both the at least one leased property, data on the at least one individual Comp in the associated set of Comps; and data pertaining to the difference between the leased property projected total cost and the Comp projected total cost(s). This comparison can be done in many ways, including showing the difference between the lease projected total costs and the Comp projected total costs, showing the two side by side, various graphical displays, and so on. Some of examples of this type of output will be shown in FIG. 14D and elsewhere.

Figure 11:
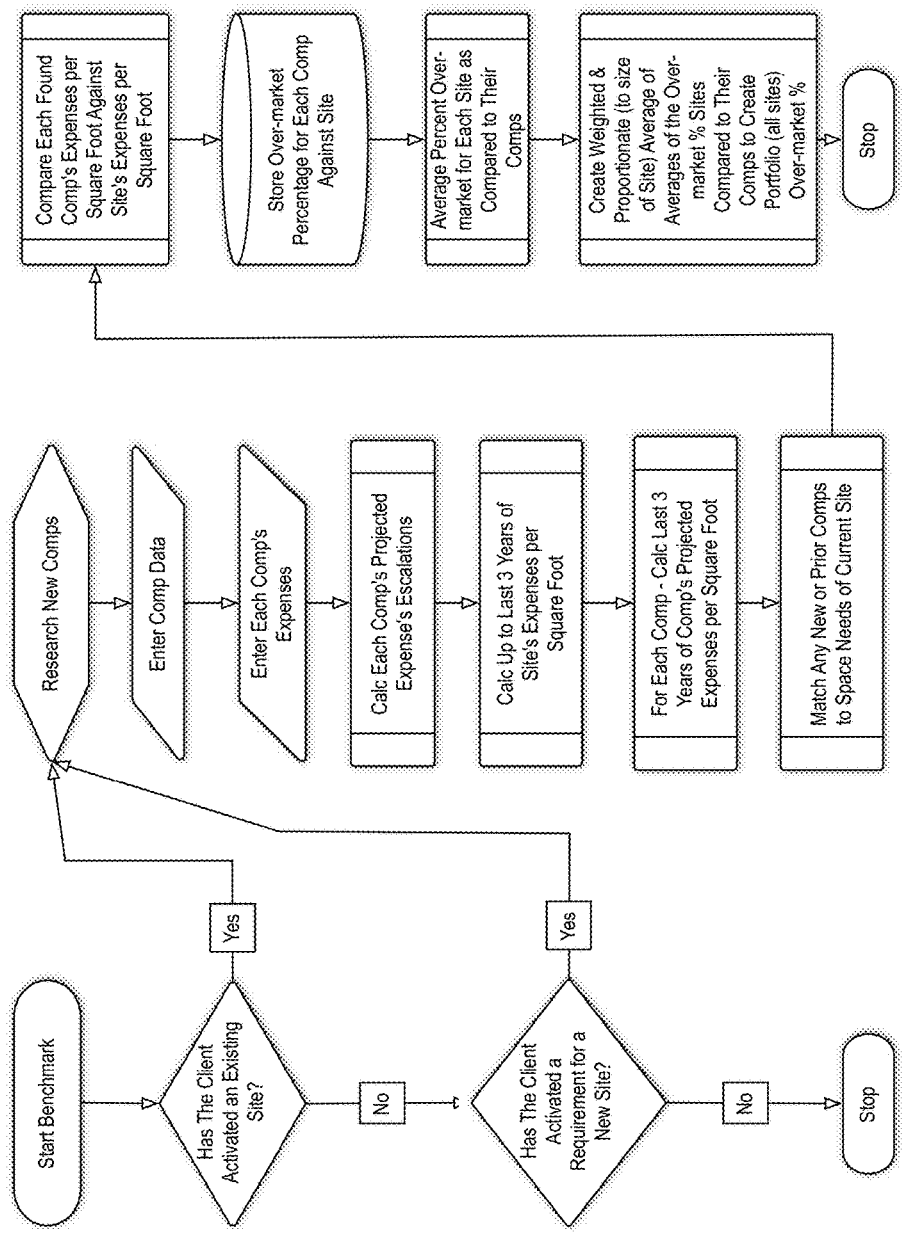
FIG. 11 provides a more detailed software flowchart of the invention's computerized benchmarking to market method. This compares Site costs to the cost of alternative locations, i.e. Comps. This produces a value similar to the area between the curves in FIG. 5. This is a numeric integral of the differences in projected costs between the company's inelastic present lease, and what a market rate comparable would be based on current market conditions.

A flow chart of this process is shown in FIG. 11.

For these calculations, the client will often enter in the client's new project preferences, such as the new lease term, square footage variance from the present lease (i.e.: +/−10%), square footage required, and estimated price escalation for a potential new lease. This step may also include client input as to custom designs or remodeling that may be required to upgrade the potential new location to meet the client's needs. This is typically estimated at a $ per square foot allowance, provided by the landlord, to renovated the space for the tenant's usage. Often sophisticated corporate tenants like insurance companies or banks will know in advance how much their standard re-configuration of space typically costs a landlord. Thus, they will request such allowance in advance and want to know what allowance a Comp will be offering them. This information currently does not existing in any commercial listing system such as CoStar or LoopNet, yet it can significantly impact the overall cost of any particular Comp. The invention does take this into account.

Information regarding Comps is gathered by a qualified licensee of the system. This is typically a commercial real estate broker who specializes in representing corporate tenants, but it can be any trained licensee of the system. This information can include information such as the total rent of the comparable, available square footage, expenses, price, tenant improvement money available, and, if a sublease is contemplated, items such as the master tenant, agent name and contact information.

In FIG. 11, at step (916), a series of matching steps are done in which various Comps are compared to the tenant's current Site. This can be done by a standard database retrieval in which data representing potential Comps in a suitable location, submarket, space variant and class are found, and the relevant records are returned and use for an optional benchmarking process. In a nutshell, FIG. 11 performs the math calculations needed to accurately compute potential savings, as shown in FIG. 5. As previously discussed, this essentially corresponds to a numeric integration, over time, of the difference between the sum of the costs between the existing Site and the potential new Comp.

Figure 19:
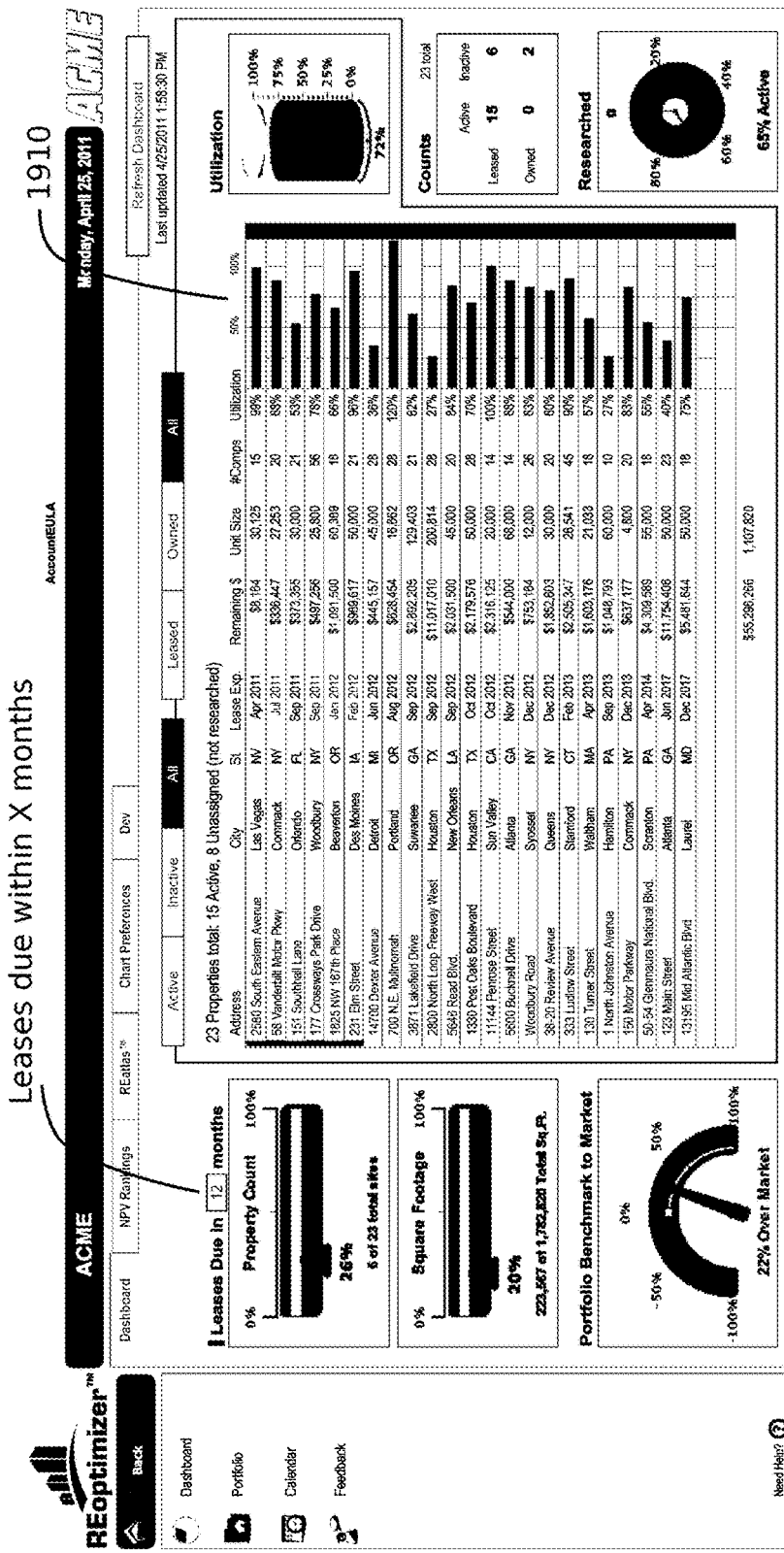
FIG. 19 shows an example of the invention's Portfolio Dashboard, by which a manager of a large company, having multiple real estate holdings, may evaluate the companies' complete portfolio of different leases and/or owned facilities at a glance. Often this display may show key indicators in color.

The system repeats this benchmarking process for each Site the client has chosen to "activate" for this thorough research and due-diligence process. The licensee gathers the Comps for each activated Site and the system the compares each Site against its Comps to create an "Over-market" percentage, FIG. 14E. One Site many have 30, 40 or even 50 Comps to compare against. The system will take care of the intense calculations to compare all these Comps against that one Site. Furthermore, a client may activate 30, 40, 50 or even potentially 100's of Sites for comparison. Whatever Sites the client chooses to activate for this full and intense due-diligence, they will be compared against their relative, researched Comps. The system will then generate an Over-market Percentage for each individual Site, FIG. 14E, as well as the clients overall real estate portfolio, FIG. 19, for the Sites the client has chosen to research. Understanding this, one can readily see how near impossible it is for a client with a large portfolio of Sites to do this intensive research and benchmarking on their own or even with a staff of people. Yet, this system pulls all this crucial, money saving (multi-million dollar money saving) information together on one, neat, easy to read Portfolio Dashboard, as seen in FIG. 19, for the C-suite or Director of Real Estate for the client. The utility of this cannot be overstated. In the words of the famous management guru, Peter Drucker, "What's measured is managed."

As previously discussed, in order for the system to function properly, it is important to correctly enter in the Site expense data. Such data can include information such as the base monthly, annual, and per square foot (PSF) costs for the selected Site, along with individual totals for each expense. Such PSF expenses can include expenses such as taxes, rent, electricity fees, management fees, CAM fees, cleaning fees, repair fees, insurance fees, and water fees.

Figure 12:
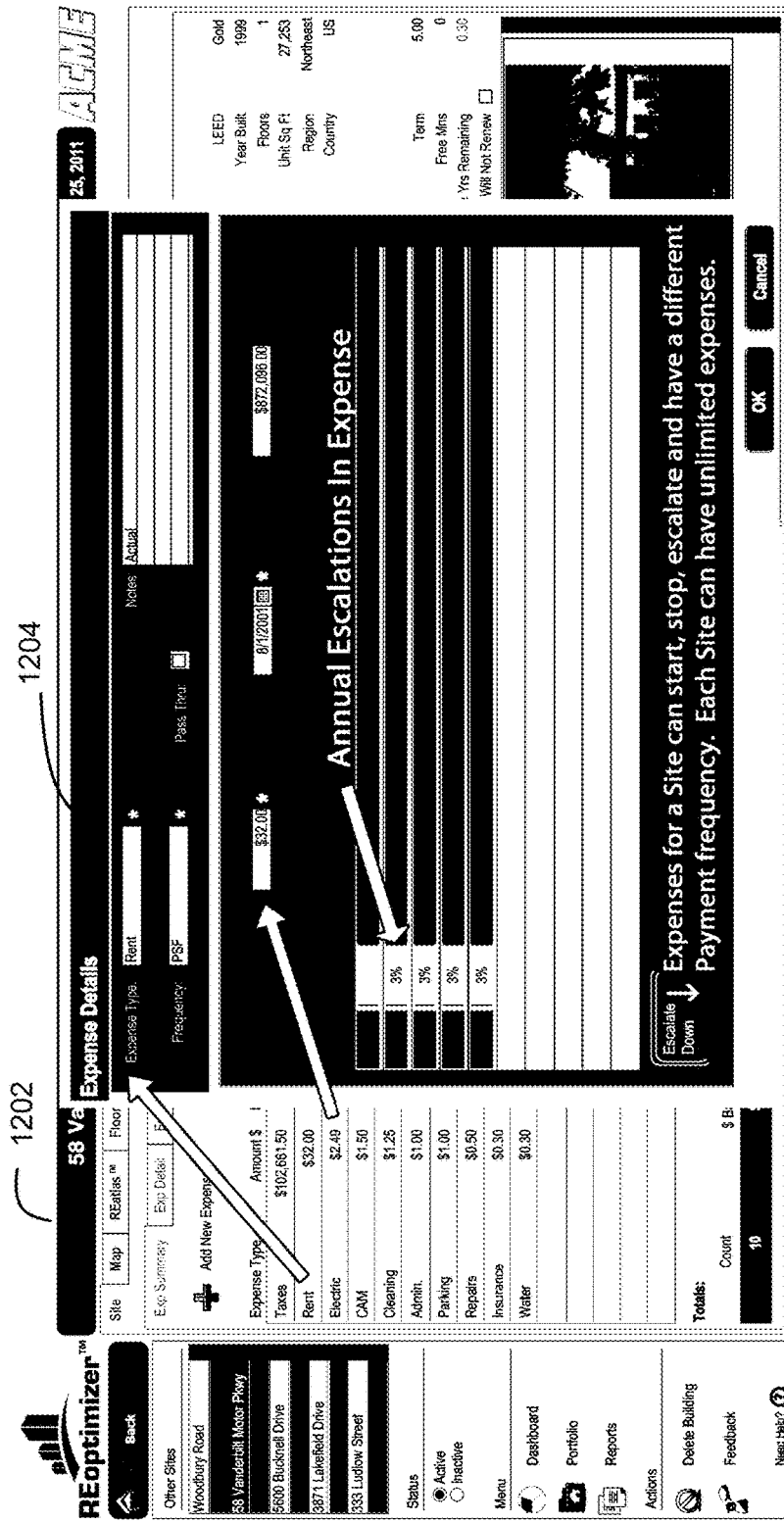
FIG. 12 shows the graphical user interface of the system's screen, showing how a user can enter in various lease expense types, actual expense amounts, and payment schedule, and the system will then automatically calculate projected costs and cost increases in these expenses (escalations) throughout the duration of the lease, following the methods of FIG. 10.
Figure 13:
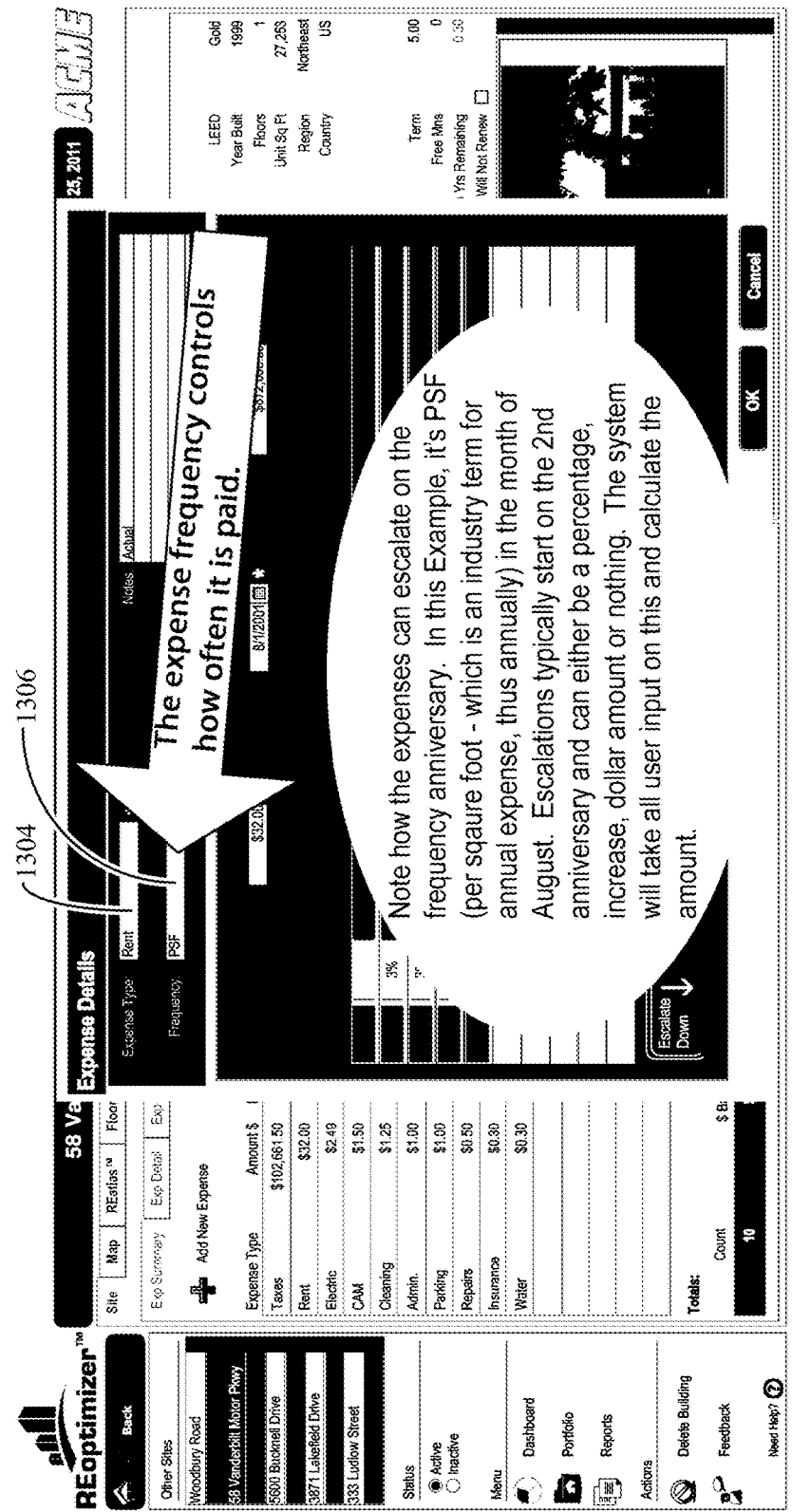
FIG. 13 shows how expense details may be entered into the system.

The system is interactive, so that the user may enter in new data or refine existing data at any time. For example, FIGS. 12 and 13 shows the user interface that may be displayed when the user is examining a particular Site in more detail (1202). The user may use the graphical user interface to click on a region that displays a particular expense item in more detail (1204), and allow the user to instruct the system to compute the changes in this expense over time.

As FIG. 13 shows, each expense item (1304) may be further determined to have an expense frequency (1306) that controls how often that particular expense is paid (e.g. per square foot [used in the industry as an alternate type of annual payment], monthly, quarterly, annually, semi-annually, one-time and so on). The expense frequency controls how often it is paid. This expense can escalate on the anniversary of that particular frequency. Thus the expense can escalate on the frequency anniversary. In the example in FIG. 13, the expense is PSF (per square foot, which is an industry term for annual expense thus annually) in the month of August. Escalations typically start on the $2^{nd}$ anniversary and can either be a percentage increase, dollar amount, or nothing. The system can even escalate negatively (decreasing the expense) to allow for a projected cost reduction such as a tax certiorari proceeding that has lowered the annual taxes. The system will take all user input on this and calculate the amount.

In some embodiments, the system may also include various expense charts, such as pie charts, to allow the manager to see at a glance where too much money is being spent.

In order to bring discipline to the process, as previously discussed the system will often contain a filter so that only related Comps, that is Comps that meet certain KSD matching criteria and/or the Suitability Ranking, may be displayed. This avoids wasting the viewer's time with many inappropriate comparisons.

The KSD data pertaining to the customer's existing or "old" Site is input. This information will generally consist of the various names of the KSD along with the relative weight that the client wishes to put on each different KSD name. The main constraint here is that the sum of all the different KSD weights must equal 100% or 1. The tenant's present Site KSD can be compared to the KSD rating of the Comps. This allows the client to clearly see if a new location may offer greater utility as well as "bang for the buck".

Many different comparison schemes may be used, including numeric comparison schemes, but in this particular embodiment, base 100 system, so that a perfect building equals 100 has been used. Interestingly, the client can selectively choose to toggle the Price Factor on or off, and the system will intelligently recalculate the remaining KSD factors to a new base 100. This allows the client to see how the different Comps compare against each other and their existing Site, with or without regard to price (answering the old "price notwithstanding, would I buy this or that.").

The KSD's may be entered by a broker, licensee of the system or by any qualified source may potentially be used, inclusive of the client. This greatly enhances transparency between the client and the real estate professionals who serve them. Plus, everyone is now on the same page, instead of in their own minds viewing either the existing Site or alternative Comps differently. The licensee, real estate professional, who is assisting a client, greatly benefits too. Now, they don't have to be telepathic. They know with absolute surety how their client views all the alternatives.

What's significant about the KSD system is that they can and will differ from client to client, depending upon each client's needs. The system thus adapts to the client. Different KSD's may even be implemented for different Sites within one client's portfolio. For illustration, some common KSD's though are: signage, presence of a gym, aesthetic rating, proximity to airports or outside transportation, layout, storage, restaurants, commuting time to major cities, auditoriums, manufacturing floor space, and the like. This said, the KSD system is truly dynamic in that it can be whatever factors, at whatever weighting, the client deems appropriate for any particular Site within their portfolio, so long as all the factors added up make up exactly 100% of the decision. This, "build it your own", ranking system is as unique as it is powerful.

When a building lease is about to expire, the system may generate a prompt inviting the user to change the building's lease status to an active project status. By changing a Site from an inactive to an active status, the licensee of the system is notified and then begins researching potential Comps to meet the user's criteria. At any time, the manger may cancel previous work by changing the Site status back to inactive. Active Sites may also be shown in the "Active Sites" portion of the portfolio.

If price were no object, then everyone would be in the finest buildings possible, but of course price is itself a very important KSD. To allow corporate users to better appreciate the impact of price on the suggested appropriate Comps, the system will often allow the overall KSD rating to be computed in two different ways, with and without price. As a result, what might otherwise be a perfect Comp might in fact get downgraded due to higher projected expenses.

The system has at least two different dashboards by which to evaluate real estate lease portfolios. The Site Dashboard is shown in FIGS. 14A through 14E, and the overall Portfolio Dashboard is shown in FIG. 19. The Portfolio Dashboard allows a user to see the details of all their Sites in aggregate or to drill in to one particular Site by going directly to that Site's—Site Dashboard (1402) with a simple click of the mouse or tap on a tablet or PDA's screen. This provides the busy corporate user with a 50,000' view (the Portfolio Dashboard) that allows them to drill in for details in the Site Dashboard. Any expense of that Site can be further drilled into with simple clicks or taps—all the way down to one month's view of expenses for any particular Site.

The tabs on the right of FIGS. 14A through 14E represent the Summary, Building Specs, Cost Metrics, related Comps and charting the Over-market Percentage and the Utilization Percentage—respectively.

This exposes the user to the details of the Site's expenses, and also provides a list of Comps. A summary of the financial data for that particular Site is shown in (1404), and the Comp data for alternative locations (1406), including both the projected cost savings for the Comps (1408), and the client driven, Suitability Ranking of the Comps (1410), and the KSD Score (1412) are all shown simultaneously.

FIG. 19 shows an example of the invention's Portfolio Dashboard by which a manager of a large company, having multiple real estate holdings, may evaluate the companies' complete portfolio of different leases and/or owned facilities at a glance. Note how the simple concept of "Red Light, Yellow Light and Green Light" is utilized throughout the Portfolio Dashboard to allow the human to quickly and even subconsciously know in a second what's "Good, Cautionary or Bad" (for color screenshots, see the provisional patent application 61/473,139, the disclosures of which are incorporated herein by reference). All key performance metrics may be color-coded. For instance, the Utilization Percentage of each Site may be indicated by a color-coded bar graph (1910). This helps the corporate manager quickly understand how the portfolio as a whole differs from a fully optimized state, and further shows at a glance how the different properties in the portfolio may be further optimized.

Figure 14A:
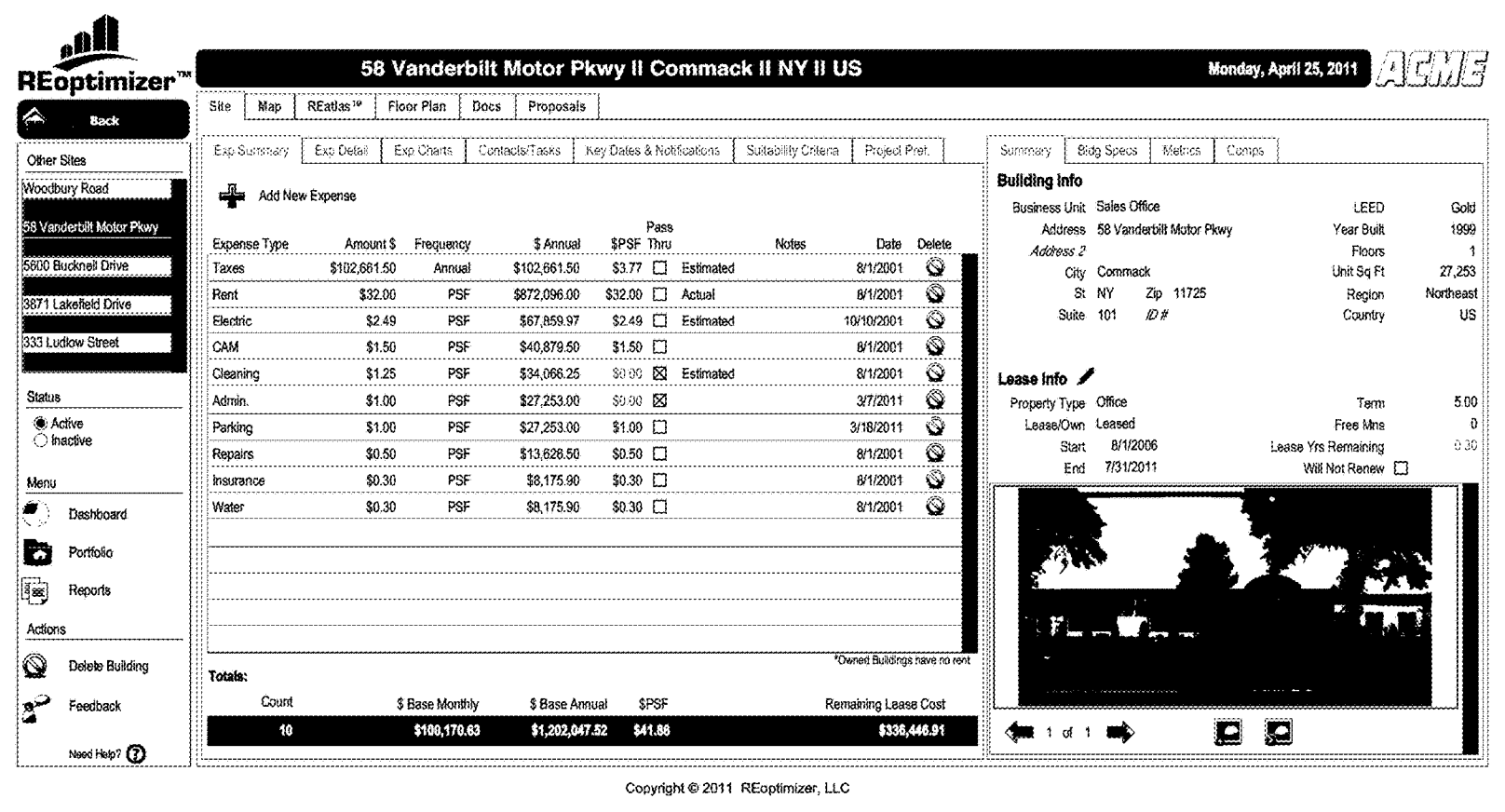
Figure 14B:
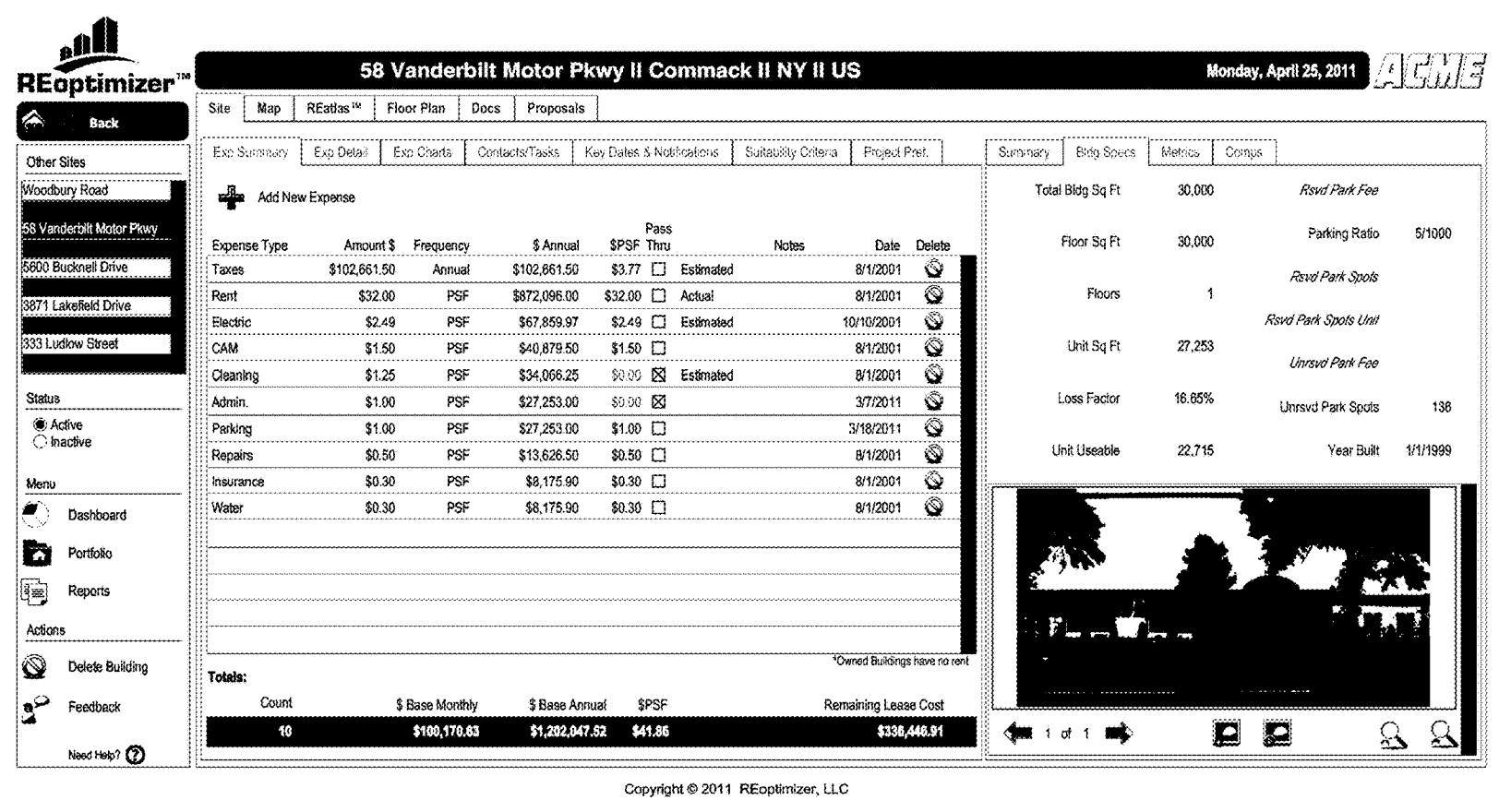
Figure 14C:
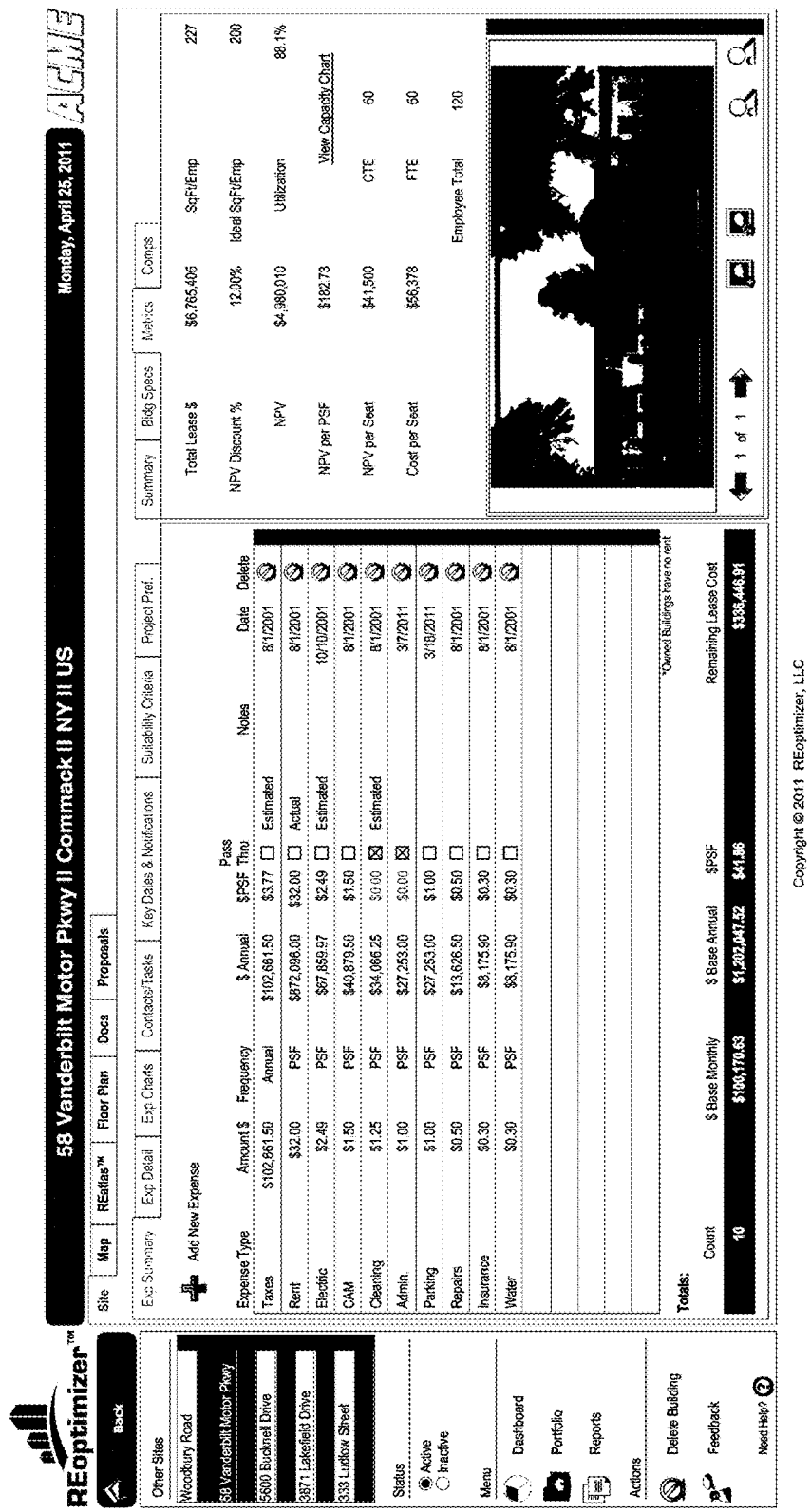
FIG. 14C shows how the user may also find out more about, or enter input regarding, the various financial, Capacity, and Utilization metrics of the building by clicking on the metrics tab.
Figure 14D:
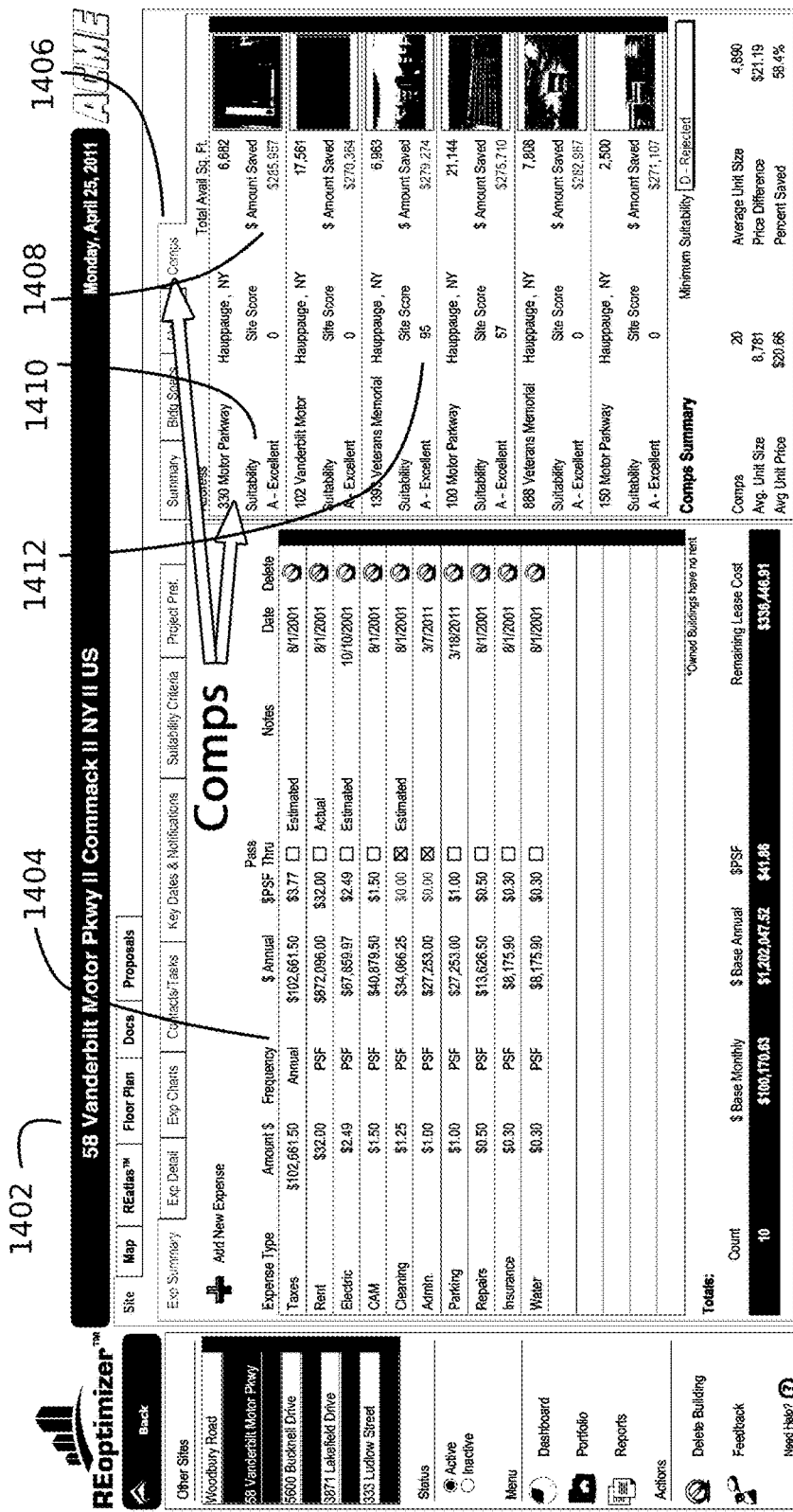
FIG. 14D shows how the user may find out more about the set of Comps that are relevant to this particular building by clicking on the "Comps" tab and to see projected savings of each Comp as compared to the Site.
Figure 14E:
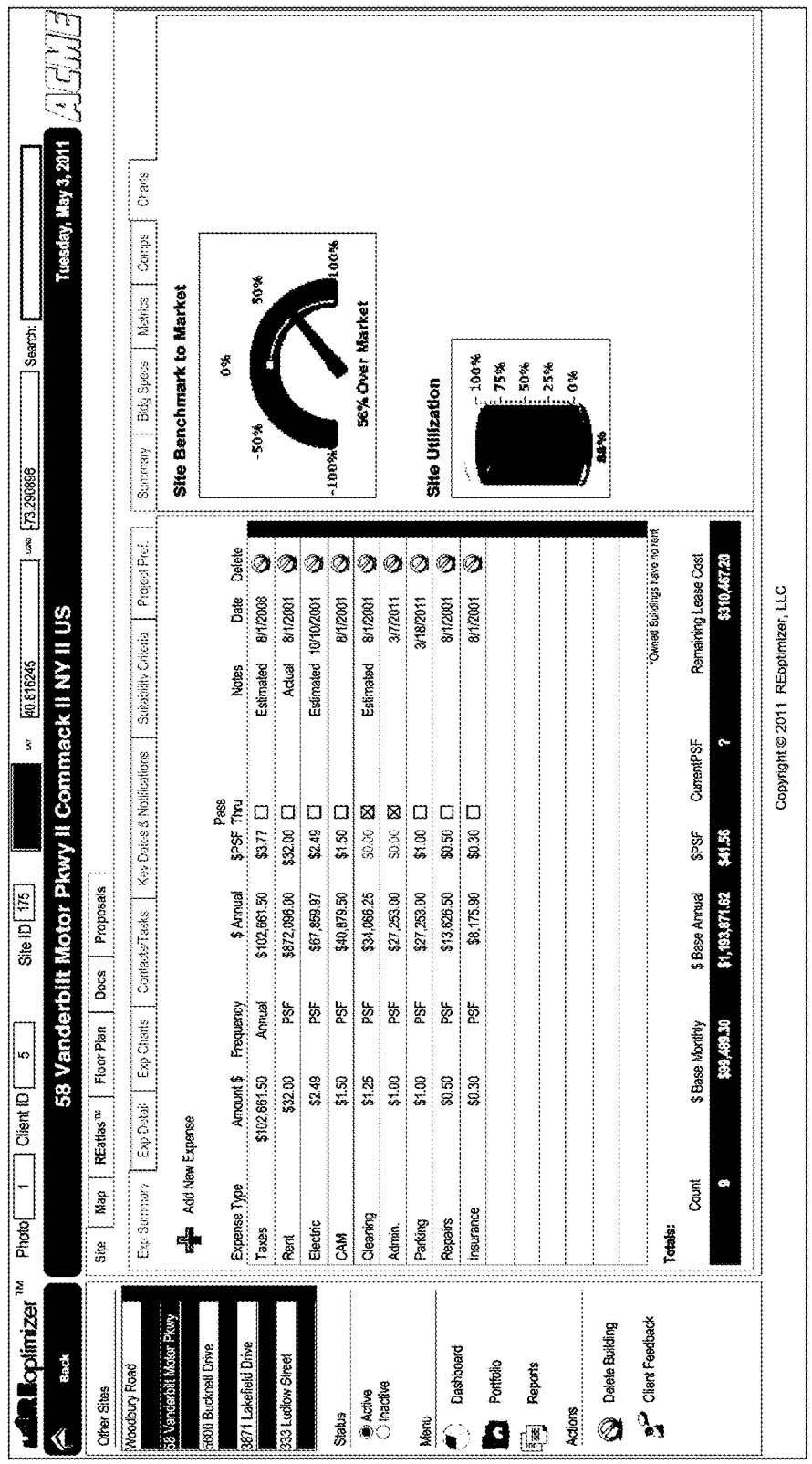
FIG. 14E shows how much a particular Site is "Overmarket Percentage" and the "Utilization Percentage" (as compared to the potential Capacity of the Site), on the Site Dashboard.

With a quick click or tap, the C-suite executive or Director of Real Estate can drill into an offending Site to go directly to the Site Dashboard, FIGS. 14A-14E shows one embodiment of this Site Dashboard, but with a quick selection, the client can choose the tabs on the right to display different information (reutilizing the screen real estate to display layers of information). In FIG. 14D the Comps related to that particular Site are currently displayed.

As previously discussed, when leases don't expire for three to four years, it can be easy to lose track of exactly when a company needs to move. Here the system can manage the key dates for lease expirations, renewals, or cancellations, tax payments or anything the client would like to calendarize relative to any particular Site within their portfolio. The system can also include notes relating to a Site, documents, plans, photos, video, demographics, maps, proposals and even, as previously discussed analyzes the various Comp proposals (shown in FIGS. 24, 25 and 26) for the client.

The system may also include a "Rolodex™ type database of contacts relating to each Site, such as the local plant manager, the attorney that handled this lease 4 years ago, the architect's email address, and so on. Furthermore, the system may even allow the client to assign To Do's to any particular Site, including linking to that To Do any of the above-mentioned related contacts. This is a tremendous organization tool, which combined with all the other detailed information about any particular Site or Comp for that Site and the analytics within the system, gives the corporate client a synergistic tool that empowers them while saving them time.

Figure 15:
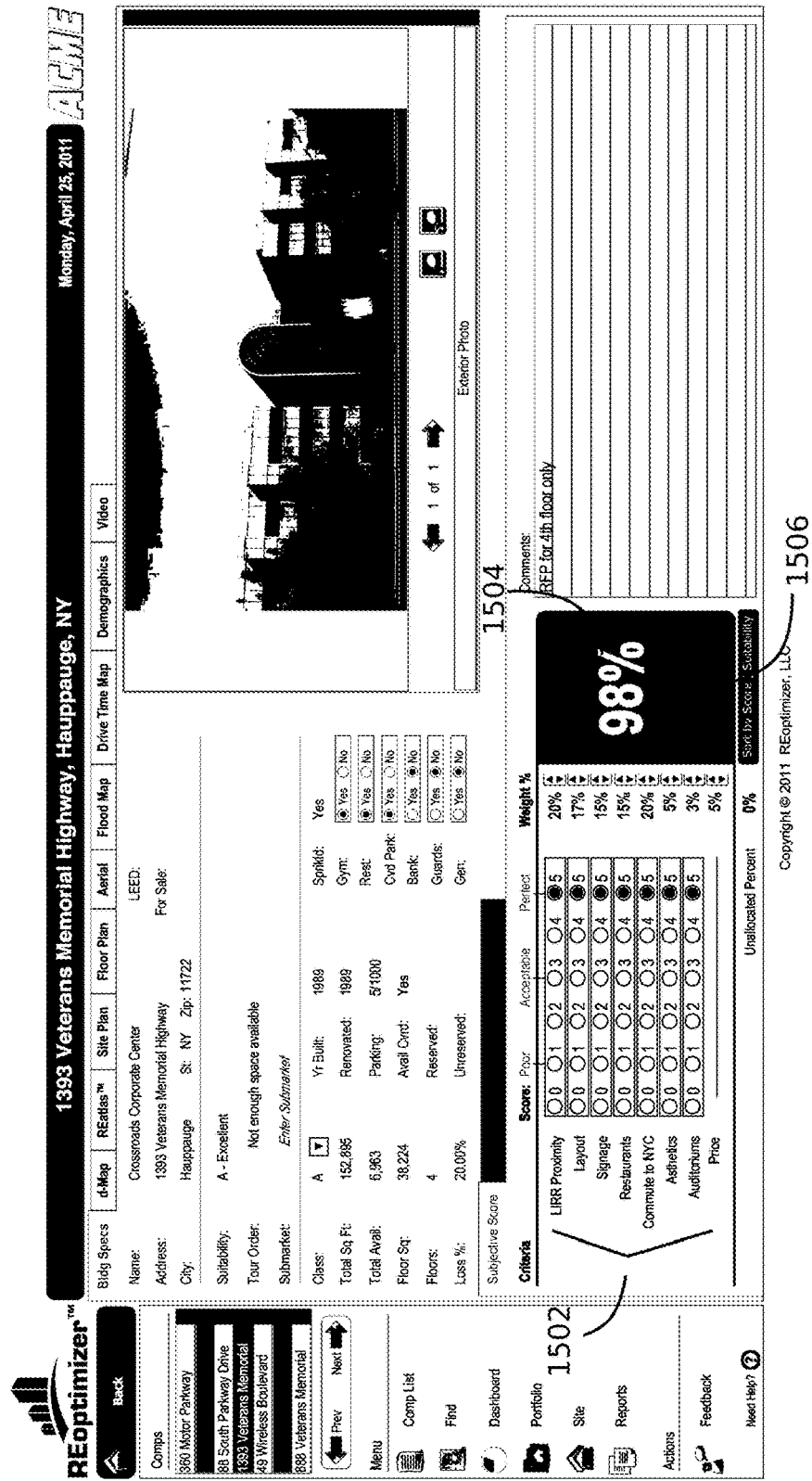
FIG. 15 shows an example of a desirable lease Comp, along with its relative KSD score when the properties' price is included in the overall score rating. In this example, the property KSD score is not rated at 100% perfect because the property is expensive, thus generating a suboptimal expense KSD.

FIGS. 15-18 show examples of how this system can be used to evaluate different potential new lease Comps. In FIG. 15 we see the detailed Comp information that appears when the user has "drilled in" to a Comp from the Comps tab shown in FIG. 14D. The user has filtered the list of Comps by choosing "Excellent Choice" from the Suitability Ranking at the bottom of from FIG. 14D. That Comp (1410) will result in substantial cost savings over the user's present lease (1408), previously shown in FIG. 14D in the list of potential Comps (1406).

FIG. 15 shows that this "A" list Comp is indeed almost perfect. In this somewhat contrived example, the Comp is rated perfect (e.g. "5") in every KSD (1502), and has been given an overall KSD score rating of 98% (1504) using the algorithm previously discussed in FIG. 13A. Why is this Comp not listed as completely perfect? This is because the KSD rating has the more realistic "consider price" KSD option turned on (1506), and this Comp may not be the cheapest of the various suitable alternatives.

Figure 16:
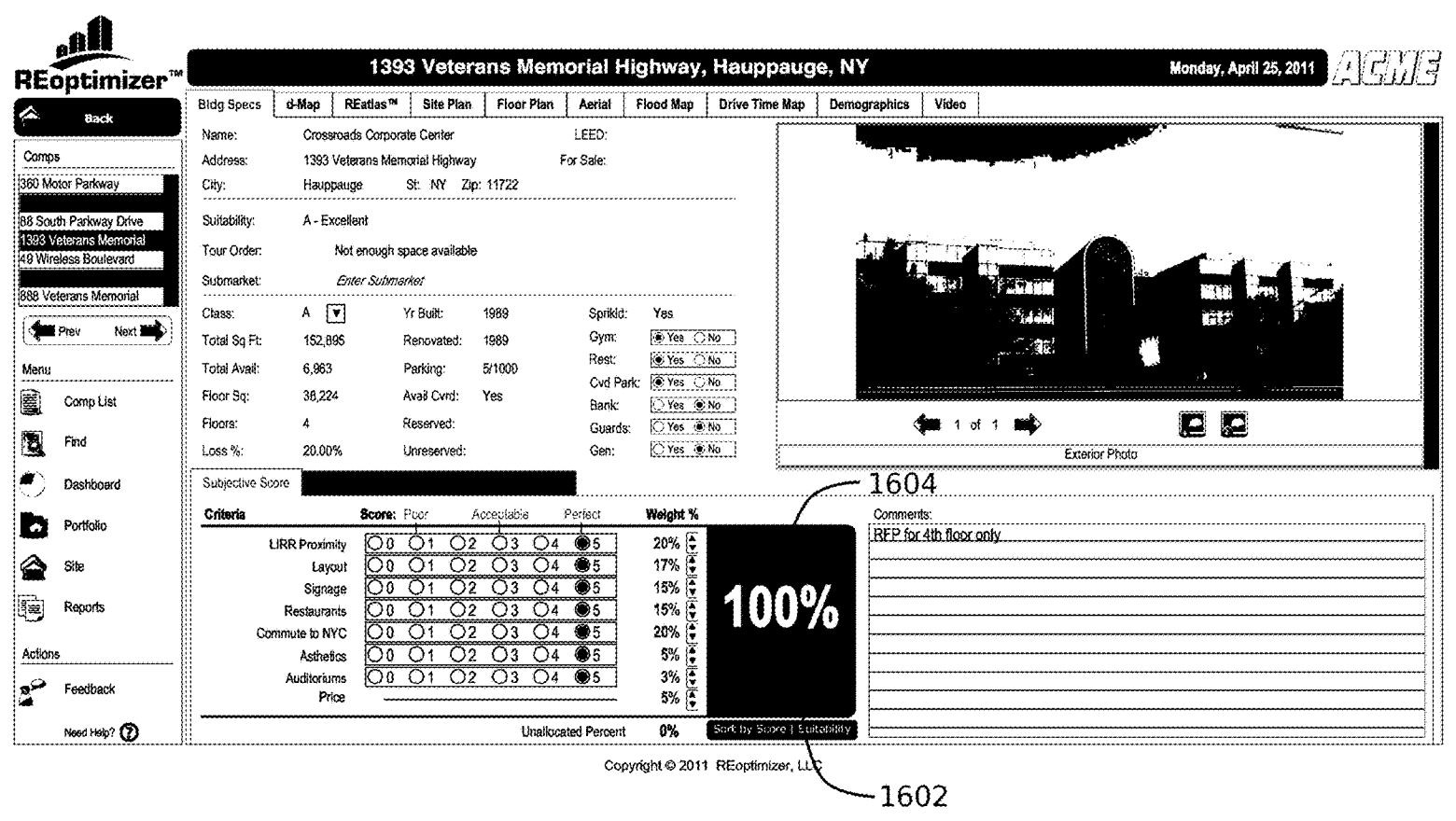
Figure 27:
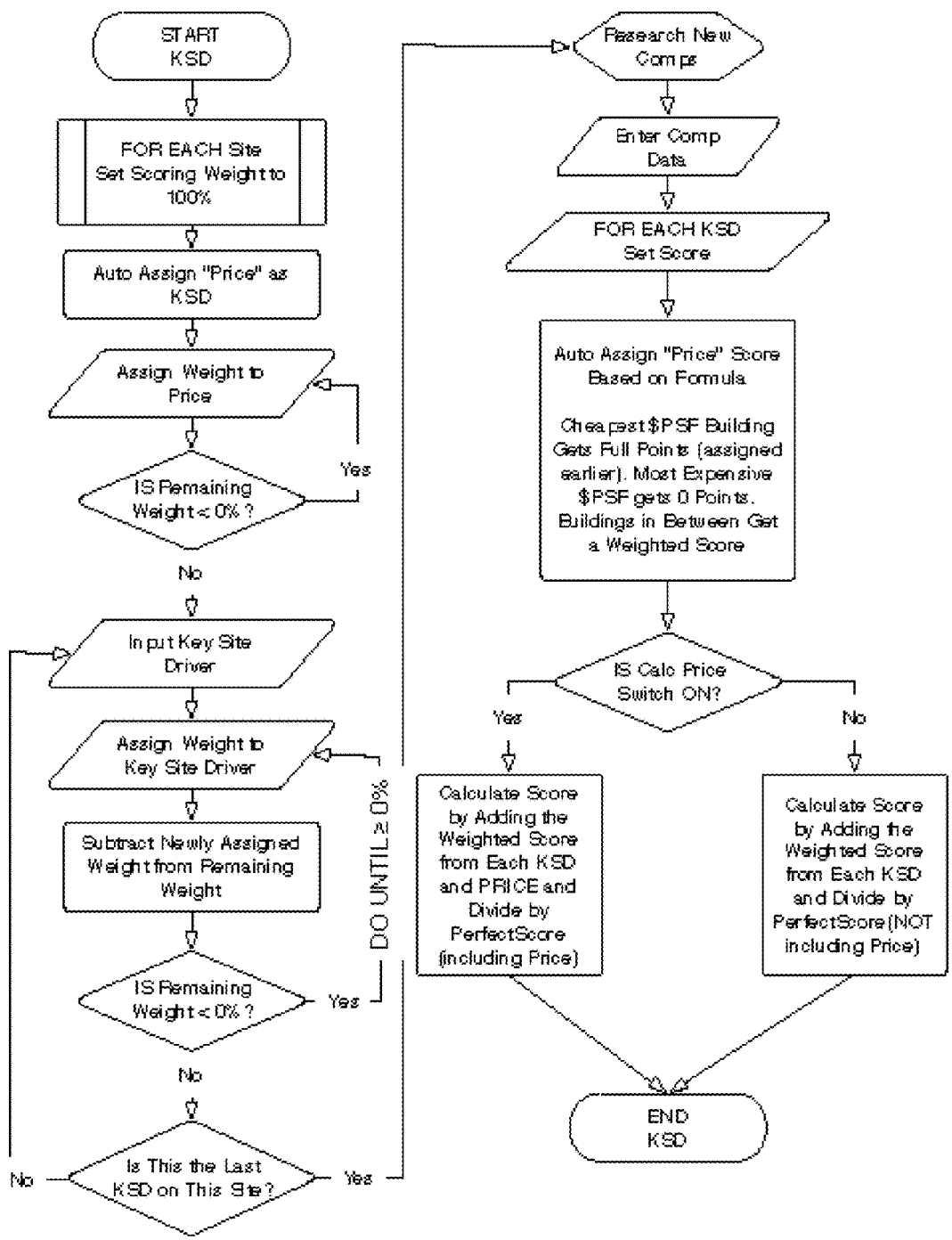
FIG. 27 shows a more detailed flowchart of the KSD calculations.

Usually KSD ratings will be more complex, and here it is often useful to at least temporarily see what the suitability rating would be if price considerations were removed. This is shown in FIG. 16. As can be see, the price option is turned off (1602), and the rating is now 100% (1604). A further discussion of KSD values with, and without price ratings is also provided in FIG. 27.

Figure 17:
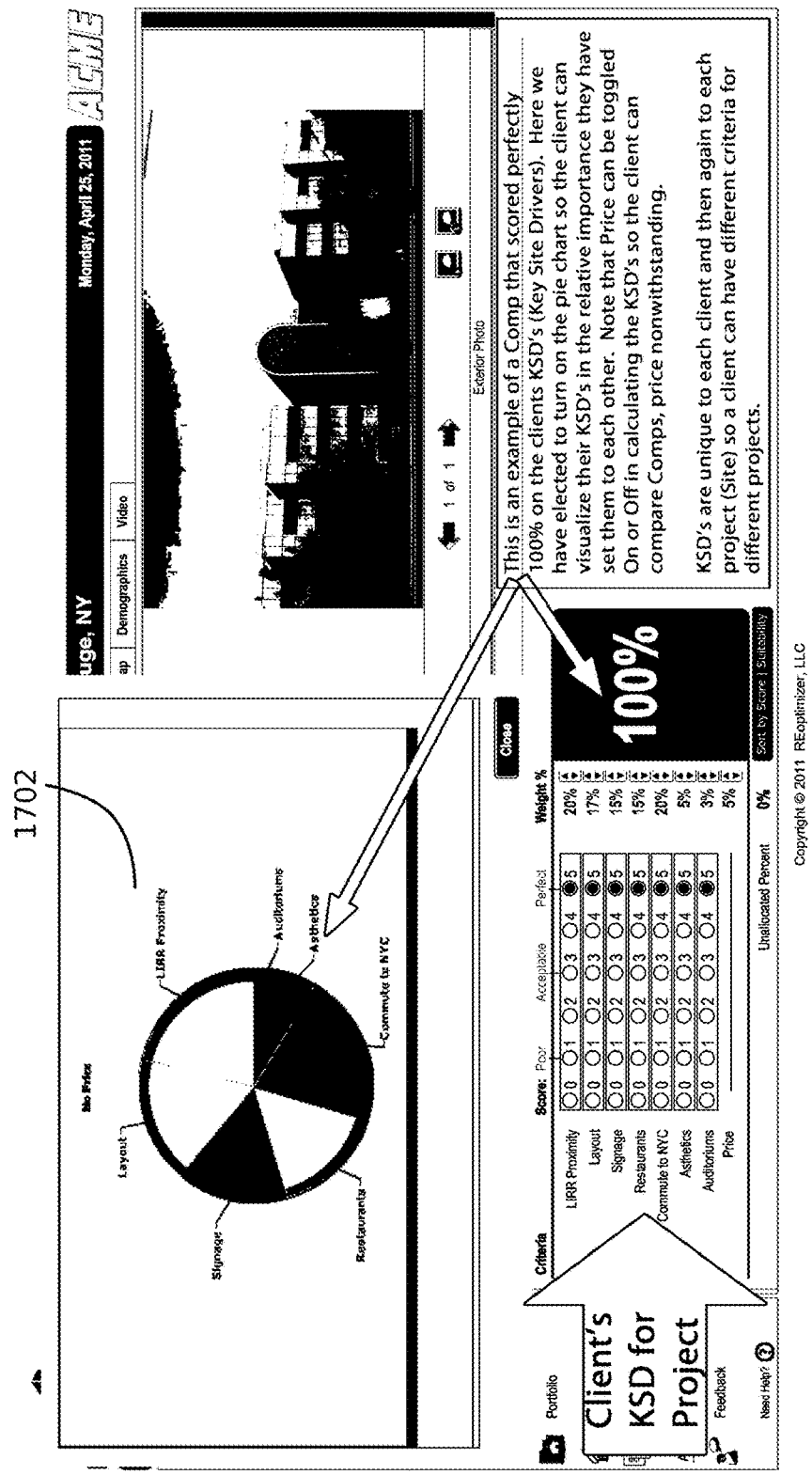
FIG. 17 shows an example of the same potential lease Comp, additionally providing a pie chart by which a user can visualize the relative weight given to the various KSD used to determine overall Comp's desirability.

In order to better appreciate the relative weight assigned to the various KSD's, the system may also display the various KSD's and their relative weights in pie chart form (1702), as is shown in FIG. 17. FIG. 17 is an example of a Comp that scored perfectly 100% on the client's KSD's (Key Site Drivers). Here we have elected to turn on the pie chart so the client can visualize their KSD variables in the relative importance they have set them to each other. Note that Price can be toggled on or off in calculating the KSD's so the client can compare Comps, price notwithstanding. Again, KSD's may be unique to each client, and again may also be unique to each project Site, so a client can have different criteria for different projects.

Figure 18:
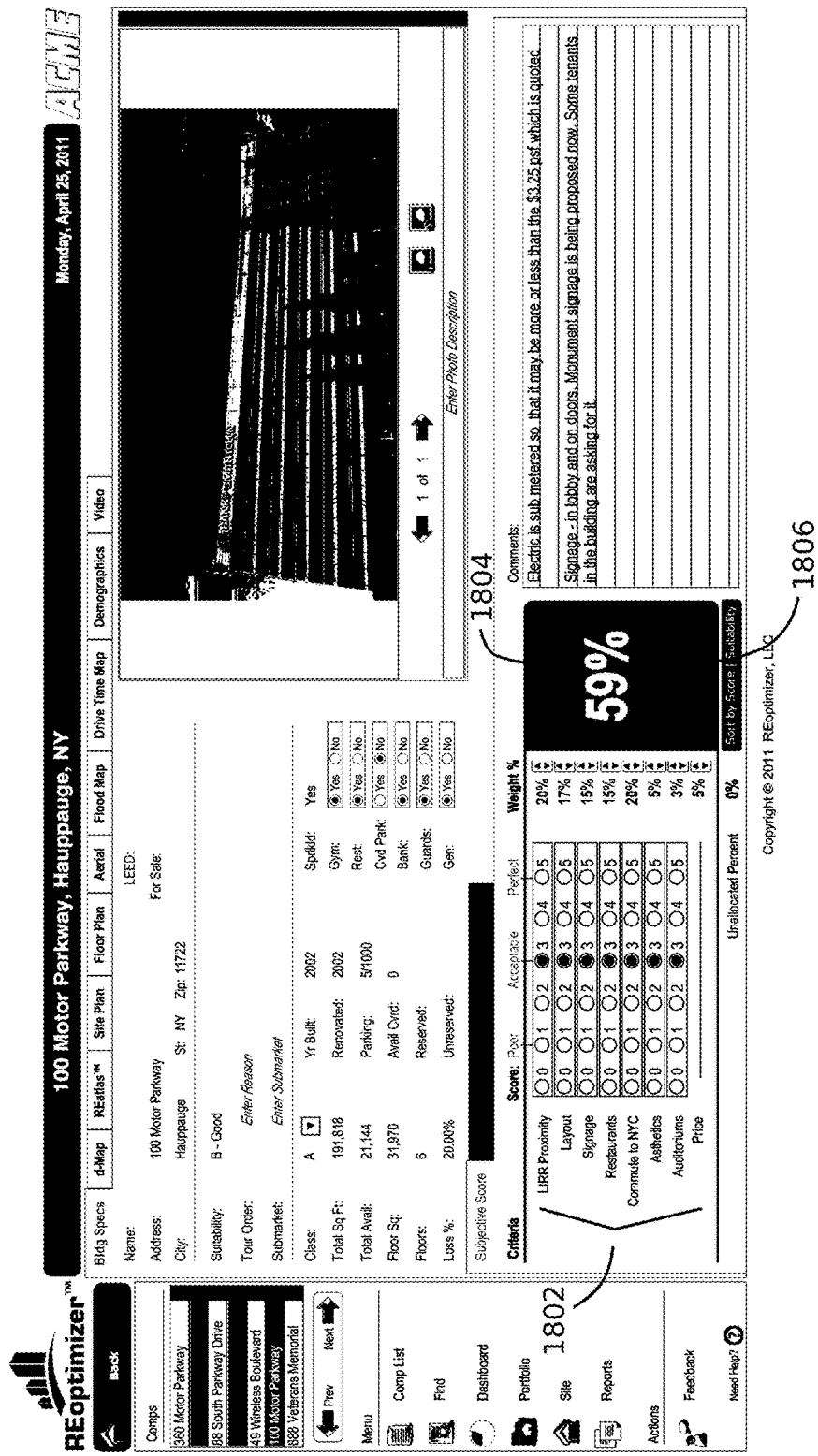
FIG. 18 shows an example of the rating assigned to a less desirable potential lease Comp.

By contrast, a user clicking on the Comp list from FIG. 14D (1406) may also look at less suitable Comps, such as the Comp (1412), with a 59% rating, which is rated as mediocre by the KSD suitability rating system. This is shown in FIG. 18. In this example, which is again somewhat contrived, the Comp is KSD rated as adequate (e.g. "3") in all KSD categories (1802), but is given a somewhat higher than a pure 50% suitable rating (1804) when the price KSD is on (1806), probably due to a somewhat lower cost.

As previously discussed, although smaller companies may only have one or a few Sites to manage, larger companies can often have very complex portfolios of real estate leases and some owned Sites. Managing, let alone optimizing such complex portfolios can be demanding. In another embodiment of the invention, again as previously discussed, the invention provides a Portfolio Dashboard in which multiple Sites are displayed and evaluated at a glance. This is shown in FIG. 19.

In large corporations, often time, or the lack of it, is the enemy of efficiency (ironically). The sheer weight of complex details for dozens of Sites, and then again to ponder the alternative Comps, can simply overwhelm the human's ability to see the opportunities to bring savings. That's where this invention truly shines. It rolls all the intense comparisons (Over-market Percentage and Utilization Percentage) into this one page, Portfolio Dashboard. Then, utilizing colors to triage for the human what needs attention most, the human can see the proverbial "forest through the trees". Once an executive has this information they are empowered to take action.

The Portfolio Dashboard shows which leases are coming due, what their remaining total costs are, how many Comps are being compared against them, and summarizes this by an "Over-market" gauge. The dashboard can also show the percentage of Utilization FIGS. 19 (1910) (also discussed in FIGS. 28A and 28B) as compared to the available Capacity of the space leased and/or owned.

The Portfolio Dashboard lists all the client's leased and owned properties, and gives the company manager an ability to "drill down" to select and further examine any one of the properties from the Portfolio Dashboard screen. Further, the system can list active projects, as well as an upcoming section that lists leases about to expire.

Figure 20:
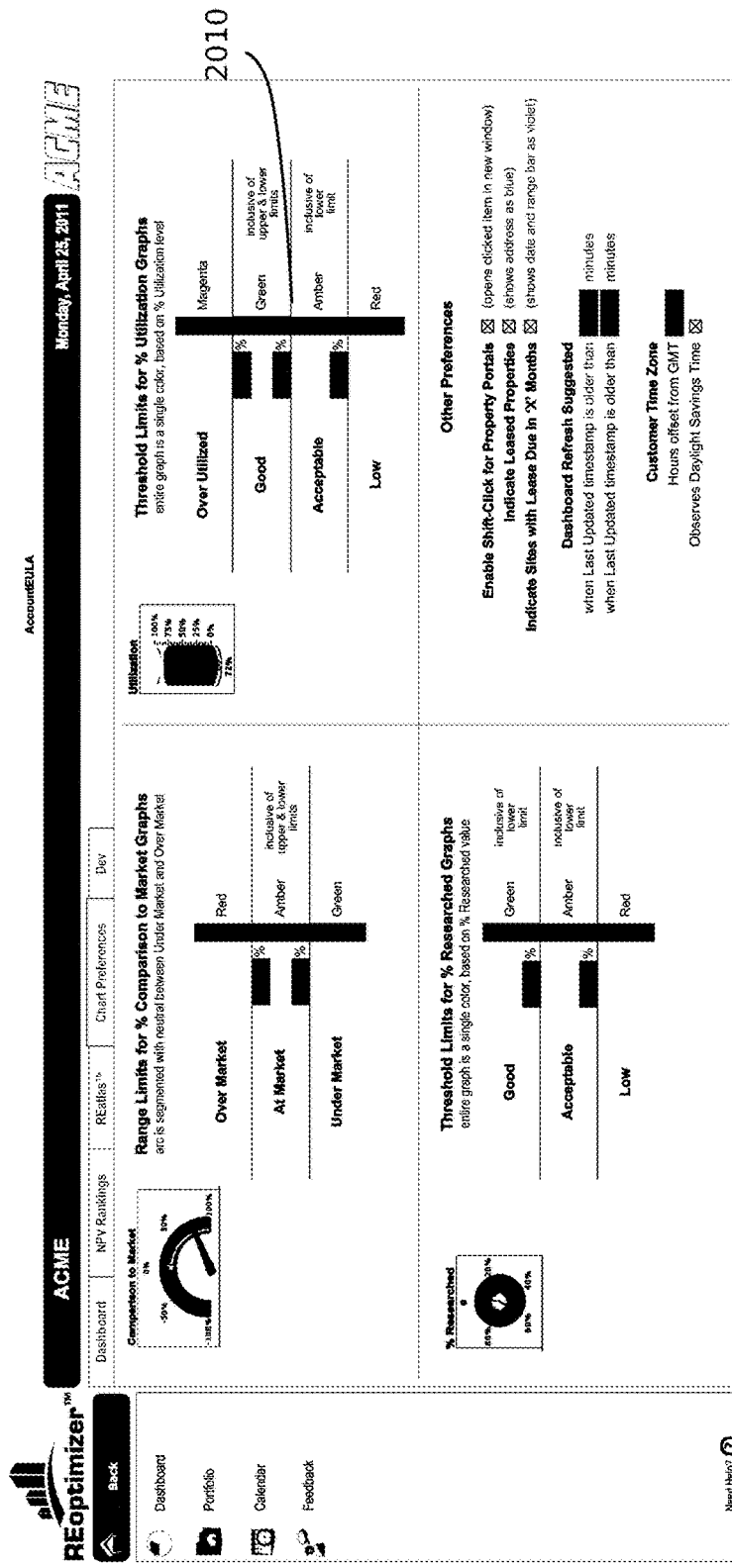
FIG. 20 shows an example of how the user may adjust the threshold limit colors (2010) used to indicate on the dashboard when various benchmarks and indicators reach certain user predetermined limits.

As previously discussed, the graphical user interface can make good use of color coding, examples of which are shown in the color versions of many of these screenshots, as shown in provisional application 61/473,139. Color codes may be used to alert the user to when certain properties are in particularly good or bad Utilization levels, as well as other parameters of user interest. In some embodiments, the system may allow the user to customize these displays according to user desired parameters, as is shown in the parameter display setting user interface shown in FIG. 20. Here the user may use a slider bar (2010) or other mechanism to set the color display to desired limits.

Figure 21:
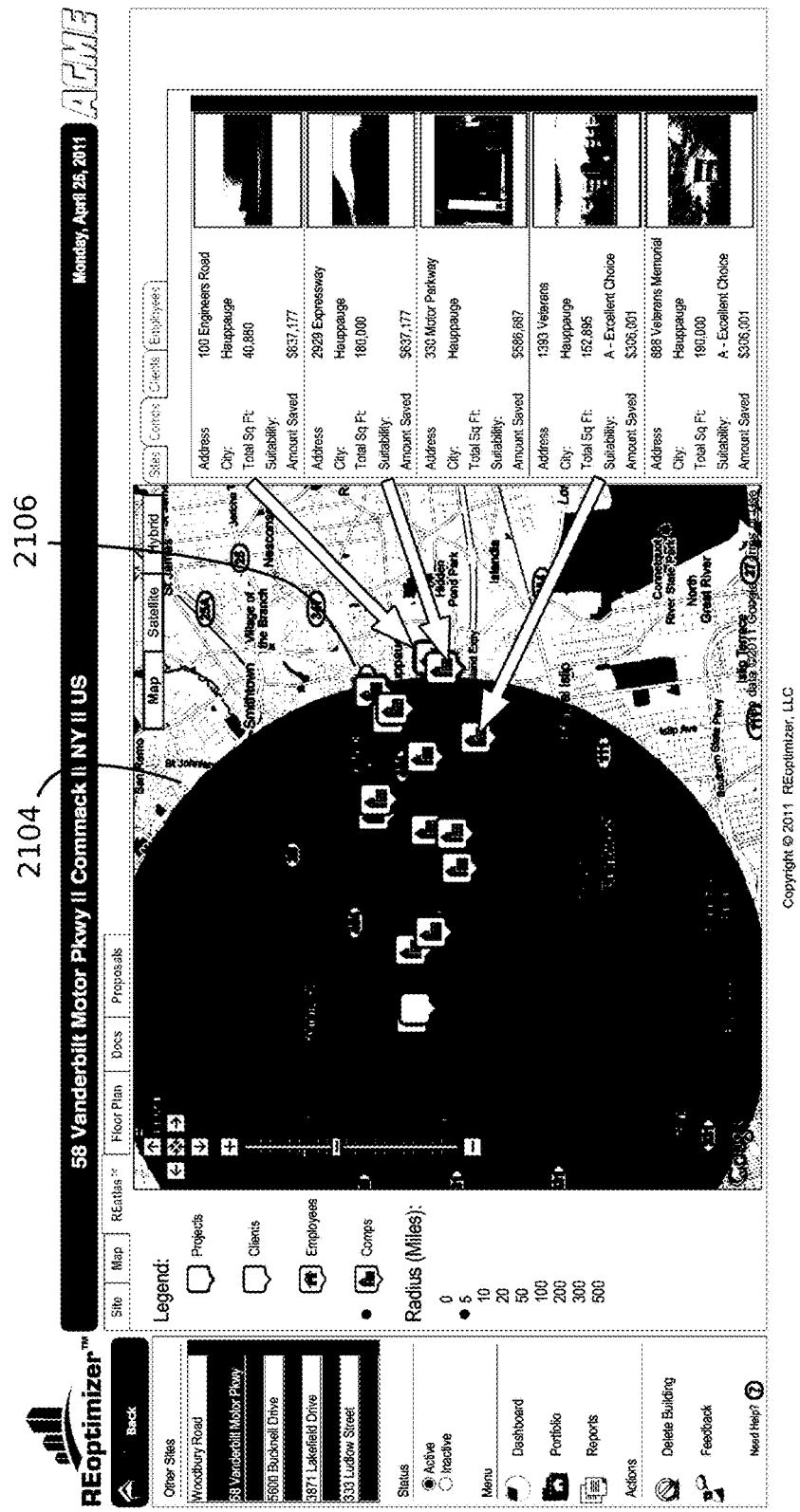
FIG. 21 shows how the system can also map the various Comps to within a pre-selected radius of a reference location, which will often be the location of the company's present Site. The client may also show the location of their employees, customers and other Sites within the client's portfolio.

In other embodiments, the system can also display the location of the various Comps on a map, with an adjustable radius showing the distance from a user determined location, which will often be the location of the user's current lease. This option is shown in FIG. 21. As can be seen, the system has been programmed to highlight a radius of five miles from the current Site location (2102), and the darkened radius (2104) on the resulting map, along with the location of the Comps (2106) can be seen. Thus at a glance, the user can see the location of various Comps, and the projected price savings, all at the same time. Furthermore, the system, with a click of the mouse or tap of the finger, will display the Comp's address and other pertinent information in a balloon that appears on the map and then can be selectively closed by the user.

Besides displaying a client's Sites and at the user's choice, Comps for these Sites, the user may elect to further display their own customer and employee locations relative to these Sites and Comps. Just as with the Comps, the user may selectively click or tap on a Site, customer or employee pushpin to pull up information about that pushpin.

Figure 22:
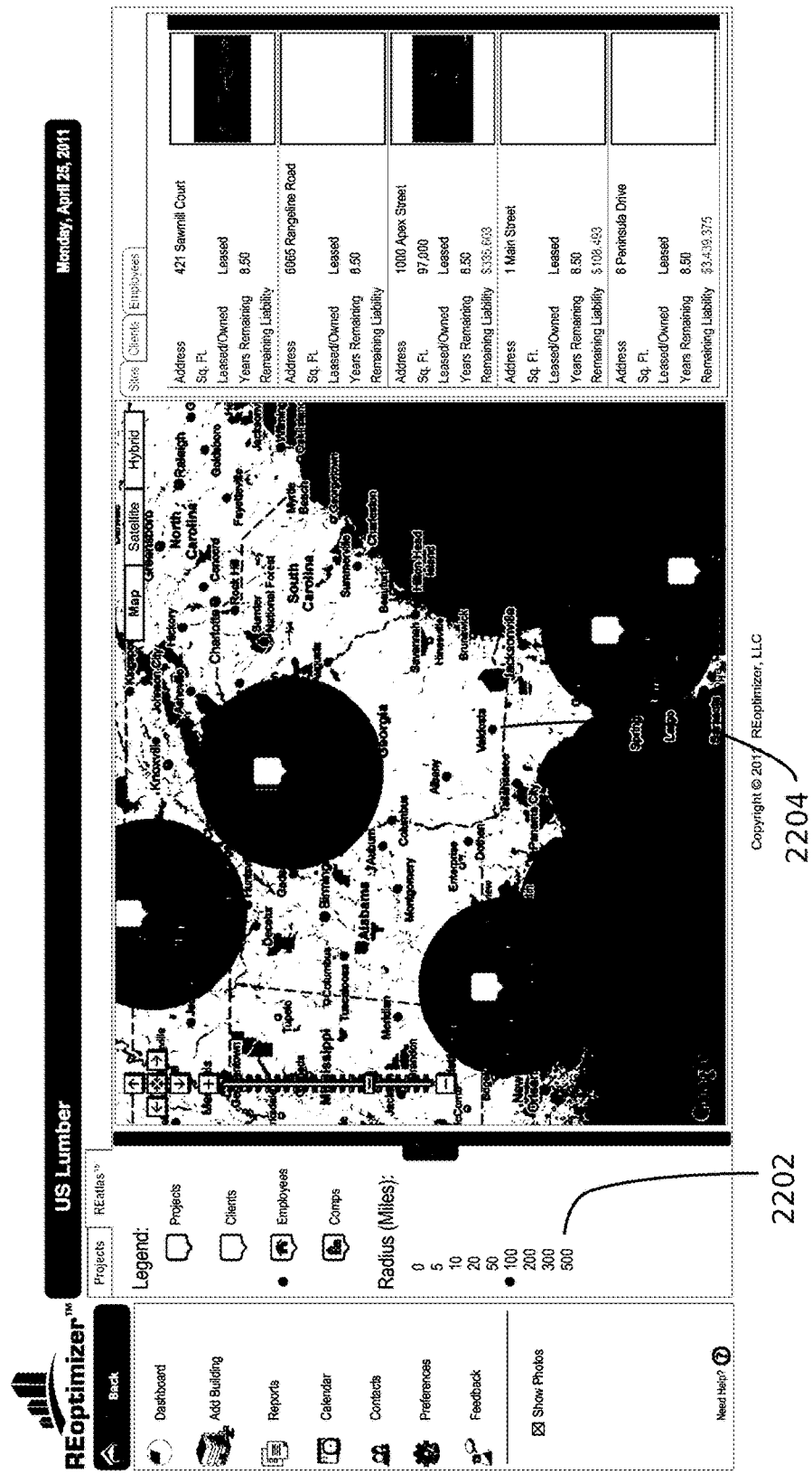
FIG. 22 shows how the system's mapping option can also be used to expose gaps between existing Sites that might be potential good locations (Comps).

FIG. 22 shows an alternate view and use of this geographic location option. When viewed on a larger scale, and with a suitable radius (for example 100 miles for a company that may be trucking heavy loads to customers) (2202), the system can also both help suggest promising locations for new location (e.g. a Comp in such a location as Valdosta (2204)) that is located on an interstate highway midway between two existing Comps, and thus might be a good new trucking depot), and also help suggest and evaluate suitable comparable Comps at the new location.

FIG. 24 shows how the system can also manage different proposals from the owners of different Comps. In this example, note that the "77 Champion Drive" example has three separate proposals (2402). In general the system can handle an unlimited number of proposal revisions per Site. As the deal get negotiated, the landlord and seller proposals will generally get better (i.e. more compelling), and the system allows the user to easily compare proposals.

FIG. 25 shows how the system can handle a dynamic number of different lease costs per proposal. The system can total Net Present Values (NPVs), averages, etc. (2502) based on all costs shown below, and the user can scroll down (2504) to view an effectively unlimited number of costs per proposal. The system can handle any number of costs per proposal. Each can be escalated (i.e. adjusted) separately over the projected lease term.

FIG. 26 shows how the system can be set to either compare all the proposals obtained from the owners of the different Comps (e.g. proposals submitted by bidders for the client's tenancy), or alternatively will compare just the latest (highest revision number) proposal from the owners of the different Comps (2602).

Figure 28A:
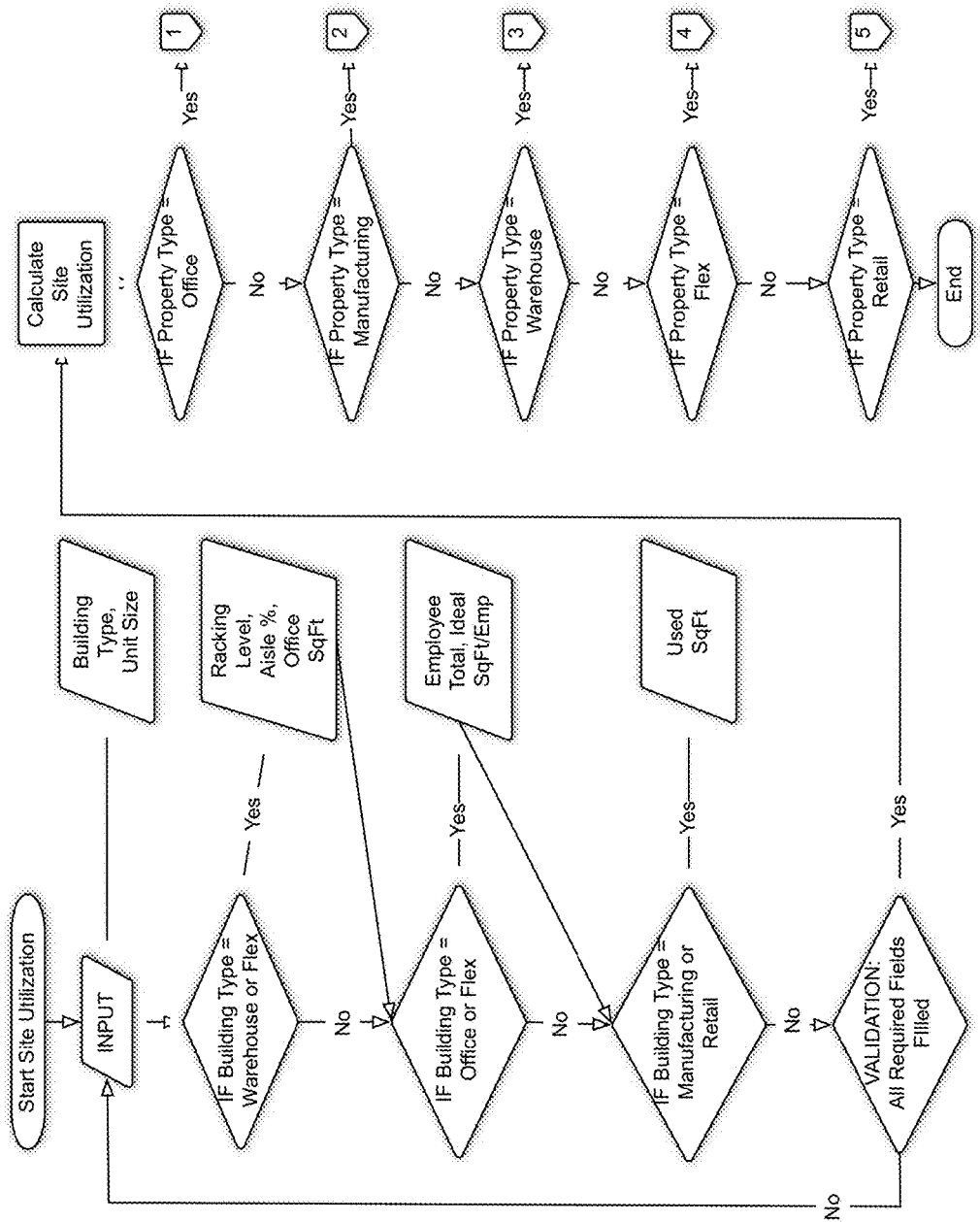
FIG. 28A shows a flowchart of how the space Utilization calculation takes place.

FIG. 28A shows a flowchart of how the space Utilization calculation takes place.

Figure 28B:
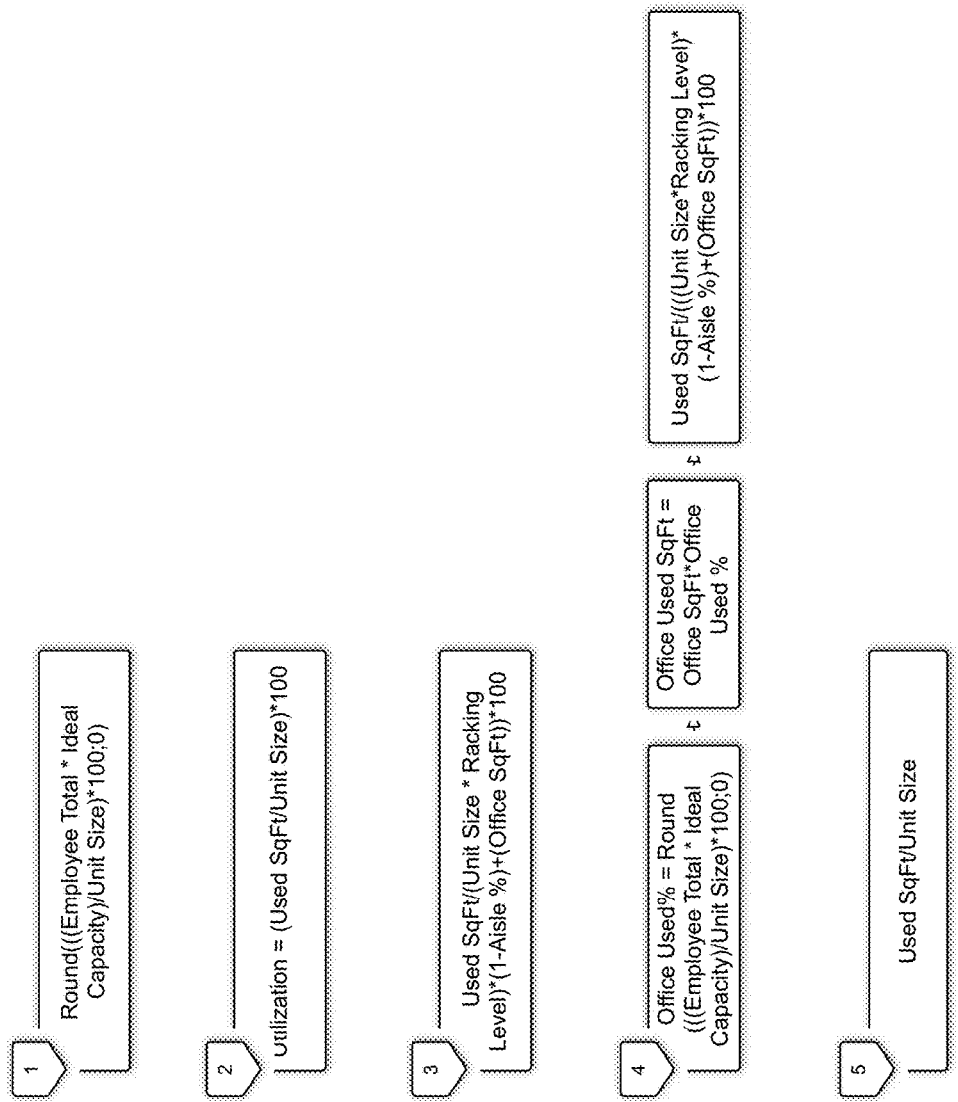
FIG. 28B shows more detail from the FIG. 28A flowchart of how the space Utilization calculation takes place.

FIG. 28B shows more detail from the FIG. 28A flowchart of how the space Utilization calculation takes place.

Further Discussion:

In some embodiments, the invention (e.g. REoptimizer) may be a comprehensive computerized system for corporations to analyze their current real estate portfolio and benchmark their leasehold estates that are within the customer's specified number of months from their lease expiration (12, 18, 24, 30, 36 or other) to current market conditions.

Once the corporate client has picked a number of months prior to the lease expiration, the system will tell them how many of their leases are within that timeframe and how much square footage that represents.

The client then "Activates" the Sites they would like to have market research performed for, and a REoptimizer licensee (often a broker) prepares the due-diligence and inputs the data into REoptimizer system. Alternatively, as previously discussed, a database of previously prepared data may be accessed for this purpose. REoptimizer will then mathematically compare the total occupancy costs (rent plus all additional expenses) for the remaining balance of lease term for the Site being compared against the projected total operating costs (rent plus all additional expenses) for all suitable alternative locations (known as "Comps" within REoptimizer).

Additionally it may be used to compare alternative locations for purchase. In such case, the cost of the acquisition, inclusive of all extraneous costs, such as renovation is used to compare against the existing Site's costs. Of course, the KSD's are part of selecting an alternative location (Comp) for purchase just as much as they are for selection a Comp for lease.

Before the research on alternative locations (Comps) is initiated, the system will prompt the corporate client to define their Key Site Drivers "KSD". As previously discussed, these KSD are the subjective factors that can be critical in determining the optimal location for this particular corporate clients need, for this particular business unit at this specific period of time.

The KSD are typically factors not are not always easily to quantify, and indeed may not even be traditionally be quantified, but nevertheless can be as important or even more important than the relative price per square foot in terms of evaluating a Comp's suitability.

For example, for a law firm, having a prestigious address and or better signage on an office building may be valued far more than the additional few extra dollars per square foot for the exposure gained by the law firm. This is a great example of how KSD's work especially well on the important, yet perhaps nebulous factors that make the difference between a great location and an also ran. For the law firm the exposure may mean a big difference in business, yet this is something that is not quantified by simple property listing systems currently available.

By contrast, a warehouse may value the ingress and egress available to their 18 wheel trucks, plus the availability of a sufficiently wide enough and deep enough loading and unloading area, and this factor maybe just as important or more important than other factors such as the number of dock doors.

The invention's REoptimizer system takes the corporate client's input on the subject of factors that are important to them, and allows them to apply a weighting to these factors so that what factors are the most important to a client have the biggest impact on the KSD Score. Thus, with mathematical precision, the Comps that best meet the client's needs score the highest. All the KSD factors, taken together, may be mathematically normalized to a base 100 system. In other words, if the client were to think of their decision factors as a pie chart, each piece (factor) would represent one slice on the chart.

As with any pie chart all the slices have to end up to exactly 100; for example, there can be no 99 and there can be no 101. To help emphasize this point, REoptimizer may actually display a pie chart of all the clients' subjective KSD decision factors, inclusive of price, for the client to see and evaluate (see FIG. 17).

As previously discussed, the client can further decide whether to include price as a KSD factor, or not, thereby allowing them to filter their choices with or without pricing. If price is excluded from the KSD factors to be considered, then the system will re-normalize the remaining KSD factors to a base 100-system and display the relative results for the client to see.

Once the REoptimizer system has the client input, the system can then score the subjective factors for the client's current Site, as well as each Comp found for them. Once the existing Site and Comps are scored, the client can then utilize REoptimizer to quickly and efficiently filter the Comps that best meet their needs and even compare those scores to how their existing Site's score on the KSD's.

Of critical importance, is the understanding that once alternative Comps are identified, and their estimated rent and operating costs are input, the system will then compare all these alternatives Comps (which can often number between 20 and 50) back to the known costs of the existing Site for the remaining lease term.

Thus if a corporation activates or selects 30 potential new Sites for research, REoptimizer can compare each one of these 30 Sites to the dozens of Comps found for each Site and display, within the overall Portfolio Dashboard (see FIG. 19) the Over-market Percentage, if any, for that portion of the corporate clients real estate portfolio that was activated for research. Furthermore the corporate client can then immediately see, using the system's Portfolio Dashboard, how much of their portfolio has been "Activated" for this due-diligence research. Without it, frankly, corporations are really flying blind on their very costly corporate leases. Remember that for most corporations, their real estate expenses are typically the $2^{nd}$ to $3^{rd}$ biggest expense of all their expenses.

Working either on a stand-alone basis, or in conjunction with a licensee of the product, REoptimizer provides the corporate client with detailed market intelligence that allows them to either renegotiate with their existing landlords or, when their lease expires, move to a money-saving location.

It works just as well for comparing and finding the best purchase opportunities, should the client desire to own their location.

As previously discussed, the system can also analyze the "Capacity and Utilization" of all a corporations real estate assets (leased and owned), also discussed in FIGS. 28A & 28B.

The potential Capacity for office space is typically represented by the ratio of square footage per employee. For example, a typical rule of thumb for most industries is 200 square feet per office worker. This can, of course, vary by corporate desire and/or type of industry. REoptimizer will allow the user to specify their desired ratio of square footage per office worker, and will then measure the percentage of Utilization of an individual office location as well as all the office locations (leased and owned) in that customer's real estate portfolio. For example, a law firm with dozens of offices throughout the country may adopt as a corporate standard 300 square feet per office worker. In their Chicago office they occupy a 30,000 square foot area; therefore this office should be occupied by 100 employees. If only 75 employees occupied this office, then their Utilization Percentage for this Chicago office is 75%.

What truly makes the system (REoptimizer) uniquely powerful is that it can also compare the vertical space can could be utilized within the client's portfolio. For example, REoptimizer can also compute other factors, such as the vertical dimension to warehouse space. Here, for example, through racking, materials handling equipment (forklifts), inventory management software and perhaps RFID systems, corporations can exploit the vertical space within warehouses. For this type of application, as illustrated in Figure (Capacity & Utilization figure number here) REoptimizer can be configured to segment the available warehouse cubic feet by the potential levels of racking. These levels of racking depend upon client specific requirements such as height of stored items, weight of stored items and even the cost and/or availability of forklifts sufficient to raise the stored items to a maximum height.

A diagram illustrating these warehouse racking level considerations is shown in FIG. 23, and examples of calculations based on these considerations are also provided in FIG. 28A and FIG. 28B. Of note, more modern warehouses have much higher heights to accommodate the growing demand for vertical space by logistically sophisticated tenants such as FedEx or Walmart. This type of vertical space racking is often seen in retail establishments such as Costco, Home Depot or Lowes as well. In this type of scheme, items are typically stored stacked three to four levels high through the use of racking, forklifts, sophisticated inventory management software, RFID and bar-coding. Another unique aspect of the REoptimizer system is that it takes the possibility of "segmenting" a warehouse into these virtual replicas of the first floor into consideration in its various financial modeling schemes and KSD evaluation methods in that the potential for better space Utilization for a Comp may then become one of the KSD's.

The system is sophisticated enough to allow for the deduction of aisle space and/or other non-vertically usable space from the calculation that computes the potential Capacity of warehouse or retail space that allows for vertical stacking (racking).

The trend in higher warehouse heights and multilevel racking will only continue as technology continues to make it easier, and beyond cost effectiveness—necessary for companies to compete. Landlords like it because though it costs marginally more to building a higher building, it more fully exploits the land cost under the building and they are able to charge more rent for these more efficient buildings. Tenants like it because even though the landlords may charge incrementally more, they don't charge two to four times more rent for these higher warehouses.

REoptimizer systematically compares the true available Capacity of a warehouse versus the amount of Utilization the customer is achieving out of their assets (owned or leased) so as to develop a ratio and display this as a percentage of Utilization. As previously discussed, this type of rating can also be configured into a KSD rating.

Thus a client's complex portfolio of office, warehouse, retail and manufacturing can be evaluated in such a way as to provide the C-suite (i.e. corporate management) with a simple Utilization Percentage out of a rather complex set of calculations that can take into account the type of real estate for each Site within the portfolio and equalize cubic Capacities to square feet Capacities and then compare them to actual Utilization of the space that the company is achieving. This result is rolled up and displayed for the entire portfolio in the Portfolio Dashboard, FIG. 19. For each individual Site it is displayed on the Site Dashboard, FIG. 14E.

Thus in some embodiments, the invention may be a systematic computerized approach to benchmarking a corporation's real estate assets to current market conditions based upon the project cost of available, alternative locations (Comps).

The invention may also be a computerized method and system for projecting the total remaining lease cost for a particular Site or alternative location (Comp) inclusive of estimated operating expenses.

The invention may also be a computerized method and system for escalating individual operating expenses separate and apart from any other operating expense related to a particular Site or Comp.

The invention may also be a computerized method and system for handling free rent offered by the landlord as it pertains to obtaining the total cost of occupancy for a particular Site or Comp.

The invention may also be a computerized method and system for allowing the customer to designate which months, during the entire term of the lease, are the free month's rent by simply clicking on a box that represents that month, within a grid of all the months (a dynamic number calculated by the system when provided the lease start and lease end dates).

The invention may also be a computerized method and system for identifying the factors (e.g. the Key Site Drivers or KSD's) that a particular tenant or purchaser of real estate want to consider when determining what is the best possible Comp to meet their needs, and/or how well their current Site is meeting their needs.

The invention may also be a computerized method and system to allow the customer to apply weighting to the KSD's so that the customer can vary the significance any one factor has on the overall decision.

The invention may also be a computerized method and system to measure the Capacity and Utilization of any particular Site within the customer's real estate portfolio and to potentially compare that to what could be attained in a Comp. Furthermore, the invention may aggregate the Capacity of all the Sites within a customer's real estate portfolio and compare that against their Utilization Percentage of all the Sites so as to give the customer a textual and graphical representation as to their Utilization of any particular Site or their entire real estate portfolio.

The invention may also be a computerized method and system to differentiate between full-time employees (FTEs) and contractual term employees (CTE's) and yet aggregate these two together and utilize this number when developing the percentage of Utilization of any particular Site.

The invention may also be a computerized method and system to measure the cubic Capacity of industrial space and to compare that against the percentage of Utilization of such cubic Capacity.

The invention may also be a computerized method and system to measure the cubic Capacity of retail space and to compare that against the percentage of Utilization of such cubic Capacity.

The invention may also be a computerized method and system that generates a graphical representation showing the comparison between a customer's total occupancy costs versus current market conditions in such a way as to easily represent to them whether they are: below-market, at market, or paying over-market.

The invention may also be a computerized method and system to graphically show to the customer, as in a pie chart, the relative importance of each factor they are using to determine the optimum Comp, as it is part and parcel of the overall decision.

The invention may also be a computerized method and system to allow the customer or licensee of the invention (e.g. REoptimizer) to record how well a particular Site or Comp matches a customer's KSD's. For a Site, then the customer is seeing how well something they already own or lease still meets their current needs. In the case of a Comp, then the customer is seeing how well an alternative location would meet their current needs (perhaps better than the current Site). Here the KSD's may be recorded by various methods including radio buttons, sliders, direct numeric input, and the like.

The invention may also be computerized method and system to indicate to the customer how many of their leases, and how much square footage those leases represent, within their portfolio, that are due to expire within a customer specified period of time, through the use of the simple drop-down choice mechanism, real buttons, slider mechanism or direct input.

The invention may also be a computerized method system to analyze and evaluate specific lease proposals based upon KSD's, appropriate Comps and the financial modeling methods discussed herein.

Additional Embodiments

In alternative embodiments, the KSD methods disclosed herein may also be used to optimize the city or geographic region in which various real estate transactions may take place. These alternative embodiments, although useful for commercial real estate leasing transactions, may also be used for any type of real estate transaction, be it personal/ residential or commercial, and be it rental, leasing, or purchase.

In one alternative embodiment, here called "CityStat", the basic KSD parameters and functions are extended to also rank various city or geographic region parameters, such as demographics, along with various previously discussed KSD parameters.

This can be done, for example, also using various KSD that take into account city or region specific parameters such as rental rates, real estate taxes, average wages, home value, cost of living, various demographics such as age distributions (e.g. percentage of workers between 20 and 44 years old, percentage of workers between 45 and 64 years old), skills of the city's population of workers (e.g. what percentage of local jobs are computer science or math jobs), what percentage of the work force has college degrees, and the like. These KSD can be handled, as before in a dashboard with sliders or other user inputs, such as FIG. 29 (2900).

So, for example, if the client wants to also locate their building or lease in a city with low taxes, reasonable wages, and so on, the system allows them use the KSD process to help them find the optimum city or geographic region to then start the more detailed building search as well.

Here for example the user may start by initially selecting various potential cities or geographic regions of interest, and then use the invention's KSD methods, along with supplemental data (e.g. city demographic data, map data) to further refine this selection.

The demographic information may either be obtained automatically (e.g. by automatically scraping or downloading the data from a demographics website), or alternatively may be entered into a data file by a system operator or user when a new city or geographic region is selected.

Often, for example, a very important employer criteria is to set up sites in regions where there the local population of workers has the appropriate skill sets. This of course will vary depending on the industry. Thus here, the user would first determine as a KSD factor, which types of skills are most important (e.g. computer science skills for a software company), and then secondly inform the system, by setting that KSD factor weighting parameter, how important that particular geographic employee skill KSD rating is versus other KSD factors. Here, of course there will be tradeoffs. For example, an area with a highly educated local population will often have higher local rents, with the exception of isolated university towns. Thus choosing to weigh high employee education with low local rents might tend to drive the system to recommend university towns. If a third KSD factor, such as rapid access to major metropolitan areas, is also considered, this may confound this "university town" selection, however.

Similarly if the client is running a factory putting together a mechanical product, then access to a local population enriched in mechanical skills or trades would be useful, and so on.

One of the great values of the invention's demographic and geographic weighted KSD factors is that they force the user and client to see the "big picture". This helps them avoid "penny wise pound foolish" decisions such as optimizing costs over everything else, and otherwise helps them optimize their overall business for the long term.

In a preferred embodiment, this higher level city or geographic region KSD analysis will be done first. Once the higher level "where is the best city or region to locate a particular site" decision is done, then the lower level "given a now optimized city or geographic region, what are the best buildings to use" KSD optimization process, previously described, can now be done.

Figure 29:
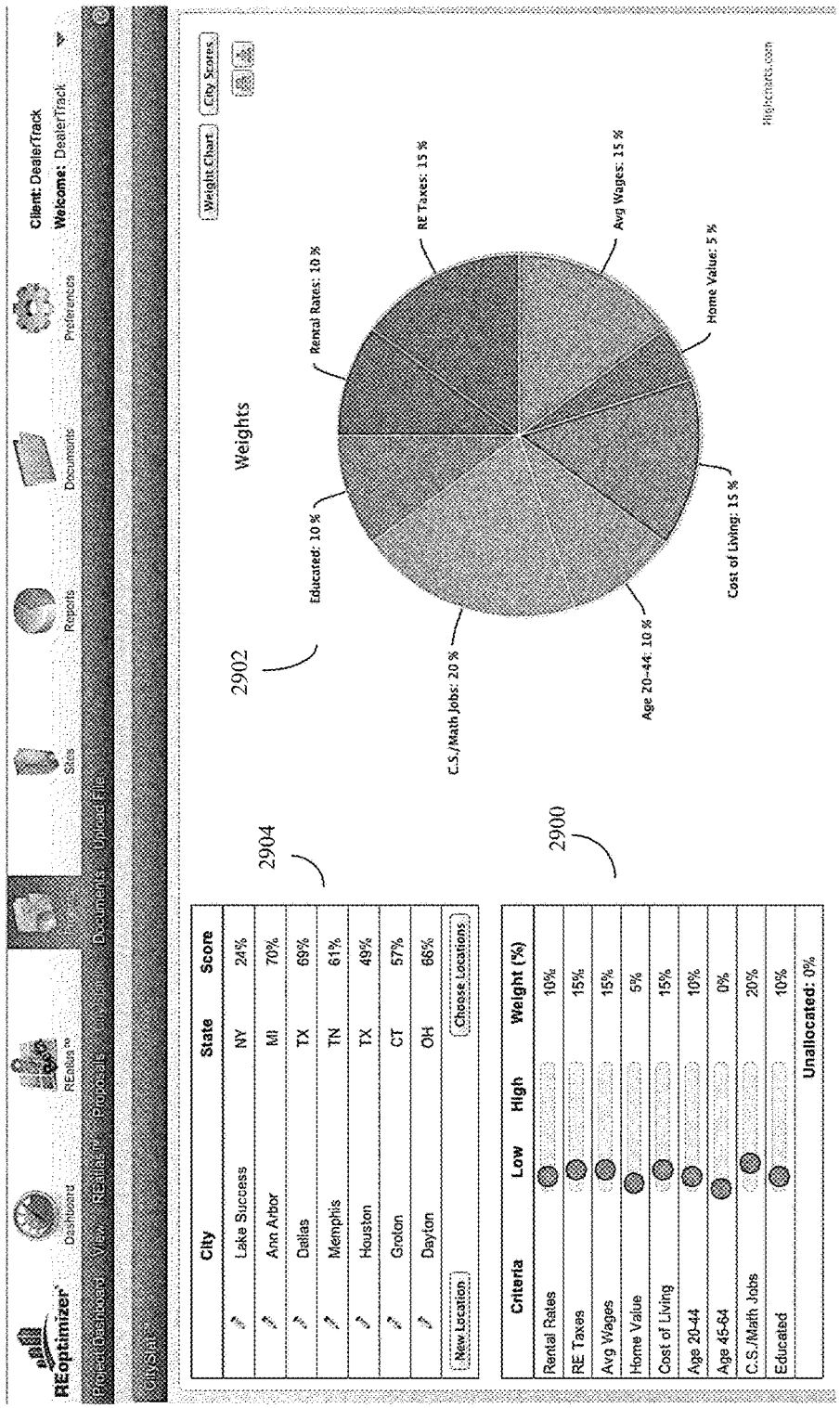
FIG. 29 shows the invention's "CityStat™" demographic KSD weighting results. Here seven geographic regions are being compared versus demographic KSD, each with different relative weighting. The client or broker may enter in their desired demographic KSD ratings by using a slider type GUI (2900), and these various weights are also shown on the Weight pie chart (2902). The impact that this particular set of demographic KSD has on the recommended city or geographic region selection is shown as (2904).

FIG. 29 shows the invention's "CityStat™" demographic KSD weighting results. Here seven cities and related geographic regions are being compared versus various KSD that include various demographic KSD, each with different relative weighting. As before, the client or broker may enter in their desired demographic KSD ratings by using a slider type GUI (2900), and these various weights are also shown on the weight pie chart (2902). The impact that this particular set of demographic KSD has on the recommended city or geographic region selection is shown as (2904). See also FIG. 37 for more details on how this method works.

Figure 30:
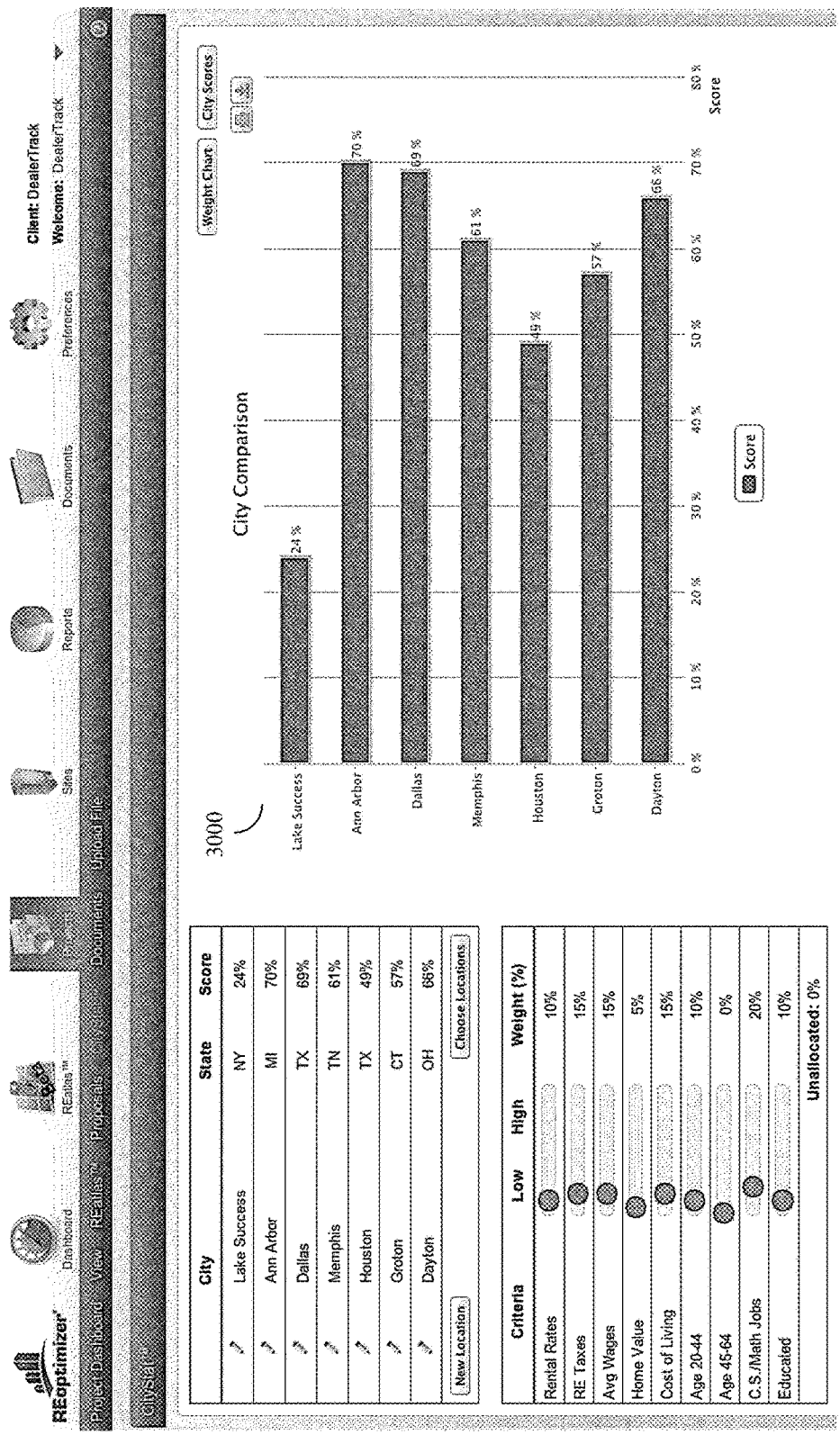
FIG. 30 shows how the invention can also graphically show the demographic KSD weighted city scores (3000). Here these scores are based on the demographic KSD weights of FIG. 29.

FIG. 30 shows how the invention can also graphically show the demographic KSD weighted city scores (3000). Here these scores are based on the demographic KSD weights of FIG. 29. Here, because the client values both an educated population (10% KSD weight), a population with a high percentage of computer science skills (20% KSD weight), a younger population (10% KSD weight for the 20-44 demographic) and also wants lower rental rates (10% KSD weight), then we end up giving Ann Arbor Mich., somewhat a university town due the proximity and local dominance of the University of Michigan, as the highest choice.

Figure 31:
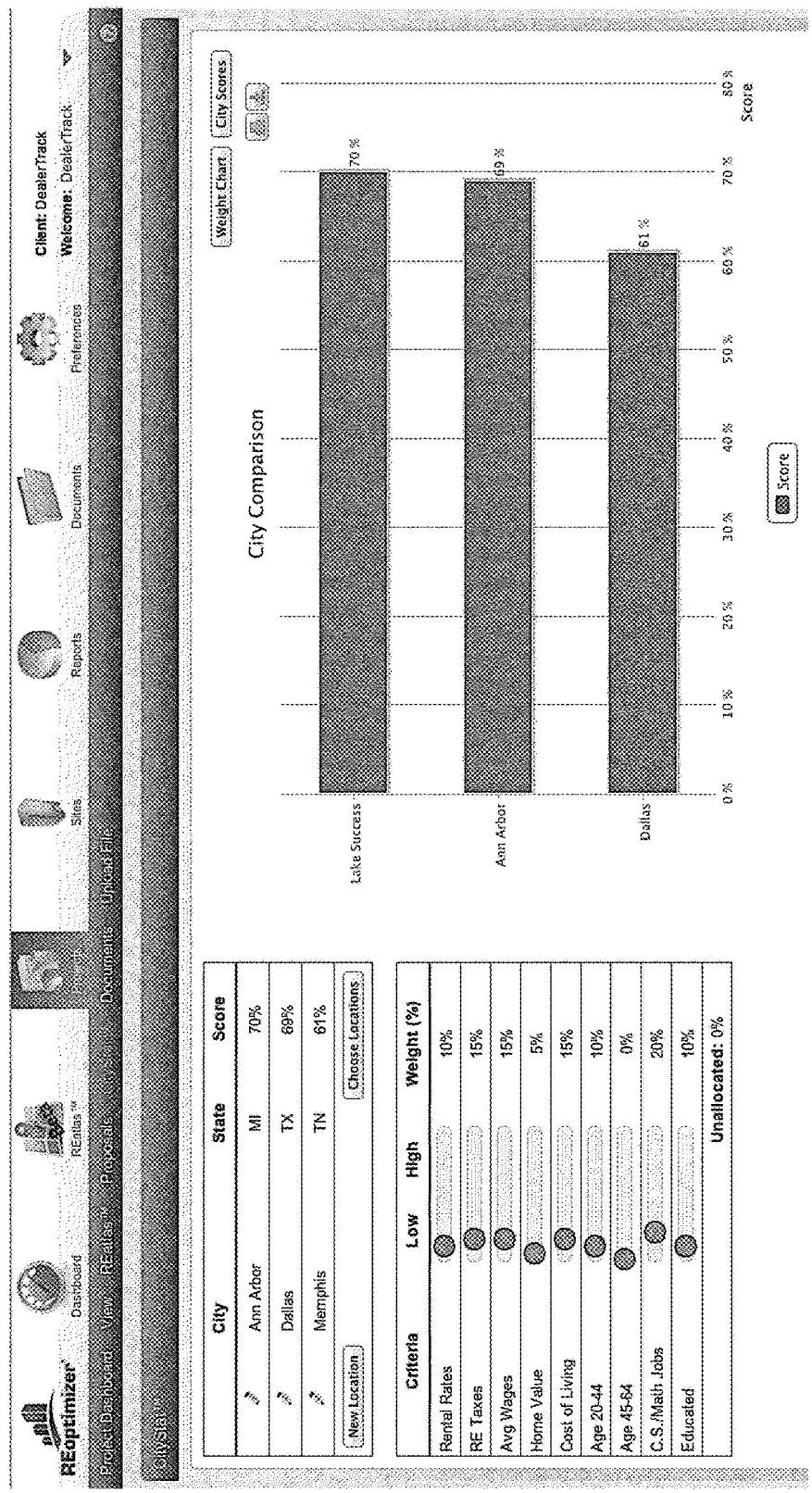
FIG. 31 shows an alternative selection where here the client is focusing on the top demographic KSD selected cities or geographic regions.

FIG. 31 shows an alternative selection where here the client is focusing on the top demographic KSD selected cities or geographic regions.

Another benefit of the present invention is that it allows many real estate selection criteria to be dynamically presented on a computer screen (such as a web browser screen) simultaneously, thus allowing a user or client to easily keep many factors in mind simultaneously. In particular, it is very useful to simultaneously show KSD data, map data pertaining to a plurality of Comps, optionally a list of Comps, and detailed data pertaining to a particular Comp on the same screen at the same time. This is because it enables the human mind, which is very visually oriented, to keep all these ideas in mind simultaneously. Here use of color coding techniques, such as visually distinguishing a reference Comp, or a Comp with the highest overall KSD rating, from the other Comps on a color basis and/or on a symbol shape basis.

In some embodiments, it may also be useful to implement one or more filters. Here, for example, these filters can direct the system to just show favorite sites (e.g. sites with high scores, or sites previously designated as favorites). Thus sites previously rejected will no longer show up in the preferred filter. The rejected sites may also be removed from various displayed statistical data, such as the average price, as desired.

Other filters can manage the display and processing of various sites, comps, or other interesting factors, such as clients or competitors, as desired. Essentially each alternate factor (employee, competitor, client) can be viewed or represented as a different map layer, which can be selectively shown or hidden as desired.

Figure 32:
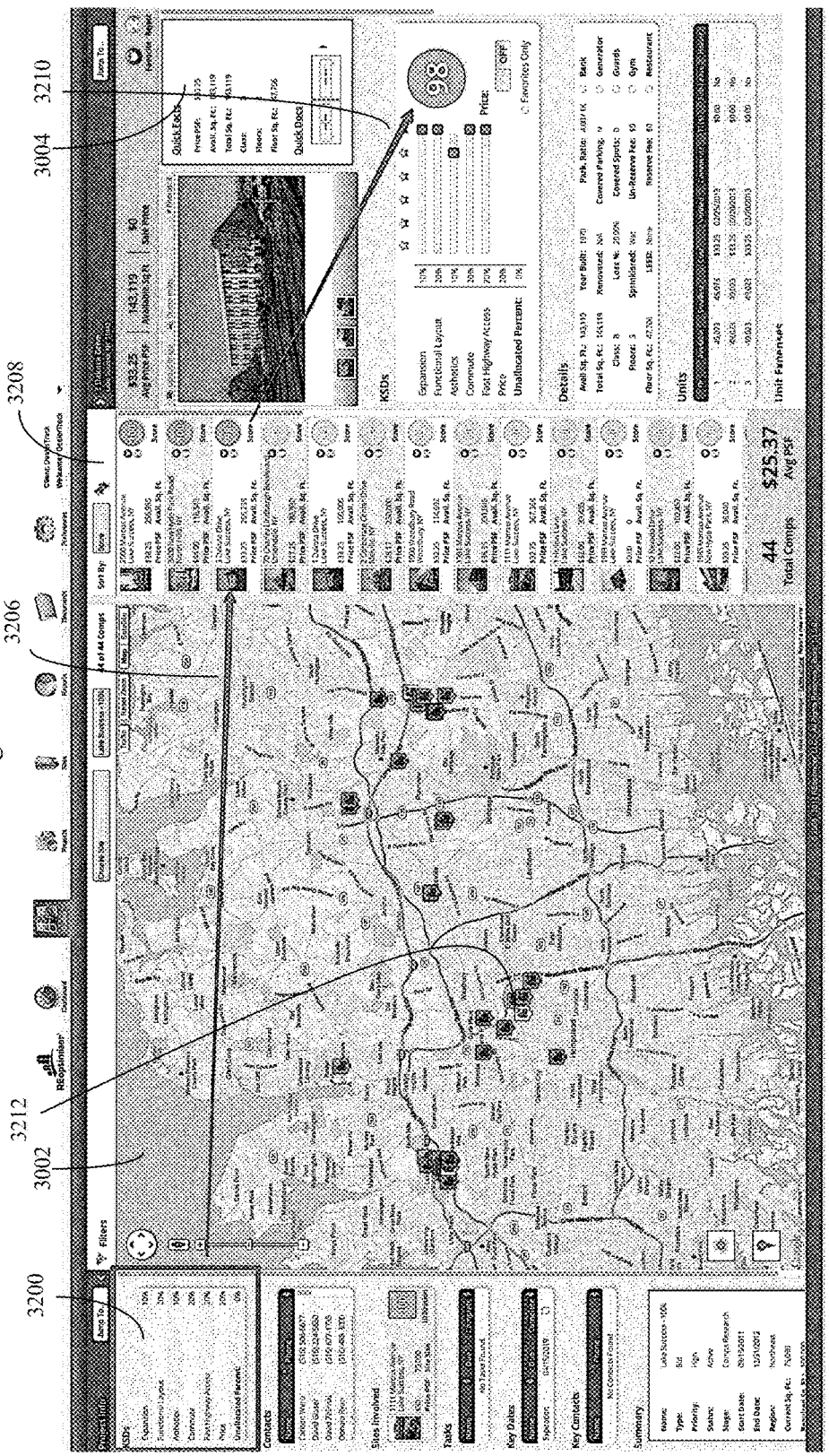
FIG. 32 shows an overview of how the system can integrate KSD data (3200), map data (3202), and site specific data (3204) to allow the client to see many aspects of the real estate selection process at a glance. Here arrow (3206) shows how the particular KSD parameters entered here lead to a particular high scored property in a list of properties (3208), and in turn arrow (3210) shows the link between this high scored property and details about this high scored property (3204). This property is also shown on the map as (3212).

FIG. 32 shows an overview of how the system can integrate KSD data (3200), map data (3202), and site specific data (3204) to allow the client to see many aspects of the real estate selection process at a glance. Here arrow (3206) shows how the particular KSD parameters entered here lead to a particular high scored property in a list of properties (3208), and in turn arrow (3210) shows the link between this high scored property and details about this high scored property (3204). This property is also shown on the map as (3212). In these examples, the mapping data is obtained from appropriate Google maps API (application programming interfaces).

Figure 33:
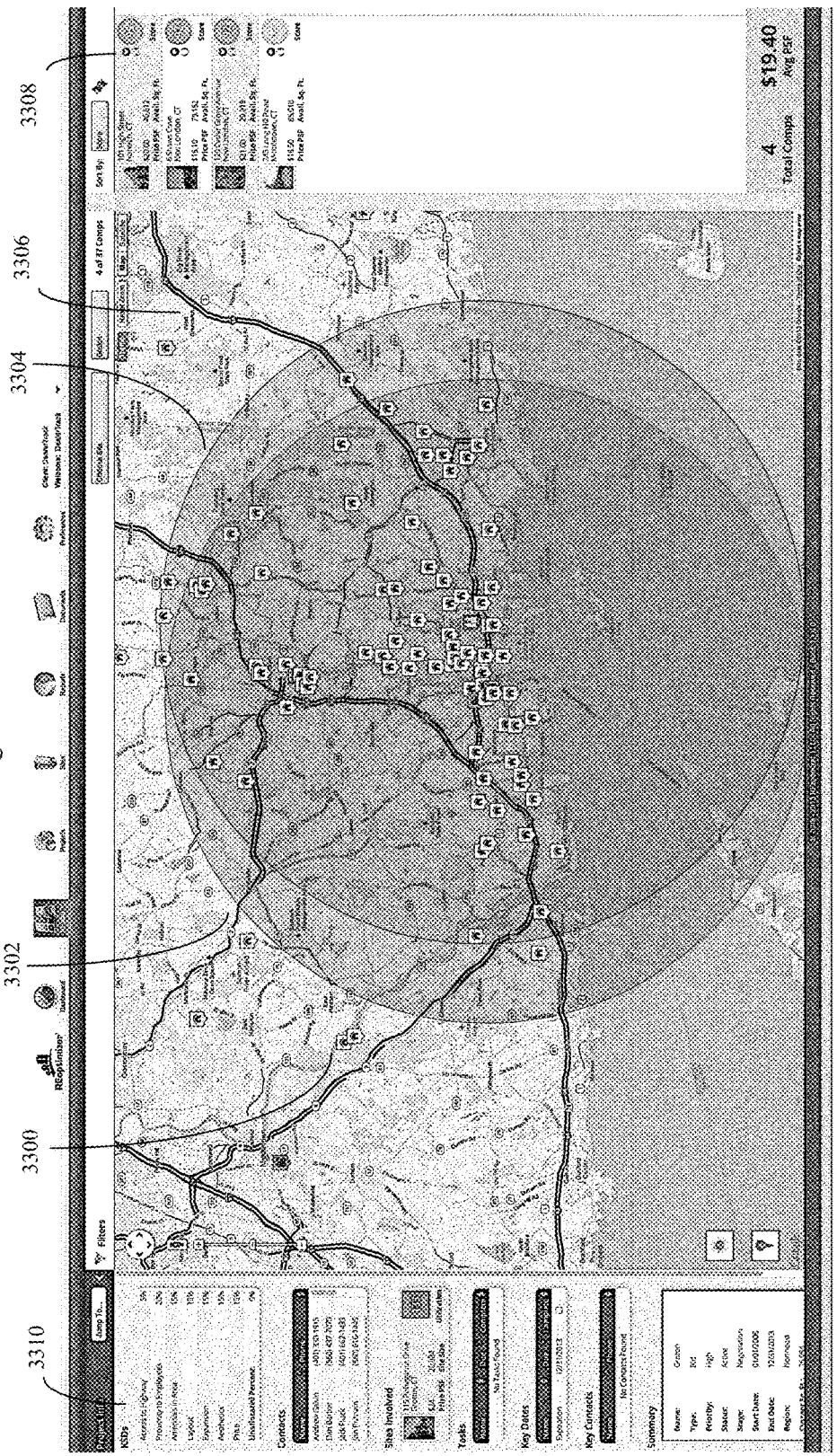
FIG. 33 shows another aspect of the invention. Here the distribution of the client company's employee's home residences are shown (3300), relative to a first circle (3302) with radius surrounding the company's present building location (or first considered relocation), and relative to a second circle (3304) with radius surrounding an alternative building location. The map (3306) may show geography and other useful factors such as key roads and traffic conditions on these key roads during, for example, typical commuting hours. Here the client is trying to evaluate 4 potential buildings (comps) (3308). Here, the KSD assisted evaluation of the various comps can use one or more commuting related KSD (e.g. access to highway, proximity to employees), and these can be given various weights along with other KSD such as amenities in the area, layout, expansion, aesthetics, and price). These KSD are shown as (3310).

FIG. 33 shows another aspect of the invention. Here the distribution of the client company's employee's home residences are shown (3300), relative to a first circle (3302) with radius surrounding the company's present building location (or first considered relocation), and relative to a second circle (3304) with radius surrounding an alternative building location. The map (3306) may show geography and other useful factors such as key roads and traffic conditions on these key roads during, for example, typical commuting hours. Here the client is trying to evaluate 4 potential buildings (comps) (3308). Here, the KSD assisted evaluation of the various comps can use one or more commuting related KSD (e.g. access to highway, proximity to employees), and these can be given various weights along with other KSD such as amenities in the area, layout, expansion, aesthetics, and price). These KSD are shown as (3310).

In some embodiments, the radius of these rings for a first site will generally also include a second site or comp, but in other embodiments, this is not required.

In addition to employees, other relevant entities, such as competitors, can also be analyzed using these methods.

So by using these methods, and optionally associated traffic information, the user may determine the effect of a different location on mean, median, mode and other measures of employee commute times.

Often customers will be unsure about which set of KSD parameters may be most suited to their situation. In embodiments, the invention may draw upon results from previous customers to automatically suggest appropriate sets of KSD parameters. This "auto-KSD" function is shown in FIG. 34.

Figure 34:
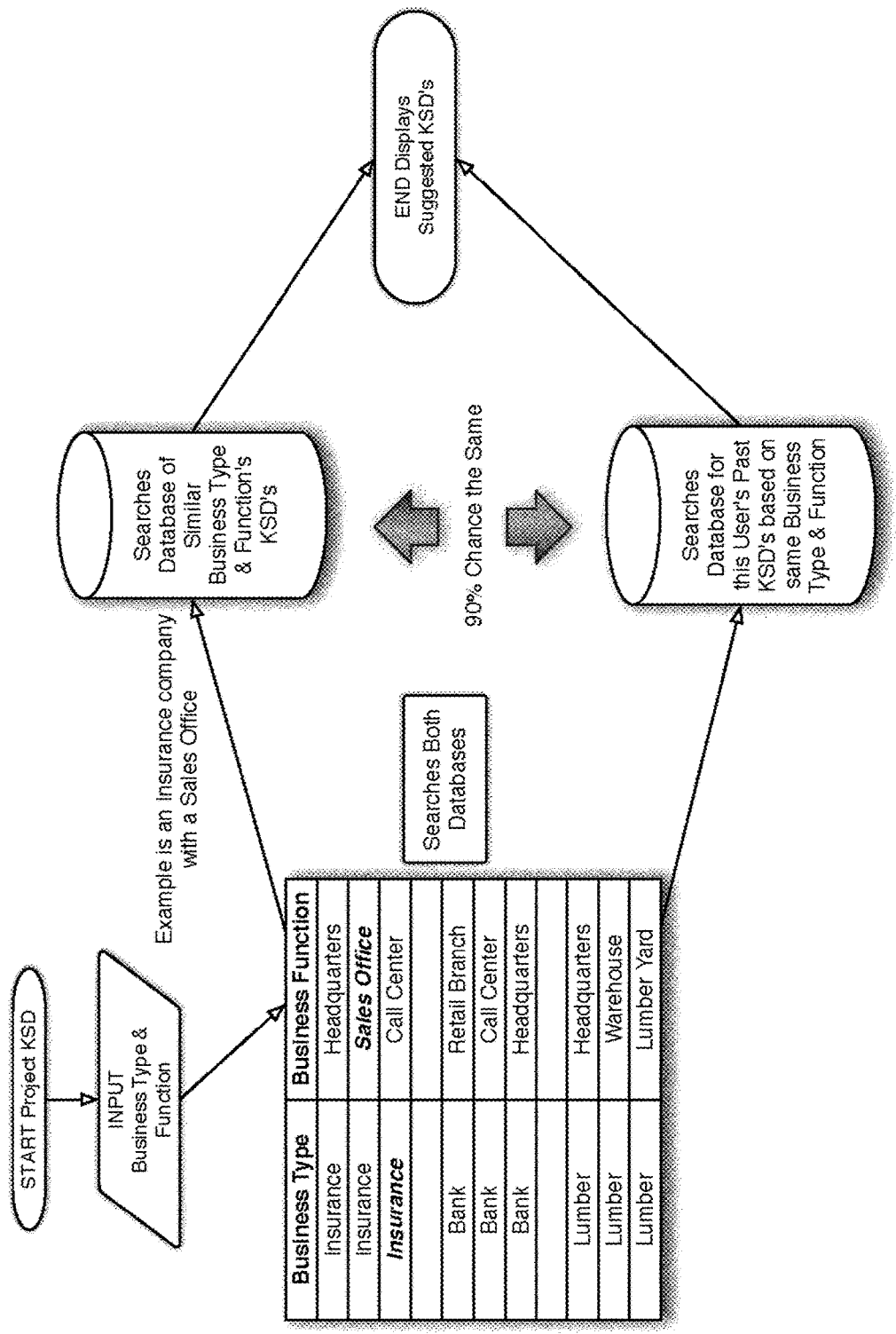
FIG. 34 shows the auto-KSD function algorithm. This allows a user to input business type and/or business function. The system then uses this information to compare KSD previously found optimal for similar type business types and/or business functions, and automatically select or recommend KSD for this customer based on past results. This helps ensure that the customer is guided to use a proper set of KSD parameters.

FIG. 34 shows the auto-KSD function algorithm. This allows a user to input business type and/or business function. The system then uses this information to compare KSD previously found optimal for similar type business types and/or business functions, and automatically select or recommend KSD for this customer based on past results. This helps ensure that the customer is guided to use a proper set of KSD parameters.

In some cases, a client mainly interested in leasing may come across buildings that otherwise look attractive, but are instead for sale. How can this client best consider both for lease and for sale buildings or property at the same time? To do this, in another embodiment, the invention may have various financial conversion functions that can, for example, calculate the equivalent monthly costs for a for sale property, and allow a client to consider these side by side with for lease properties.

Here, in some embodiments, to accommodate this, the invention may also comprise a purchase vs. lease calculator. Here basic building information (e.g. price, square footage) is input, along with anticipated price discount (e.g. seller is likely to give an 18% discount), and other data (e.g. renovation costs, lease buy-out clauses, interest rates, government subsidies etc.) This is shown in FIG. 35. The equivalent lease price output by this calculator may then be used by the same KSD parameters that also work with lease prices, thus allowing both for sale and for lease properties to both be easily evaluated alongside each other. In the example shown in FIG. 35, the client will find that they would own the building for the same average price as a lease.

FIG. 35 shows a detail from one of the invention's financial input user input forms, here showing how a user interested in considering either purchase or lease costs type KSD can make conversions between purchase costs and lease costs. This, for example, enables a corporate client to use the same cost KSD parameters or weights to apply to both purchased and leased property.

Returning to auto KSD concepts, the auto KSD concepts can also be used to suggest buildings that the user otherwise may not have properly considered.

Figure 36:
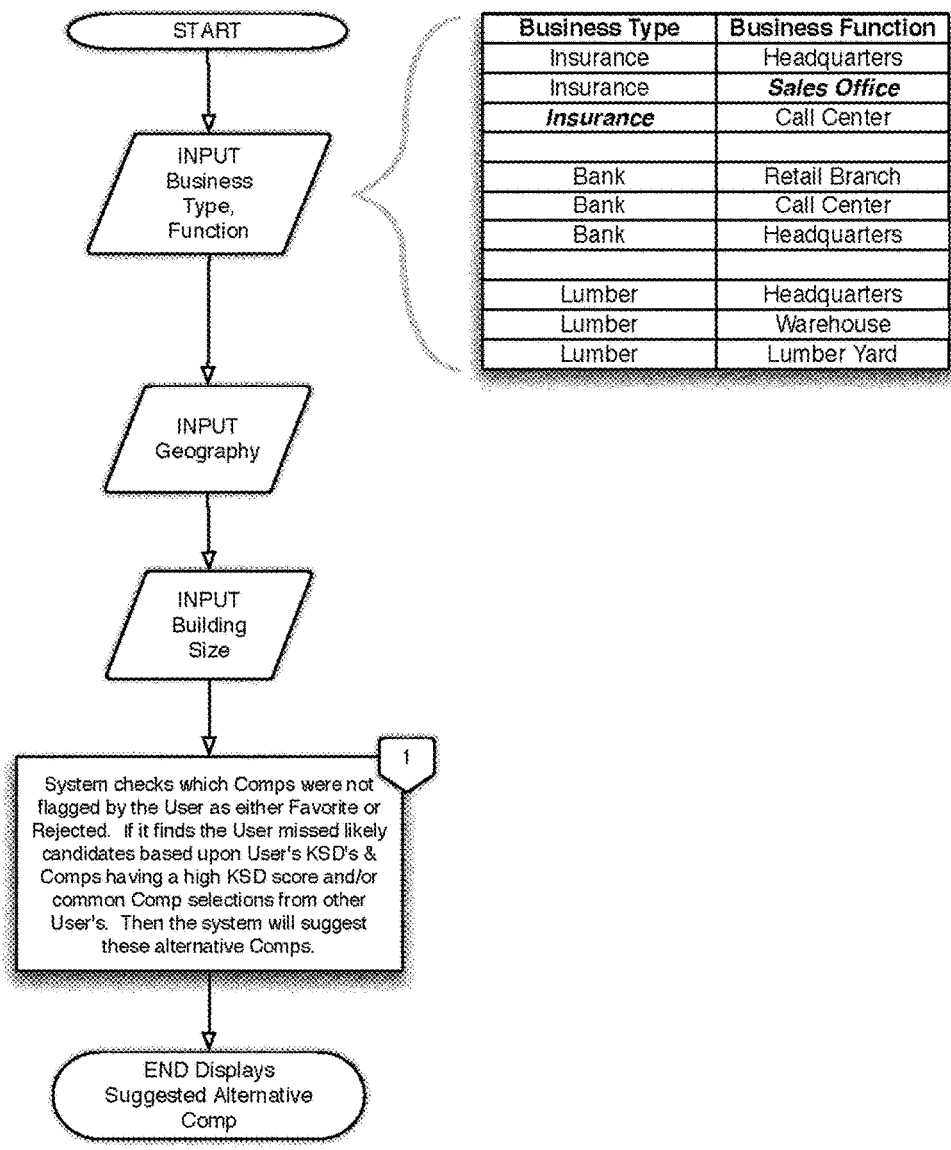
FIG. 36 shows a flowchart method to inform the user that about buildings that the user might have missed. Like the auto KSD function, this predictive building search allows the user to input the geographic region of interest, size, and their business type and function. The system checks which comps were not checked by the user as either a favorite or rejected, and those buildings that the user appears to have missed, based upon the KSD typical for the user's business type of function, can be used to suggest those comps with a high KSD score that the user has apparently not considered.

FIG. 36 shows a flowchart method to inform the user that about buildings that the user might have missed. Like the auto KSD function, this predictive building search allows the user to input the geographic region of interest, size, and their business type and function. The system checks which comps were not checked by the user as either a favorite or rejected, and those buildings that the user appears to have missed, based upon the KSD typical for the user's business type of function, can be used to suggest those comps with a high KSD score that the user has apparently not considered.

Figure 37:
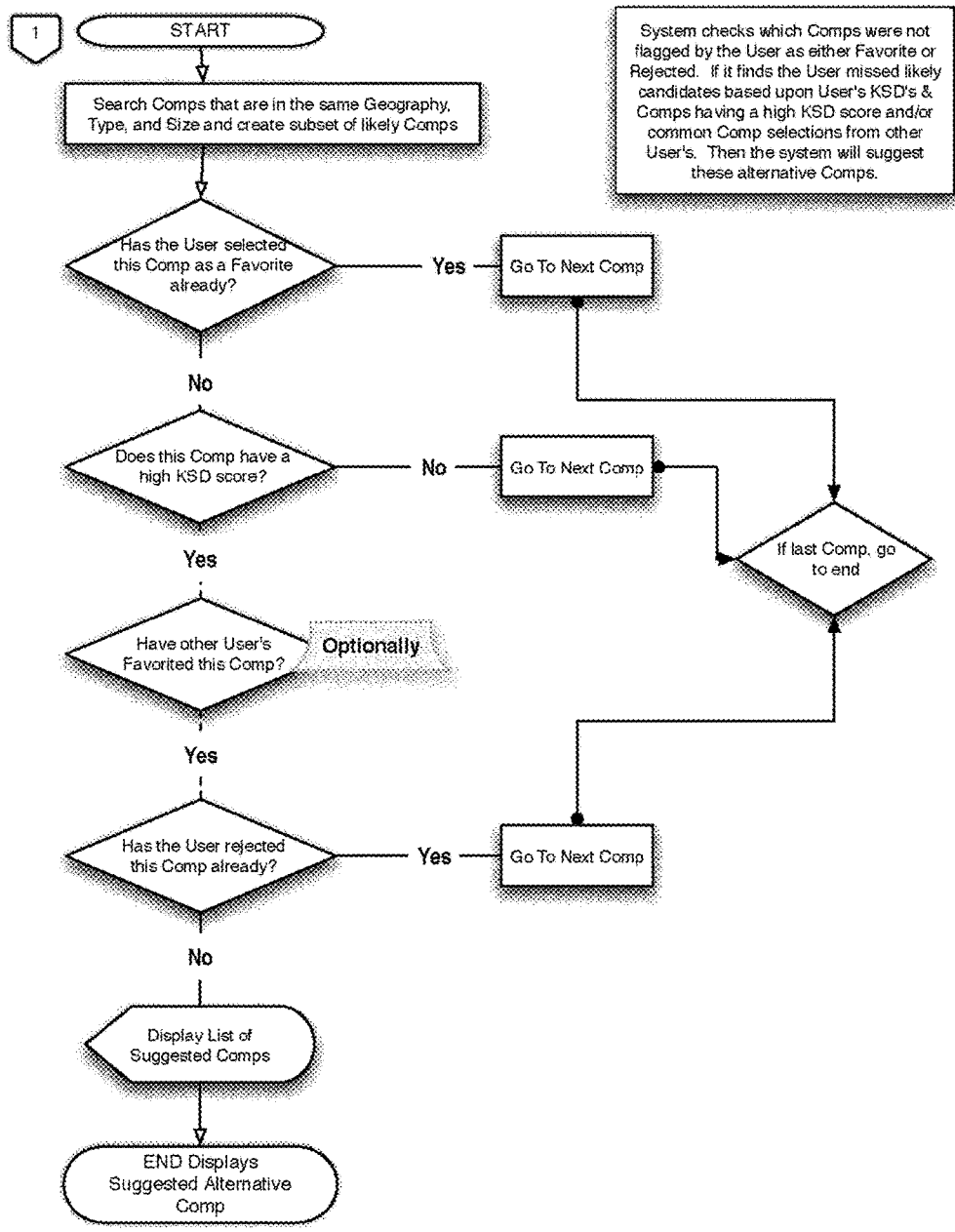
FIG. 37 shows more detail of the predictive building search previously discussed in FIG. 36.

FIG. 37 shows more detail of the predictive building search previously discussed in FIG. 36.

Figure 38:
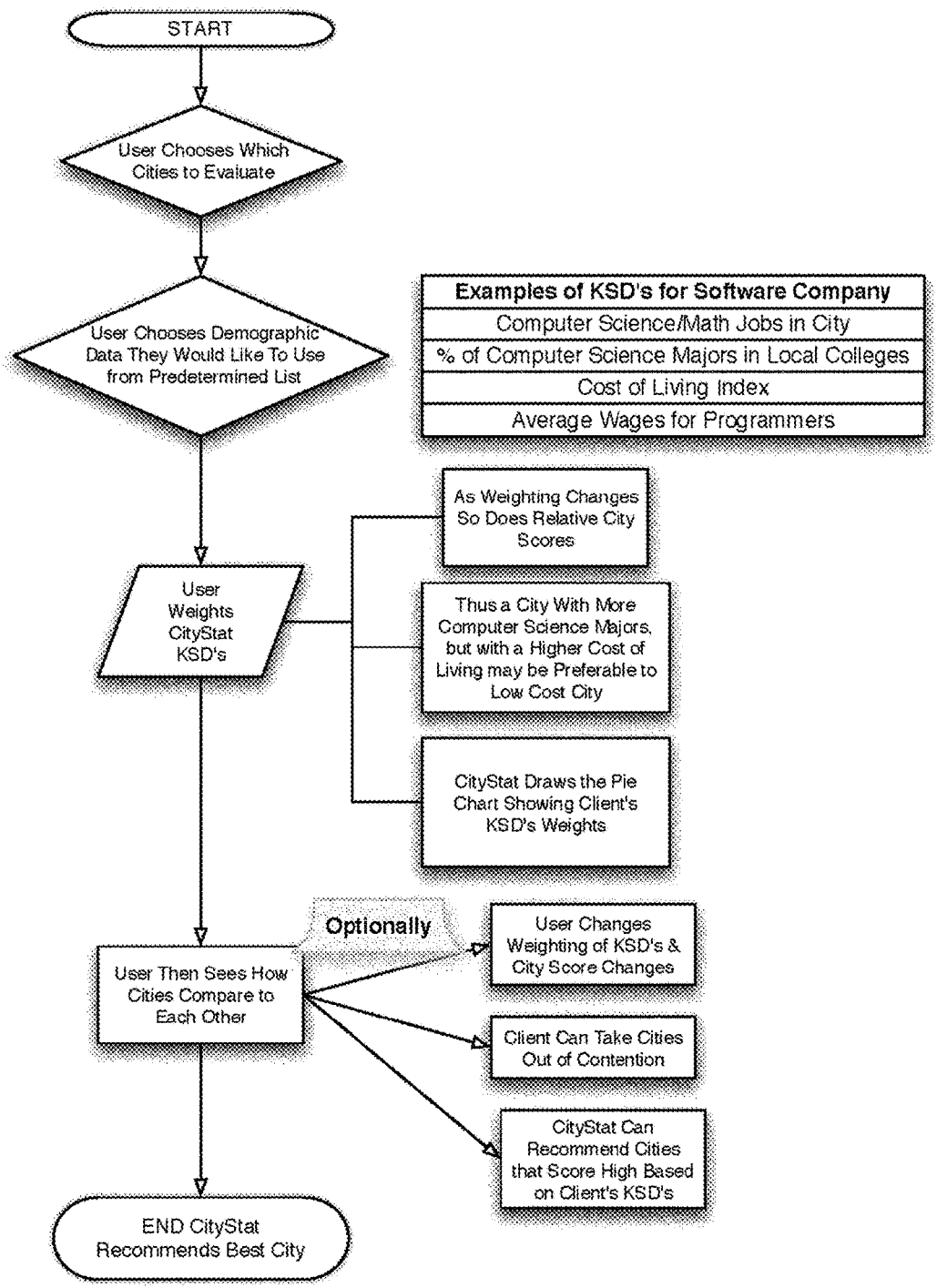
FIG. 38 CityStat allows the client to apply KSD to pick the correct city or geographic area to locate their facility. Here, the KSD are made up of the demographics that are most appropriate to the business type and business function. Here the demographic KSD can be weighted just as the building type KSD can be weighted.

FIG. 38 CityStat allows the client to apply KSD to pick the correct city or geographic area to locate their facility. Here, the KSD are made up of the demographics that are most appropriate to the business type and business function. Here the demographic KSD can be weighted just as the building type KSD can be weighted.

Further examples of these embodiments can also be found in provisional application 61/794,372, "Reoptimizer Walkthrough", filed Mar. 15, 2013, inventor Donald Charles Catalano, the contents of which are incorporated herein by reference.

The invention claimed is:

1. A computerized method of comparing a plurality of properties, said method comprising:

using a computer processor to compare a plurality of properties, each said property being a real estate property, each property having unique characteristics that impart a suitability of said property to a potential real estate user, wherein at least some of said properties have differences between said unique characteristics, said potential user comprising any of a potential lessor, purchaser or broker;

wherein said method further comprises comparing a suitability of a real estate first property to a potential user's ideal real estate property and to at least one second property, by using a KSD number generated by a KSD function comprising a plurality of KSD variables, each KSD variable having its own relative importance coefficient, to describe characteristics of the first property and at least one second property;

wherein said first property and said at least one second properties have map locations;

using a graphical user interface running on a display screen of a computerized device to define a plurality of KSD variables for a potential user's ideal version of the property, and assigning the relative importance coefficient for each individual KSD variable in said plurality of KSD variables, thus creating a KSD function that produces a KSD number;

wherein a sum of all of the relative importance coefficients in said plurality of KSD variables is equal to 100% or 1, and wherein said plurality of KSD variables is at least four KSD variables;

using said graphical user interface and said computerized device to assign values to each of said KSD variables that describe the first property and the at least one second property;

using a computer processor running said KSD function to compute KSD numbers that describe the first property and the at least one second property, wherein said KSD numbers have values between 0% and 100% inclusive, or equivalents thereof;

comparing the KSD numbers from the first property or ideal property with the at least one second property, thus producing at least one suitability rating; and using said graphical user interface to display data pertaining to said at least one suitability rating and at least one map location of any of said first and said second properties on said display screen of a computerized device.

2. The method of claim 1, wherein said KSD variables include at least one variable selected from the group consisting of aesthetics, floor layout, signage, gyms, auditoriums, proximity to daycare, proximity to airports, rail depots, or interstate highways, proximity to restaurants, commuting time to key locations, and ease of expansion.

3. The method of claim 1, wherein said KSD number for the first property or second property is normalized by the KSD number for one of the ideal property and first property.

4. The method of claim 1, wherein said first property and said at least one second properties have map locations;

further obtaining said map locations from a remote server comprising a database of map locations;

further simultaneously displaying said map of a plurality of said locations on at least one map, said map locations juxtaposed to one or more additional data or map locations selected from the group consisting of additional data pertaining to home addresses of employees that work at said first property, or commercial addresses of customers that purchase goods or services from said first property.

5. The method of claim 1, further used in a computerized method of optimizing a real estate lease portfolio relative to at least one set of Comps comprising comparable potential leases, said portfolio containing at least one leased property comprising at least one existing lease on a leased first property, each said at least one leased property having a leased property location, leased property lease start date, leased property lease expiration date, leased property rent as function of time, and projected other leased property expenses as a function of time, each individual leased property having its own associated set of Comps, said Comps comprising at least one second property, said optimization further based on a present time comprising either the date that the optimization is being performed, or a user desired reference date for the optimization, said method comprising:

projecting future expenses on an individual property basis for at least one leased property in said portfolio by using a computer processor to perform a sum of the leased property rent comprising numeric integration over time from at least the present time to the leased property lease expiration date of the leased property rent as a function of time and projected other leased property expenses as a function of time, and producing at least one individual leased property projected total cost;

for each individual Comp in said associated set of comps, obtaining data describing a Comp location, Comp lease start date, Comp lease expiration date, Comp rent as a function of time, and projected other Comp expenses as a function of time;

using a computer processor to project future expenses for each individual Comp in said associated set of comps by performing a numeric integration over time from at least the present time to said at least one leased property lease expiration date of the sum of the Comp rent as a function of time and the projected other Comp expenses as a function of time, and producing an individual Comp projected total cost;

determining the KSD numbers, KSD functions, plurality of KSD variables, and a relative importance coefficient of each KSD variable for said at least one leased property and set of Comps;

using said leased property KSD number and said Comp KSD numbers to determine which individual comps in said set of associated comps are suitable candidates to substitute for said leased property, thus producing at least one suitability rating or comparison;

displaying at the same time and on the same computerized device display screen, data pertaining to said at least one leased property, along with;

data pertaining to at least one individual Comp in said associated set of comps;

data pertaining to the difference between the at least one leased property projected total cost and the individual Comp projected total cost for at least one individual Comp in said associated set of comps; and data pertaining to said at least one suitability rating or comparison.

6. The method of claim 5, wherein said projected other leased property expenses or said other Comp expenses comprise individual operating expenses separate and apart from any other operating expense related to that particular Site, and wherein said individual operating expenses may be separately escalated or otherwise adjusted as a function of time.

7. The method of claim 5, wherein said leased property rent as a function of time or said Comp property rent as a function of time may be adjusted for free rent or other landlord rent adjustments as a function of time.

8. The method of claim 5, wherein said display screen further displays a plurality of existing leases on a plurality of leased property at the same time, while also displaying a plurality of data pertaining to the differences between the leased property projected total cost and the individual Comp projected total cost for said plurality of existing leases.

9. The method of claim 5, further using a lease vs purchase calculator to allow the future expenses on an individual property basis for at least one for sale property in said portfolio to be evaluated as if it was a leased property by performing said numeric integration over time.

10. The method of claim 1, wherein at said least one leased property is also characterized by its Capacity or Utilization numbers, further evaluating said at least one leased property by said Capacity number or Utilization number of said leased property, and wherein said Capacity or Utilization information is further displayed on said display screen for all said at least one leased properties displayed on said display screen.

11. The method of claim 10, wherein said Utilization number is at least in part derived from a number of full time employees (FTE) and contractual term employees (CTE) working at said leased property.

12. The method of claim 10, wherein said Utilization number for either said at least one leased property or said Comp property is determined by a cubic or volume Capacity of said leased property or said Comp property.

13. The method of claim 1, wherein said display screen displays at least some data in a graph format, wherein said graph format is a pie graph, bar graph, or other type of graph.

14. The method of claim 1, further used in a computerized method of optimizing a real estate lease portfolio relative to at least one set of Comps comprising comparable potential leases, said real estate portfolio containing at least one leased property comprising at least one existing lease on a leased first property;
wherein said real estate portfolio comprises a plurality of existing leases on a plurality of leased property;
each individual leased property having its own associated set of comps that comprises a plurality of comps; and
said display screen, when displaying data pertaining to only an individual leased property, compares said data only with said individual leased property's associated set of comps.

15. The method of claim 1, wherein wherein said display screen further displays a plurality of existing leases on a plurality of leased property at the same time, and wherein said at least one leased property also has a square footage lease value and a lease expiration date;
further defining a specified period of time, and comparing this specified period of time with said at least one leased property said lease expiration date, thereby determining which existing leases are due to expire within said specified period of time;
and further also displaying which existing leases are due to expire within said specified period of time, and the square footage of those said existing leases.

16. The method of claim 1, wherein said at least one leased property is also characterized by its Capacity or Utilization numbers, and wherein each of the plurality of existing leases displayed on said display screen is further evaluated by a Utilization Percentage number of an available Capacity of said leased property or properties, and data pertaining to the sum of said Capacity numbers or Utilization numbers for said plurality of existing leases is displayed on said display screen.

17. The method of claim 1, wherein said computerized device automatically selects either those comps with the KSD numbers above a minimum KSD number, or a specified number of comps with the best available KSD numbers for displaying on said computerized device screen, and automatically suppresses display of non-selected comps.

18. The method of claim 17, wherein said minimum KSD number or specified number of comps is specified by a user of the computerized device.

19. The method of claim 17, further used in a computerized method of optimizing a real estate lease portfolio relative to at least one set of Comps comprising comparable potential leases, said real estate portfolio containing at least one leased property comprising at least one existing lease on a leased first property;
wherein said real estate portfolio further comprises a plurality of existing leases on a plurality of leased property;
each individual leased property having its own associated set of comps that comprises a plurality of comps; and
said display screen, when displaying data pertaining to only an individual leased property, compares said data only with said individual leased property's associated set of comps that have KSD numbers above a minimum KSD number or a specified number of comps with the best available KSD numbers.

20. The method of claim 17, wherein said display screen further displays a plurality of existing leases on a plurality of leased property at the same time, while also displaying a plurality of data pertaining to the differences between leased property projected total cost and individual Comp projected total cost for those comps that have KSD numbers above a minimum KSD number or a specified number of comps with the best available KSD numbers for said plurality of existing leases.

21. The method of claim 1, wherein said KSD variables further comprise city or geographic region KSD variables;
further using said city or demographic region KSD variables to choose among a plurality of cities or geographic regions wherein at least said least one second property is located.

22. The method of claim 21, wherein said city or demographic region KSD variables comprise at least one of rental rates, taxes, average wages, cost of living, age demographics, population education demographics, or population skill or trade demographics.

23. The method of claim 1 further determining a location of a plurality of employee residences, and displaying said location of said plurality of employee residences on a map that further shows locations of at least one of said Comps.

24. The method of claim 23, further calculating changes in an average employee commuting time between said plurality of employee residences and said locations of at least one of said Comps.

25. The method of claim 23, further displaying a road map with traffic conditions during peak commuting hours between said plurality of employee residences and said locations of at least one of said Comps.

26. The method of claim 1, wherein said plurality of properties comprises any of a plurality of residential properties and a plurality of commercial properties.

27. A computerized method of comparing a plurality of properties, said method comprising:

using a computer processor to compare a plurality of properties, each said property being a real estate property, each property having unique characteristics that impart a suitability of said property to a potential real estate user, wherein at least some of said properties have differences between said unique characteristics, said potential user comprising any of a potential lessor, purchaser, or broker;

wherein said method further comprises comparing a suitability of a real estate first property to a potential user's ideal real estate property and to at least one second property, by using a KSD number generated by a KSD function comprising a plurality of KSD variables, each KSD variable having its own relative importance coefficient, to describe characteristics of the first property and at least one second property;

using a graphical user interface running on a display screen of a computerized device to define a plurality of KSD variables for a potential user's ideal version of the property, and assigning the relative importance coefficient for each individual KSD variable in said plurality of KSD variables, thus creating a KSD function that produces a KSD number;

wherein a sum of all of the relative importance coefficients in said plurality of KSD variables is equal to 100% or 1, and wherein said plurality of KSD variables is at least four KSD variables;

using said graphical user interface and said computerized device to assign values to each of said KSD variables that describe the first property and the at least one second property;

using a computer processor running said KSD function to compute KSD numbers that describe the first property and the at least one second property, wherein said KSD numbers have values between 0% and 100% inclusive, or equivalents thereof;

comparing the KSD numbers from the first property or ideal property with the at least one second property, thus producing at least one suitability rating; and using said graphical user interface to display data pertaining to said at least one suitability rating on said display screen of a computerized device;

wherein said first property and said at least one second properties have map locations;

further obtaining said map locations from a remote server comprising a database of map locations;

further simultaneously displaying said map of a plurality of said locations on at least one map, said map locations juxtaposed to one or more additional data or map locations selected from the group consisting of additional data pertaining to home addresses of employees that work at said first property, or commercial addresses of customers that purchase goods or services from said first property.

28. A computerized method of comparing a plurality of properties, said method comprising:

using a computer processor to compare a plurality of properties, each said property being a real estate property, each property having unique characteristics that impart a suitability of said property to a potential real estate user, wherein at least some of said properties have differences between said unique characteristics, said potential real estate user comprising any of a potential lessor, purchaser or broker;

wherein said method further comprises comparing a suitability of a potential user's ideal real estate property to a plurality of properties, by using a KSD number generated by a KSD function comprising a plurality of KSD variables, each KSD variable having its own relative user importance coefficient, to describe characteristics of said ideal real estate property;

wherein said plurality of properties have map locations;

using a graphical user interface running on a display screen of a computerized device to define a plurality of KSD variables for a potential user's ideal version of the property, and assigning a relative importance coefficient for each individual KSD variable in said plurality of KSD variables, thus creating a KSD function that produces a KSD number;

wherein a sum of all of said relative importance coefficients in said plurality of KSD variables is equal to 100% or 1, and wherein said plurality of KSD variables is at least four KSD variables;

using said graphical user interface and said computerized device to assign values to each of said KSD variables that describe the ideal real estate property and the plurality of properties;

using a computer processor running said KSD function to compute KSD numbers that describe said ideal real estate property and said plurality of properties, wherein said KSD numbers have values between 0% and 100% inclusive, or equivalents thereof;

comparing the KSD numbers from said ideal real estate property with said plurality of properties, thus producing at least one suitability rating; and using said graphical user interface to display data pertaining to said at least one suitability rating and at least one map location of any of said plurality of properties on said display screen of a computerized device.

\* \* \* \* \*